(12) United States Patent
Chaffee

(10) Patent No.: US 8,839,474 B2
(45) Date of Patent: Sep. 23, 2014

(54) METHOD AND APPARATUS FOR MONITORING AND CONTROLLING PRESSURE IN AN INFLATABLE DEVICE

(76) Inventor: Robert B. Chaffee, Portland, ME (US)

( * ) Notice: Subject to any disclaimer, the term of this patent is extended or adjusted under 35 U.S.C. 154(b) by 135 days.

(21) Appl. No.: 13/452,987

(22) Filed: Apr. 23, 2012

(65) Prior Publication Data

US 2012/0204970 A1     Aug. 16, 2012

Related U.S. Application Data

(62) Division of application No. 11/696,656, filed on Apr. 4, 2007, now Pat. No. 8,162,009.

(60) Provisional application No. 60/788,988, filed on Apr. 4, 2006, provisional application No. 60/859,325, filed on Nov. 16, 2006, provisional application No. 60/867,738, filed on Nov. 29, 2006.

(51) Int. Cl.
| | |
|---|---|
| *A47C 27/08* | (2006.01) |
| *B65B 1/04* | (2006.01) |
| *G05D 16/20* | (2006.01) |
| *A47C 31/00* | (2006.01) |

(52) U.S. Cl.
CPC ............ *A47C 27/083* (2013.01); *G05D 16/208* (2013.01); *A47C 27/082* (2013.01); *A47C 31/008* (2013.01)
USPC .......... 5/713; 5/706; 141/10; 141/94; 141/95; 141/114

(58) Field of Classification Search
USPC ............ 141/10, 94, 95, 114, 192, 198; 5/706, 5/713
See application file for complete search history.

(56) References Cited

U.S. PATENT DOCUMENTS

| | | | |
|---|---|---|---|
| 633,968 | A | 9/1899 | Swartzwelder |
| 1,185,684 | A | 6/1916 | Kraft et al. |
| 1,263,599 | A | 4/1918 | Poole |
| 1,361,453 | A | 12/1920 | Frey |
| 2,028,060 | A | 1/1936 | Gilbert |
| 2,064,695 | A | 12/1936 | Sipe |

(Continued)

FOREIGN PATENT DOCUMENTS

| | | |
|---|---|---|
| EP | 0317021 A1 | 5/1989 |
| EP | 0506696 B1 | 10/1992 |

(Continued)

OTHER PUBLICATIONS

International Search Report from corresponding PCT Application No. PCT/US2007/065988 mailed Aug. 21, 2008.

(Continued)

*Primary Examiner* — Timothy L Maust
(74) *Attorney, Agent, or Firm* — Lando & Anastasi, LLP

(57) ABSTRACT

In one aspect, the invention provides a method for a user to adjust a pressure in an inflatable device. The method includes acts of adjusting the pressure in the inflatable device with a control device to a pressure preferred by the user, where the pressure preferred by the user has a first value, and establishing a first setting corresponding to the pressure preferred by the user with the control device, and automatically establishing a second setting corresponding to a second pressure having a second value once the first setting is established, where the second value differs from the first value by a predetermined amount.

26 Claims, 38 Drawing Sheets

(56) References Cited

U.S. PATENT DOCUMENTS

| | | |
|---|---|---|
| 2,112,641 A | 3/1938 | Wheaton |
| 2,168,774 A | 8/1939 | Hurlburt |
| 2,285,695 A | 6/1942 | Bennett |
| 2,288,889 A | 7/1942 | Costello |
| 2,459,689 A | 1/1949 | Dickey et al. |
| 2,482,198 A | 9/1949 | Melichar |
| 2,595,406 A | 5/1952 | Popovich |
| 2,701,579 A | 2/1955 | Hasselquist |
| 2,767,735 A | 10/1956 | Darling |
| 2,803,527 A | 8/1957 | Lundahl |
| 2,823,668 A | 2/1958 | Van Court et al. |
| 2,949,927 A | 8/1960 | Mackal |
| 2,990,070 A | 6/1961 | Cushman |
| 3,086,698 A | 4/1963 | Goldstein |
| 3,095,901 A | 7/1963 | Larson et al. |
| 3,123,336 A | 3/1964 | Price |
| 3,164,151 A | 1/1965 | Vere Nicoll |
| 3,208,721 A | 9/1965 | McHugh |
| 3,367,819 A | 2/1968 | Schlag |
| 3,403,696 A | 10/1968 | Pynchon |
| 3,424,151 A | 1/1969 | Ericson |
| 3,459,363 A | 8/1969 | Miller |
| 3,462,775 A | 8/1969 | Markwitz et al. |
| 3,505,695 A | 4/1970 | Bishaf et al. |
| 3,511,472 A | 5/1970 | Zimmerman |
| 3,561,435 A | 2/1971 | Nicholson |
| 3,610,235 A | 10/1971 | Sivash |
| 3,665,958 A | 5/1972 | Dunkelis |
| 3,667,075 A | 6/1972 | Ballard et al. |
| 3,667,625 A | 6/1972 | Lucas |
| 3,719,401 A | 3/1973 | Peruglia |
| 3,762,404 A | 10/1973 | Sakita |
| 3,785,395 A | 1/1974 | Andreasson |
| 3,829,918 A | 8/1974 | Stamberger |
| 3,831,628 A | 8/1974 | Kintner et al. |
| 3,898,703 A | 8/1975 | Stamberger |
| 3,899,797 A | 8/1975 | Gunst |
| 3,973,588 A | 8/1976 | Holst |
| 3,983,907 A | 10/1976 | Sorensen |
| 3,995,653 A | 12/1976 | Mackal et al. |
| 4,040,526 A | 8/1977 | Baxter et al. |
| 4,068,334 A | 1/1978 | Randall |
| 4,078,580 A | 3/1978 | Rudle |
| 4,168,063 A | 9/1979 | Rowland |
| 4,175,297 A | 11/1979 | Robbins et al. |
| 4,176,681 A | 12/1979 | Mackal |
| 4,266,298 A | 5/1981 | Graziano |
| 4,273,310 A | 6/1981 | Ginzler |
| 4,300,759 A | 11/1981 | Caplan |
| 4,317,244 A | 3/1982 | Balfour-Richie |
| 4,478,587 A | 10/1984 | Mackal |
| 4,515,872 A | 5/1985 | Okano |
| 4,547,919 A | 10/1985 | Wang |
| 4,559,020 A | 12/1985 | Wang |
| 4,579,141 A | 4/1986 | Arff |
| 4,639,232 A | 1/1987 | Wang |
| 4,644,597 A | 2/1987 | Walker |
| 4,678,014 A | 7/1987 | Owen et al. |
| 4,694,406 A | 9/1987 | Shibui et al. |
| 4,694,409 A | 9/1987 | Lehman |
| 4,712,574 A | 12/1987 | Perrott |
| 4,751,452 A | 6/1988 | Kilmer et al. |
| 4,756,032 A | 7/1988 | Wang |
| 4,766,628 A | 8/1988 | Walker |
| 4,773,104 A | 9/1988 | Wang |
| 4,862,533 A | 9/1989 | Adams, III |
| 4,870,983 A | 10/1989 | Wang |
| 4,890,344 A | 1/1990 | Walker |
| 4,891,855 A | 1/1990 | Cheng-Chung |
| 4,911,405 A | 3/1990 | Weissgerber |
| 4,948,092 A | 8/1990 | Kasper et al. |
| 4,986,738 A | 1/1991 | Kawasaki et al. |
| 4,990,060 A | 2/1991 | Cheng-Chung |
| 5,020,176 A * | 6/1991 | Dotson .............................. 5/710 |
| 5,037,062 A | 8/1991 | Neuhaus |
| 5,040,555 A | 8/1991 | Wang |
| 5,060,324 A | 10/1991 | Marinberg et al. |
| 5,068,933 A | 12/1991 | Sexton |
| 5,071,378 A | 12/1991 | Wang |
| 5,085,214 A | 2/1992 | Barrett |
| 5,102,365 A | 4/1992 | Wang |
| 5,111,838 A | 5/1992 | Langston |
| D328,324 S | 7/1992 | Wang |
| 5,178,523 A | 1/1993 | Cheng-Chung |
| 5,184,309 A | 2/1993 | Simpson et al. |
| 5,186,667 A | 2/1993 | Wang |
| 5,203,831 A | 4/1993 | Lind et al. |
| 5,251,349 A | 10/1993 | Thomas et al. |
| D341,983 S | 12/1993 | Wang |
| 5,267,363 A | 12/1993 | Chaffee |
| 5,288,286 A | 2/1994 | Davis |
| 5,307,529 A | 5/1994 | Wang |
| 5,367,726 A | 11/1994 | Chaffee |
| 5,432,916 A | 7/1995 | Hahn et al. |
| 5,450,858 A | 9/1995 | Zablotsky et al. |
| 5,474,361 A | 12/1995 | Hwang et al. |
| 5,494,258 A | 2/1996 | Weissgerber et al. |
| 5,509,154 A | 4/1996 | Shafer et al. |
| 5,535,849 A | 7/1996 | Few |
| 5,542,136 A * | 8/1996 | Tappel .............................. 5/710 |
| 5,581,304 A | 12/1996 | Wang |
| 5,606,756 A | 3/1997 | Price |
| 5,652,484 A | 7/1997 | Shafer et al. |
| 5,768,247 A | 6/1998 | Kim et al. |
| 5,839,139 A | 11/1998 | Fink |
| 5,848,450 A | 12/1998 | Oexman et al. |
| 5,903,941 A | 5/1999 | Shafer et al. |
| 5,904,172 A | 5/1999 | Gifft et al. |
| 5,941,272 A | 8/1999 | Feldman |
| 5,944,066 A | 8/1999 | Viard |
| 5,947,168 A | 9/1999 | Viard |
| 5,962,159 A | 10/1999 | Satou et al. |
| 5,970,545 A | 10/1999 | Garman et al. |
| 6,008,598 A | 12/1999 | Luff et al. |
| 6,032,080 A | 2/2000 | Brisbane et al. |
| 6,037,723 A * | 3/2000 | Shafer et al. .............................. 318/6 |
| 6,051,016 A | 4/2000 | Mesaros et al. |
| 6,073,289 A | 6/2000 | Bolden et al. |
| 6,085,555 A | 7/2000 | Wu et al. |
| 6,094,762 A | 8/2000 | Viard et al. |
| 6,098,000 A | 8/2000 | Long et al. |
| 6,129,524 A | 10/2000 | Woollenweber et al. |
| 6,152,169 A | 11/2000 | Flick |
| 6,164,314 A | 12/2000 | Saputo et al. |
| 6,185,770 B1 | 2/2001 | Wang |
| 6,206,654 B1 | 3/2001 | Cassidy |
| 6,212,718 B1 | 4/2001 | Stolpmann et al. |
| 6,237,621 B1 | 5/2001 | Chaffee |
| 6,237,653 B1 | 5/2001 | Chaffee |
| 6,246,317 B1 | 6/2001 | Pickornik et al. |
| 6,253,401 B1 | 7/2001 | Boyd |
| 6,302,145 B1 | 10/2001 | Ellis et al. |
| 6,378,152 B1 | 4/2002 | Washburn et al. |
| 6,384,715 B1 | 5/2002 | Potter |
| 6,396,224 B1 | 5/2002 | Luff et al. |
| 6,397,419 B1 | 6/2002 | Mechache |
| 6,418,579 B2 | 7/2002 | Perez et al. |
| 6,439,264 B1 | 8/2002 | Ellis et al. |
| 6,444,551 B1 | 9/2002 | Ku et al. |
| 6,483,264 B1 | 11/2002 | Shafer et al. |
| 6,508,264 B2 | 1/2003 | Chaffee |
| 6,530,751 B1 | 3/2003 | Song et al. |
| 6,543,073 B2 | 4/2003 | Wu |
| 6,581,223 B1 | 6/2003 | Wang |
| 6,651,283 B1 | 11/2003 | Cook et al. |
| 6,679,686 B2 | 1/2004 | Wang |
| 6,686,711 B2 | 2/2004 | Rose et al. |
| 6,754,925 B1 | 6/2004 | Wang |
| 6,754,926 B2 | 6/2004 | Wang |
| 6,755,208 B2 | 6/2004 | Chaffee |
| 6,763,540 B1 | 7/2004 | Wang |
| 6,793,469 B2 | 9/2004 | Chung |
| 6,800,165 B2 | 10/2004 | Wang |
| 6,807,698 B2 | 10/2004 | Torbet et al. |

(56) References Cited

U.S. PATENT DOCUMENTS

| | | |
|---|---|---|
| 6,926,920 B2 | 8/2005 | Jang et al. |
| 6,990,700 B2 | 1/2006 | Chung |
| 7,020,921 B2 | 4/2006 | Wang |
| 7,025,576 B2 | 4/2006 | Chaffee |
| 7,040,347 B2 | 5/2006 | Wang |
| 7,114,207 B2 | 10/2006 | Wang |
| 7,120,955 B2 | 10/2006 | Wang |
| 7,152,265 B2 | 12/2006 | Chung |
| 7,246,394 B2 | 7/2007 | Wang |
| 7,260,860 B2 | 8/2007 | Chambers et al. |
| 7,284,291 B2 | 10/2007 | Wang |
| 7,306,694 B2 | 12/2007 | Wang |
| 7,313,837 B2 | 1/2008 | Wang |
| 7,334,274 B2 | 2/2008 | Wang |
| 7,365,277 B2 | 4/2008 | Wang |
| 7,387,290 B2 | 6/2008 | Wang |
| 7,398,803 B2 | 7/2008 | Newton |
| 7,398,860 B2 | 7/2008 | Amano |
| 7,712,171 B2 * | 5/2010 | Butler ................. 5/715 |
| 7,772,717 B2 | 8/2010 | Kitamura et al. |
| 7,849,545 B2 | 12/2010 | Flocard et al. |
| 8,162,009 B2 * | 4/2012 | Chaffee ............. 141/10 |
| 8,413,278 B2 * | 4/2013 | Chaffee ............. 5/713 |
| 2002/0124320 A1 | 9/2002 | Washburn et al. |
| 2003/0028971 A1 | 2/2003 | Chaffee |
| 2003/0205273 A1 | 11/2003 | Chaffee |
| 2003/0215340 A1 | 11/2003 | Chung |
| 2004/0037717 A1 | 2/2004 | Wang |
| 2004/0123393 A1 | 7/2004 | Wang |
| 2004/0123394 A1 | 7/2004 | Wang |
| 2004/0123395 A1 | 7/2004 | Wang |
| 2004/0139551 A1 | 7/2004 | Wang |
| 2004/0168256 A1 | 9/2004 | Chaffee |
| 2005/0016534 A1 | 1/2005 | Ost |
| 2005/0044634 A1 | 3/2005 | Wang |
| 2005/0115327 A1 | 6/2005 | Kroll et al. |
| 2005/0118046 A1 | 6/2005 | Wang |
| 2006/0026767 A1 | 2/2006 | Chambers et al. |
| 2006/0033067 A1 | 2/2006 | Wang |
| 2006/0037145 A1 | 2/2006 | Wang |
| 2006/0129074 A1 | 6/2006 | Wang |
| 2006/0291964 A1 | 12/2006 | Wang |
| 2007/0000569 A1 | 1/2007 | Wang |
| 2007/0245495 A1 | 10/2007 | Wang |
| 2008/0000030 A1 | 1/2008 | Wang |
| 2008/0087342 A1 | 4/2008 | Wang |
| 2008/0105366 A1 | 5/2008 | Wang |
| 2008/0109958 A1 | 5/2008 | Wang et al. |
| 2008/0109962 A1 | 5/2008 | Wang et al. |
| 2008/0109963 A1 | 5/2008 | Wang et al. |
| 2009/0314354 A1 | 12/2009 | Chaffee |

FOREIGN PATENT DOCUMENTS

| | | |
|---|---|---|
| EP | 0852296 A2 | 7/1998 |
| EP | 1364833 A1 | 11/2003 |
| EP | 1415576 A2 | 5/2004 |
| GB | 841736 A | 7/1960 |
| GB | 903557 A | 8/1962 |
| GB | 1381952 A | 1/1975 |
| GB | 2380935 A | 4/2003 |
| WO | 9803810 A1 | 1/1998 |
| WO | 0040882 A1 | 7/2000 |
| WO | 0187121 A2 | 11/2001 |
| WO | 0215835 A1 | 2/2002 |
| WO | 03093709 A1 | 11/2003 |
| WO | 2007/115316 A2 | 10/2007 |

OTHER PUBLICATIONS

International Search Report from PCT Application No. PCT/US2009/037186 mailed Jan. 7, 2011.

* cited by examiner

METHOD AND APPARATUS FOR MONITORING AND CONTROLLING PRESSURE IN AN INFLATABLE DEVICE

RELATED APPLICATIONS

This application is a divisional of and claims the benefit under 35 U.S.C. §§ 120 and 121 to U.S. patent application Ser. No. 11/696,656 filed Apr. 4, 2007, entitled "Method and Apparatus for Monitoring and Controlling Pressure in an Inflatable Device", which claims benefit under U.S.C. § 119 (e) to each of U.S. Provisional Application Ser. Nos. 60/788,988, entitled "Method and Apparatus for Monitoring and Controlling Pressure in an Inflatable Device," filed on Apr. 4, 2006; 60/859,325, entitled "Method and Apparatus for Monitoring and Controlling Pressure in an Inflatable Device," filed on Nov. 16, 2006; and 60/867,738, entitled "Inflatable Device with Recessed Fluid Controller and Modified Adjustment Device," filed on Nov. 29, 2006, the content of each of the preceding is herein incorporated by reference in its entirety.

BACKGROUND OF INVENTION

1. Field of Invention

Embodiments of the invention relate generally to inflatable devices. More specifically, at least one embodiment relates to an apparatus and method for monitoring and controlling the pressure in an inflatable device, for example, based on a user selected inflation level.

2. Discussion of Related Art

Inflatable devices are used in a variety of contexts, such as where buoyancy or a cushioned support is needed, where space is limited or portability is desired. For example, inflatable mattresses, cushions and other body supports (e.g., pillows, backrests, chairs, etc.) are used for applications such as camping, hospital bedding, and both occasional and everyday bedding and support in the home. Many inflatable devices can be inflated to a desired pressure level using an inflation device such as an electrically operated pump. Generally, these inflatable devices also include at least one valve (either manually operated or electrically operated) that allows control of the pressure in the inflatable valve, for example, by allowing the release of fluid from the inflatable device when the valve is open. Such inflatable devices have the additional advantage that the degree of inflation of the inflatable device can be adjusted to provide selective support for objects having an irregular shape, such as a person. Other examples of inflatable devices include boats, rafts and other devices for use in the water.

A variety of methods are known for providing a fluid, such as air, to inflate an inflatable device. Typically, a pump is used to supply fluid to an orifice in the inflatable device. In most instances, fluid is introduced into inflatable devices through an inlet that may be sealed to retain fluid within the inflatable device. The inlet may also serve as an outlet for deflating the inflatable device. A pump for use with an inflatable device may include a motor that drives an impeller, moving the fluid into, out of (or both), the inflatable device. Motorized pumps may be powered by electricity. Typically, such electricity is provided by a connection to standard house current or, where portability is desired, batteries.

One known inflatable device invented by the applicant is disclosed in U.S. Pat. No. 5,267,363, which is herein incorporated by reference. The inflatable device includes a bladder 20, which is adapted for use as a mattress. The inflatable device also includes a fluid controller 80 connected to bladder 20 comprising a pump adapted to inflate the bladder 20 when connected to household electric current.

Some inflatable devices include a pressure control system that allows a user to select the pressure level in the inflatable device based on a number that appears to correspond with a discrete pressure level. That is, the system may provide the user with multiple pressure settings where one or more of the pressure settings corresponds to an associated number or other indicia identifying that pressure setting. Further, once the pressure setting is selected, the pressure control system adjusts the pressure in the inflatable device by either operating the inflation device (i.e., to increase the pressure by adding fluid to the inflatable device) or opening the valve (i.e., to decrease the pressure by allowing fluid to be released from the inflatable device).

However, these known pressure control systems require that the user recall their preferred setting whenever they use the inflatable device after the pressure level in the inflatable device has been changed, for example, as the result of the use of the inflatable device by another user, gradual leakage, deflation for storage, etc. Provided the user recalls their preferred setting, the user must then adjust the pressure control setting to select the setting associated with the pressure that they prefer from among, perhaps, many pressure settings. Further, the association of the pressure of the inflatable device and the pressure setting of the pressure control is arbitrary. As one example, the controls may provide unequal steps of pressure adjustment between each control setting. More specifically, where the pressure control system provides the user with 20 different pressure control settings (e.g., identified by the numerals 1-20) the change in pressure between adjacent settings (e.g., the settings 5 and 6) may differ between each step of adjustment. In addition, the user cannot be sure that there is any difference between the pressure provided by a first pressure control setting and a pressure provided by a second pressure control setting, e.g., the pressure provided when the system is set at the pressure control setting '5' may be exactly the same as, or differ little from, the pressure provided when the system is set at the pressure control setting '6.'

Also, existing pressure control systems may not provide fast enough adjustment, in particular, where the inflatable device has a relatively large volume (e.g., a mattress). The lack of relatively rapid adjustment makes current pressure control systems impractical for use in inflatable devices that provide posture control.

SUMMARY OF INVENTION

Various embodiments of the invention provide a control device that allows a user the ability to adjust the firmness level and/or posture setting of an inflatable device based on the tactile feedback that the user receives when employing the inflatable device. In some embodiments, the control device includes a plurality of control elements and allows the user to operate the control elements to achieve a preferred firmness level and/or posture setting without the need for any indicia.

In one aspect, the invention provides a method for a user to adjust a pressure in an inflatable device. The method includes acts of adjusting the pressure in the inflatable device with a control device to a pressure preferred by the user, where the pressure preferred by the user has a first value, and establishing a first setting corresponding to the pressure preferred by the user with the control device, and automatically establishing a second setting corresponding to a second pressure having a second value once the first setting is established, where the second value differs from the first value by a predetermined amount. In one embodiment, the pressure preferred by the user is selected based only on the user interacting with the inflatable device.

According to another aspect of the invention, a system is adapted to control a pressure in an inflatable device. The system includes a pressure controller fluidly coupled to the inflatable device and configured to adjust the pressure in the inflatable device by adding and removing fluid from the inflatable device. A control device includes a plurality of control elements and is adapted to allow the user to adjust the pressure in the inflatable device using the pressure controller and a first control element configured to establish a setting corresponding to a first pressure which is a preferred pressure. A microcontroller configured to receive information concerning the first setting and automatically establish at least one additional setting corresponding to a second pressure, once the first setting is established. In a further embodiment, the control device is configured to allow the user to determine the preferred pressure based only on the user interacting with the inflatable device.

In an alternate embodiment, the control device includes a single control element and is adapted to allow the user to adjust the pressure in the inflatable device using the pressure controller. Further the single control element may be configured to establish a setting corresponding to the first pressure and one or more additional settings corresponding to one or more different pressures.

According to yet another aspect of the invention, a system is adapted to control a pressure in at least one inflatable bladder of a multi-bladder comfort device including a comfort layer and a support layer. The inflation system includes a pressure controller configured to provide posture control by adding and releasing air from at least the support layer of the inflatable device. In another embodiment, the inflation system includes a pressure controller configured to provide posture control by adding and releasing air from at least the comfort layer of the inflatable device. In a further embodiment, the inflation system includes a pressure controller configured to provide posture control by adding and releasing air from both the support layer and the comfort layer of the inflatable device. In each of the preceding embodiments, the system also includes a first inflatable bladder fluidly coupled to the pressure controller, a second inflatable bladder fluidly coupled to the pressure controller and a control unit remote from the pressure controller which is adapted to allow a user to establish a plurality of posture control settings. In another embodiment, the control unit is further configured to allow the user to select a posture control setting based only on the user interacting with the inflatable comfort device.

According to a further aspect of the invention, a hand held control device is adapted to control a pressure in an inflatable device. The control device includes a first control element adapted to allow a user, in a first operation, to establish a first setting corresponding to a pressure preferred by the user, and in a second operation, to allow the user to adjust the pressure in the inflatable device to the pressure preferred by the user from another pressure. The hand held control device also includes a second control element adapted to allow a user to increase the pressure in the inflatable device from the pressure preferred by the user to a pressure corresponding to a second setting which is automatically established once the first setting is established. According to one embodiment, the hand held control device includes a third control element adapted to allow the user to decrease the pressure in the inflatable device from the pressure preferred by the user to a pressure corresponding to a third setting which is automatically established once the first setting is established.

According to a still further aspect of the invention, an apparatus is provided for storing a handheld control device for controlling an inflation level of an inflatable device. According to one embodiment, the apparatus includes a receiving member configured to receive the handheld control device and allow the use to remove the handheld control device from the receiving member when the user is employing the handheld control device. In a further embodiment, the apparatus is configured to locate the handheld control device with respect to the inflatable device to be within reach of a user employing the handheld control device when the handheld control device is received by the receiving member. In a still further embodiment, the apparatus is configured to locate the handheld control device with respect to the inflatable device to be within reach of a user while the user is reclined on an inflatable device without the user adjusting from a reclined posture and without the user removing the control device from the receiving member. In yet another embodiment, the apparatus is configured to locate the handheld control device with respect to the inflatable device to be within reach of a user while the user remains reclined on an inflatable device without the user adjusting a posture setting of the inflatable device and without the user removing the control device from the receiving member.

In another aspect, an apparatus is provided for storing a handheld control device for controlling an inflation level of an inflatable device. In one embodiment, the apparatus includes a receiving member configured to receive the handheld control device and allow the user to remove the handheld control device from the receiving member when the user is employing the handheld control device, and recharging circuitry configured to recharge a power source located in the handheld control device with the handheld control device received by the receiving member.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
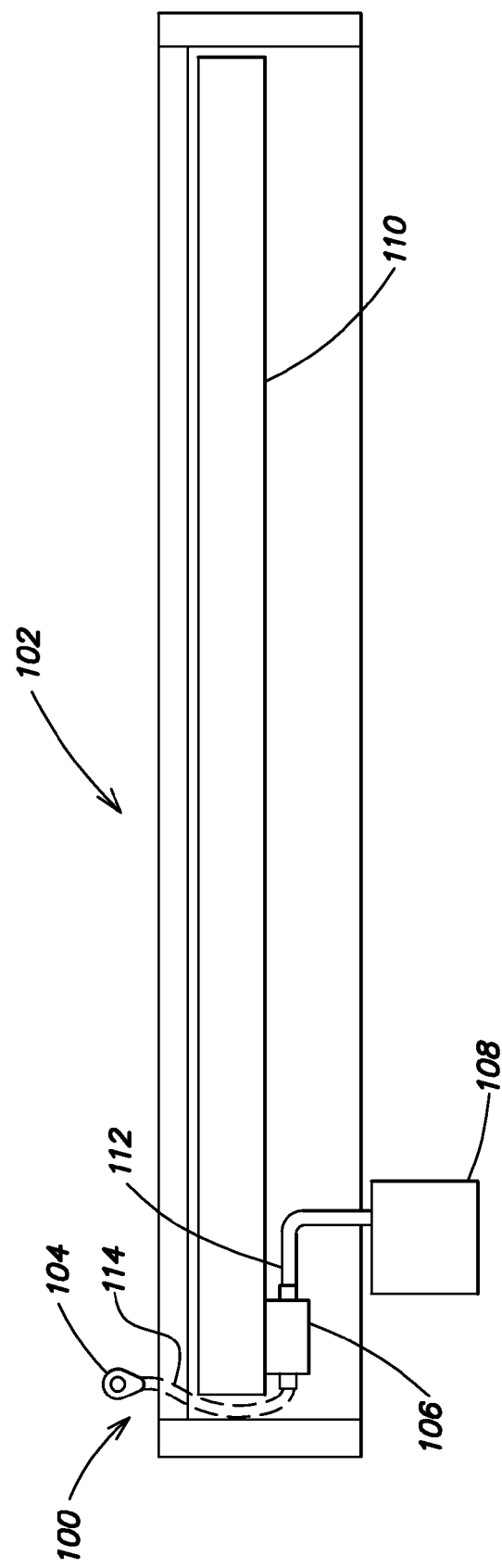
FIG. 1 illustrates a system for monitoring and controlling pressure in an inflatable device in accordance with an embodiment of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As used herein, a pressure controller (e.g., a fluid controller) is a device capable of regulating the pressure in an inflatable device and may include various components, such as a housing, one or more valves, one or more fluid conduits, one or more pumps, one or more pressure sensors and the like. In one embodiment, an inflatable device includes a substantially fluid impermeable bladder and a pressure controller comprising an electrically powered pump at least partly positioned within the bladder. As used herein, an object, such as a pressure controller, that is "positioned within" a bladder occupies a portion of the volume that would normally be occupied by the bladder, but need not be within the wall of the bladder. For example, a pressure controller could be located within a recess in the wall of a bladder and be "positioned within" the bladder, as this term is defined and used herein.

According to one embodiment, a pressure in an inflatable device is monitored and controlled using a pressure control system that includes a control unit and a pressure controller that may include one or more pressure sensors, one or more valves, one or more pumps, one or more valve operators, control logic and one or more temperature sensors. In one embodiment, the control unit is a hand held control unit that allows the user to select a preferred pressure for at least one chamber of the inflatable device based on the user interacting with the inflatable device, e.g., based on the user's tactile senses, in some cases based only on the user interacting with the inflatable device. In some embodiments, the user selects the preferred pressure without any quantitative knowledge of the actual pressure of the inflatable device or any knowledge of the relative pressure of the inflatable device. That is, without reference to any other pressure settings provided by the control unit.

In one embodiment, the inflatable device includes an inflatable bladder that can be filled with a fluid. In a version of this embodiment, the inflatable bladder includes a plurality of chambers. In a further version, the inflatable bladder includes at least one a support layer that may support one or more comfort layers.

In general, the user controls the firmness of the inflatable device by adjusting the pressure within the inflatable device using the hand held control device. In one embodiment, the system includes a processor that compares a desired pressure level to an actual pressure level of the inflatable device. If the desired pressure level is greater than the actual pressure level, the valve is opened and the pump is operated to add fluid to the inflatable device until the desired pressure is reached. If the user requests a pressure level that is less than the actual pressure level the valve is opened while the pump remains off to release fluid from the inflatable device. In some embodiments, a more rapid decrease in pressure can be achieved by operating the pump (with valve open) in a direction that allows withdrawal of air from the inflatable device. The pressure sensors are employed to determine the pressure within the inflatable device while the temperature sensors are employed to compensate the sensed-pressure for ambient temperature. The position sensors may also be used to determine the status of the valve, e.g., whether the valve is in an open position or a closed position. In one embodiment, the valve and the pump motor are both electrically operated. In a version of this embodiment, a valve operator is electrically controlled to open the valve.

FIG. 1 illustrates an embodiment of a system 100 for monitoring and controlling the pressure of an inflatable device 102. According to one embodiment, the system 100 includes a control device 104, a pressure controller 106, and a pump 108 that can be used to control the pressure in a chamber 110 of the inflatable device 102. In one embodiment, the inflatable device 102 is a mattress. In a version of this embodiment, the inflatable device 102 includes a plurality of chambers 110.

In accordance with one embodiment, the control device is a handheld unit that operates wirelessly to transmit control settings to the pressure controller 106. In another embodiment, the control device 104 is configured to be connected to the pressure controller 106. In a version of this embodiment, the control device 104 is connected to the pressure controller 106 by an optional tether 114 that includes one or more electrical conductors which conduct signals from the control device 104 to the pressure controller 106. The optional tether 114 is shown in phantom in FIG. 1.

The pump 108 can be included in the pressure controller 106 where the pump may be directly coupled to the controller. In the embodiment shown in FIG. 1, however, the pump 108 is located separately from the pressure controller 106 and the pump 108 and the controller 106 are fluidly connected by a conduit 112. In a version of this embodiment, both the controller 106 and the pump 108 are located within the profile of the inflatable device 102, for example, within a profile of a mattress. In one embodiment, both the controller and the pump are located within a profile of the chamber 110. In other embodiments, both the controller 106 and the pump may be located outside the profile of the inflatable device 102. It should be recognized that the chamber 110 may be an inflatable bladder, or a plurality of inflatable bladders.

As is discussed in greater detail herein, according to one embodiment, the pressure controller 106 includes a valve and a corresponding valve housing. In another embodiment, the controller 106 includes a plurality of valves. In further embodiments, the pressure controller 106 may include one or more valve operators, one or more position sensors to sense a position of the valve or the valve operator, one or more pressure sensors to sense pressure in one or more chambers, one or more temperature sensors to sense temperature in one or more chambers, and electronic circuitry.

In general, the pressure controller 106 includes electronic circuitry to process information concerning the pressure of the inflatable device and to provide outputs to operate valves and pumps included in the system 100 to adjust the pressure. In some embodiments, the pressure controller 106 may be an integral unit that includes the electronic circuitry, a valve, a pressure sensor, a temperature sensor, a valve operator, a position sensor or any combination of the electronic circuitry and the preceding devices. Further, in one embodiment, the pressure controller 106 includes an integral pump (e.g., the pump 108).

The control device 104 may be stored proximate to the inflatable device 102 to provide a user with convenient access to the control device. In one embodiment, the inflatable device 102 includes a frame (e.g., a mattress frame) that includes a storage location for the control device 104 such as a recess, a cutout or a hook. In another embodiment, the control device is stored on an adjacent pedestal to locate the control device in an elevated position relative to the inflatable device 102.

In various embodiments, the system 100 may also be employed to add fluid to one or more accessory devices, for example, a pillow including a fluid impermeable bladder. A fluid coupling may be provided for the purpose of temporarily connecting the accessory device to the pump 108. According to various embodiments, the fluid coupling may be connected to one of the conduit 112 or the pressure controller 106.

Figure 2:
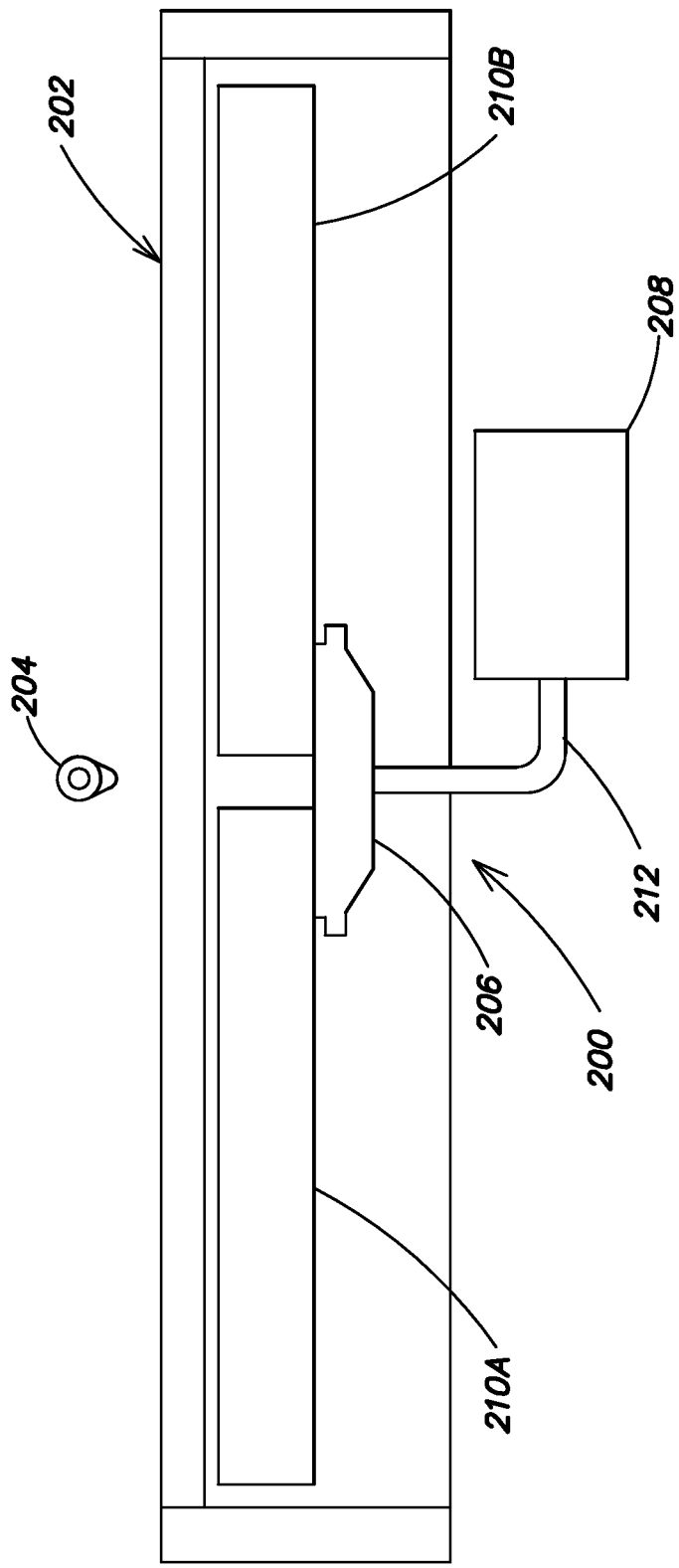
FIG. 2 illustrates a system for monitoring and controlling pressure in a multi-chamber inflatable device in accordance with an embodiment of the invention.

Referring to FIG. 2, according to one embodiment, the inflatable device 202 includes a plurality of chambers 210A, 210B where each of the chambers is an inflatable bladder. The pressure controller 206 is fluidly connected to each of the plurality of chambers 210A, 210B. The pump 208 is fluidly connected to the pressure controller (and consequently each chamber 210A, 210B) by the conduit 212. Thus, the pressure controller 206 can be employed to monitor and control the pressure in the inflatable device 202, that is, to monitor and control the pressure in each chamber 210A, 210B of the inflatable device.

Figure 3:
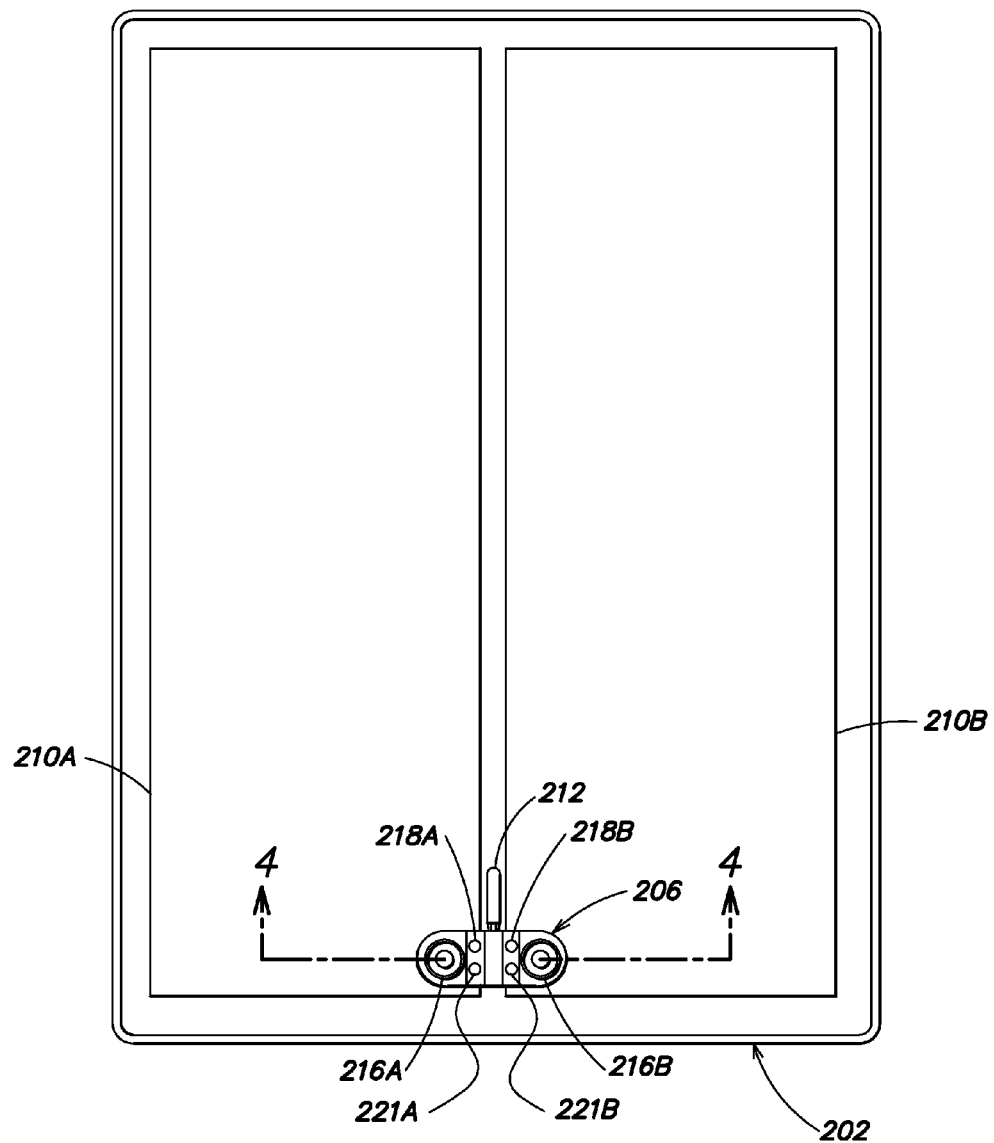
FIG. 3 illustrates a plan view of the system and inflatable device of FIG. 2.

FIG. 3 illustrates a plan view of the inflatable device 202 of FIG. 2. According to one embodiment, the inflatable device 202 is a mattress suitable for sleeping two users. In one embodiment, the pressure controller 206 is located at one end of the inflatable device 202, for example, a foot of the inflatable device 202. FIG. 3 illustrates a first valve 216A that fluidly couples the pressure controller 206 to the first chamber 210A, and a second valve 216B that fluidly couples the pressure controller to the second chamber 210B.

The pressure controller 206 can include a first pressure sensor 218A to measure the pressure in the first chamber 210A, a second pressure sensor 218B to measure the pressure in the second chamber 210B, a first temperature sensor 221A to measure the temperature in the first chamber 210A, and a second temperature sensor 221B to measure the temperature in the second chamber 210B. In one embodiment, a fluid conduit 212 connects the pressure controller 206 to the pump (e.g., the pump 208). According to one or more alternate embodiments, the pressure sensors (e.g., the pressure sensors 218A, 218B) and the temperature sensors (e.g., the temperature sensors 221A, 221B) are at another location of the inflatable device 202, i.e., the pressure sensors and temperature sensors are not located in the pressure controller 206. For example, in one embodiment, the pressure sensors may be located in a fluid conduit that fluidly couples the pressure controller and the chamber.

Figure 4:
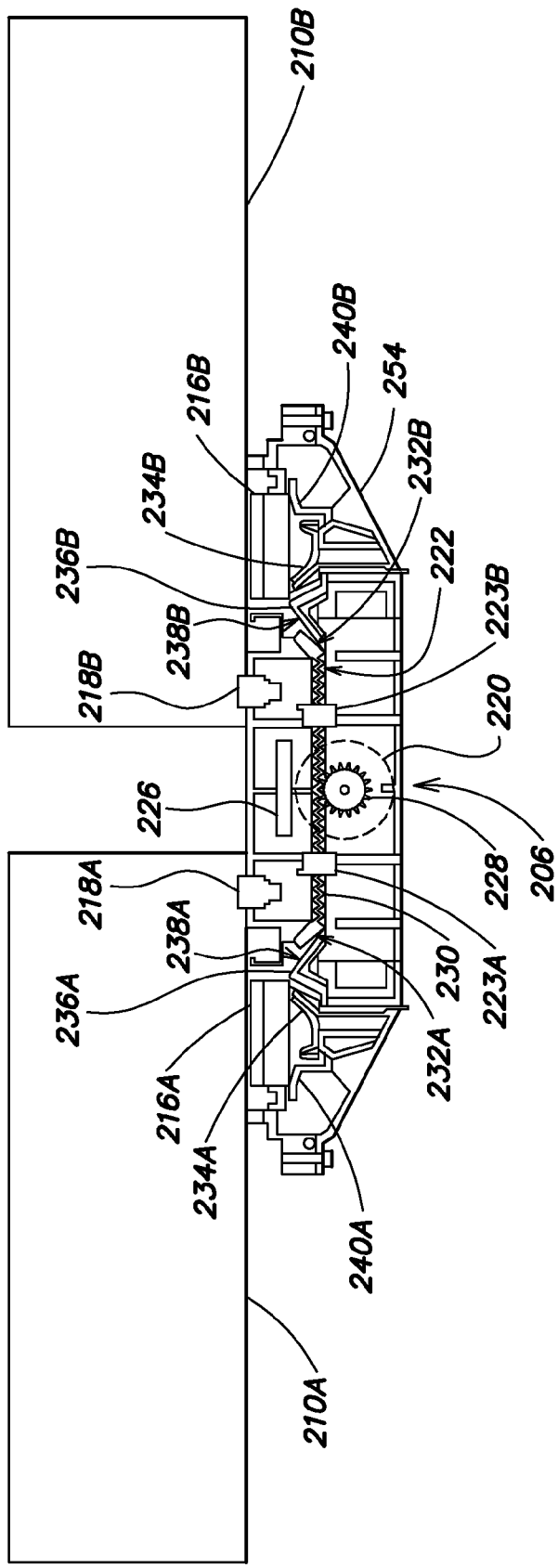
FIG. 4 illustrates a cross-section of the pressure controller in FIG. 3 in accordance with an embodiment of the invention.

FIG. 4 illustrates a cross section 4-4 of the pressure controller 206 of FIG. 3. In addition to the first valve 216A, the second valve 216B, the first pressure sensor 218A, and the second pressure sensor 218B, according to one embodiment, the pressure controller 206 also includes a valve operator 220 shown in phantom (e.g., a motor, a solenoid, etc.), a mechanical coupling 222 to connect the valve operator 220 to each valve 216A, 216B, a gear 228 (e.g., a toothed gear) to connect the valve operator 220 to the mechanical coupling 222, a first position sensor 223A, a second position sensor 223B, and electronic circuitry 226. In one embodiment, the pressure controller 206 includes a housing 254. In a version of this embodiment, the mechanical coupling 222, the valve operator 220, the gear 228, and the electronic circuitry 226 are included in the housing 254.

The valve operator 220 may be any device that provides a mechanical motion in response to the receipt of an electronic/electrical signal where the mechanical motion can be used to open and/or close a valve. Thus, the valve operator 220 may be a motor, a solenoid, a relay and the like. Embodiments of the valve operator 220 may be electrical or electronic devices that are controlled by analog circuitry, digital circuitry or a combination of analog and digital circuitry.

According to one embodiment, the mechanical coupling is a rod that includes a serrated surface 230 configured to engage the gear 228, a first engagement surface 232A to engage the first valve 216A, and a second engagement surface 232B to engage the second valve 216B. In one embodiment, each valve 216A, 216B includes a diaphragm (234A, 234B, respectively), an overseal (236A, 236B, respectively), a contact surface (contact surface 238A, 238B, respectively) and a valve housing (240A, 240B, respectively).

In operation, the valve operator 220 operates in response to a signal indicating that a change in pressure is desired, for example, the user has requested a change in pressure in one of the chambers 210A, 210B. In general, the motion of the valve operator 220 is transferred to the mechanical coupling 222 (e.g., a plunger) which is displaced such that the engagement surface (e.g., 232B) of the mechanical coupling engages the contact surface (e.g., 238A) of the valve associated with the selected chamber. Thus, the valve is operated to provide for an adjustment of the pressure in the selected chamber. To decrease the pressure in the chamber the valve is opened and the pump remains off (or, operates to forcibly withdraw air from the chamber) so that fluid exhausts from the chamber (e.g., the chamber 210A) via the valve (e.g., the valve 216A). Conversely, to increase the pressure in the chamber the valve is opened and the pump is turned on to move fluid (e.g., air) into the chamber via the valve.

According to one embodiment, the fluid exhausts from the chamber into the pressure controller 206 where it may be released to atmosphere. In one embodiment, the fluid is released to atmosphere via the pump 208, for example, when the pump is off.

Figure 5:
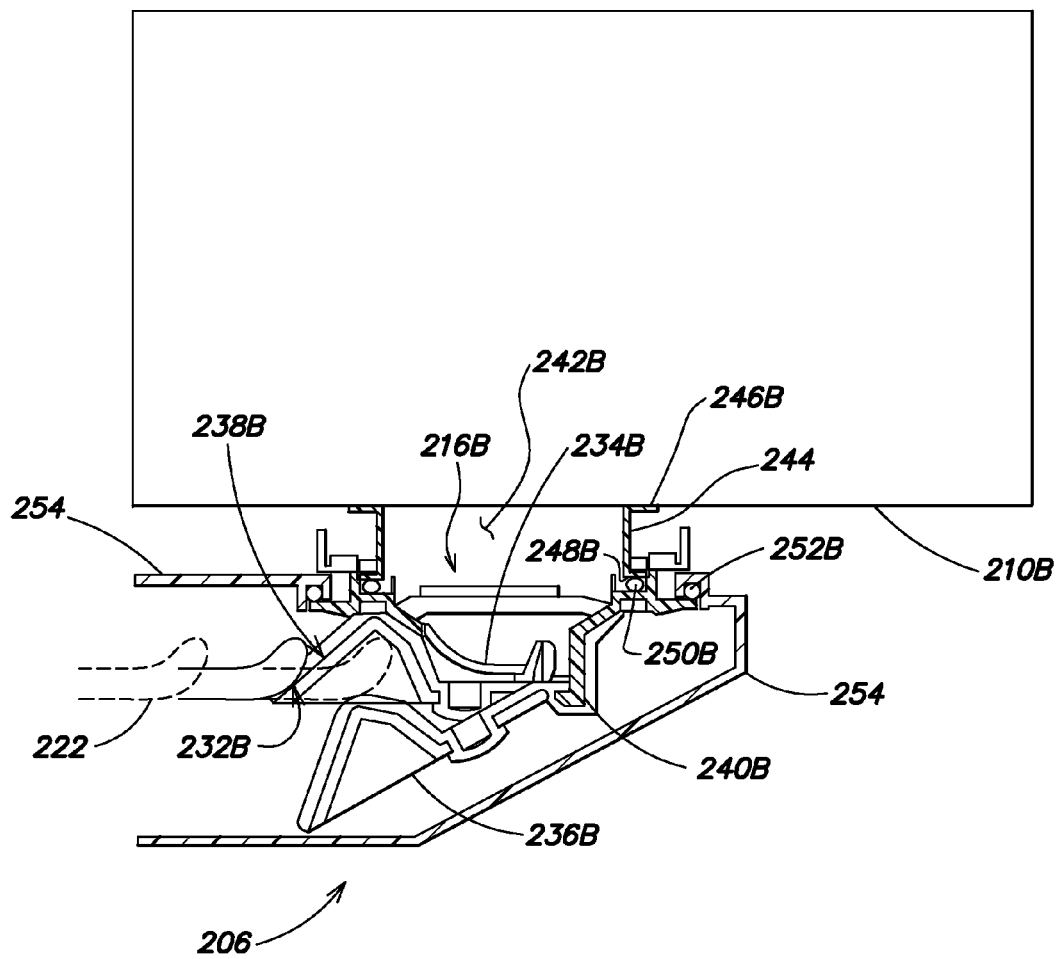
FIG. 5 illustrates a partial view of the cross-section of FIG. 4.

Referring now to FIG. 5, a more detailed view of the portion of the pressure controller 206 including the valve 216B is shown. In one embodiment, the chamber 210B includes an opening 242B that allows the pressure controller 206 to be fluidly coupled to the chamber 210B via the valve 216B. In a version of this embodiment, the fluid path between the pressure controller 206 and the chamber 210B includes a neck 244B. According to one embodiment, a first flange 246B is located at a first end of the neck 244 proximate to the opening 242, and a second flange 248B located at a second end of the neck 244 that engages the valve housing 240. In a version of this embodiment, the first flange 246B is RF welded to an outer surface of the chamber 210B. In one embodiment, the valve 216B includes at least one seal 250B that provides a fluid-tight seal between the valve housing 240 and the second flange 248B. In a further embodiment, the valve 216B includes a second seal 252B that provides a fluid tight seal between the valve housing 240B and the housing 254 of the pressure controller 206.

The pressure controller 206 of FIG. 5 is shown with the mechanical coupling 222 in three positions. First, the mechanical coupling 222 is shown in a neutral position where the engagement surface 232B of the mechanical coupling 222 and the contact surface 238B of the valve 216B are proximate one another but the mechanical coupling 222 is not applying any pressure to open to the valve. With the mechanical coupling 222 in the neutral position, the engagement surface 232A of the mechanical coupling 222 and the contact surface 238A of the valve 216A are also proximate one another. In addition, with the mechanical coupling 222 in the neutral position, the overseals 236A, 236B are engaged with the corresponding valve housing 240A, 240B, respectively. As a result, the pressure in the chambers 210A, 210B remains unchanged when the mechanical coupling 222 is in the neutral position. Second, the mechanical coupling 222 is shown in phantom in a second position where the mechanical coupling has moved laterally to the right as a result of the operation of the valve operator 220. As a result, the engagement surface 232B is moved into contact with the contact surface 238B to disengage the overseal 236B from the valve housing 240B to allow for an adjustment of the pressure in the chamber 210B. In addition, with the mechanical coupling 222 in the second position, the engagement surface 232A of the mechanical coupling 222 and the contact surface 238A of the valve 216A are no longer proximate.

In general, the valve 216A has the same overall structure as described above for the valve 216B. Therefore, in a third position, with the mechanical coupling 222 shifted laterally to the left (as shown in phantom), the engagement surface 232A is moved into contact with the contact surface 238A to disengage the overseal 236A from the valve housing 240A and allow for an adjustment of the pressure in the chamber 210A.

It can be seen from the preceding that, in at least one embodiment, the valve operator 220 operates both valves 216A, 216B. In addition, however, it should be appreciated that the valve operator 220 and the mechanical coupling 222 can be employed to provide a range of motion that can be applied to operate the valves 216A, 216B. That is, the valve operator 220 may be employed to operate the valves 216A, 216B in one or more positions between a fully opened position and a fully closed position. For example, in one embodiment, the valve operator 220 is a motor (e.g., a stepper motor) that provides a rotational motion to the gear 228 that is transferred to a linear motion of the mechanical coupling 222. In this embodiment, the rotational motion may be incrementally controlled so that the corresponding linear motion of the mechanical coupling 222 is also incrementally controlled. As a result, at a first stage of operation, the mechanical coupling travels a first distance that is sufficient to open the overseal (e.g., the overseal 236B) of the valve (e.g., the valve 216B) while the diaphragm (e.g., the diaphragm 234B) remains closed. At a second stage of operation, following additional rotation (e.g., clockwise rotation) of the valve operator 220, the mechanical coupling 222 travels a second distance that is sufficient to open the diaphragm (e.g., the diaphragm 234B) with the overseal (e.g., the overseal 236B) remaining open.

According to one embodiment, the first stage of operation is employed in combination with the operation of the pump 208 that is turned on to inflate the chamber (e.g., the chamber 210B). That is, the fluid pressure provided by the pump 208 forces the diaphragm to open inward into the chamber to allow the chamber to inflate. In a version of this embodiment, the pump 208 remains off in the second stage of operation and the chamber (e.g., the chamber 210B) deflates when the diaphragm is opened by the mechanical coupling 222.

As is discussed in greater detail below, the position sensors 223A, 223B may be employed to monitor the position of the mechanical coupling 222 and provide signals to the electronic circuitry 226 indicative of the stage of operation of the valves 216A, 216B.

The above embodiments may employ a variety of valve operators 220 to produce an incrementally controlled motion of each valve. For example, a solenoid-type valve operator may be employed where the motion of the plunger is controlled incrementally through a plurality of positions including a fully open position wherein the overseal and the diaphragm of a valve are open.

It is to be appreciated that one or both of the gear 228 and the mechanical coupling 222 need not be used with the pressure controller 206. Instead, in various embodiments, the valve operator 220 is directly connected to one or more valves so that the motion of the valve operator 220 is transmitted directly to one or more valves operated by the pressure controller 206 without the aid of any intermediate mechanical devices. In addition, a plurality of valve operators may be used with the pressure controller 206, for example, where each valve operator operates a single valve.

According to one embodiment, the operation of the valve operator 220 is controlled with the electronic circuitry 226. The electronic circuitry 226 can include analog circuits, digital circuits or a combination of analog and digital circuits. The electronic circuitry may include hardware, software, firmware or a combination of the preceding. The electronic circuitry 226 may, for example, include a processor such as a microcontroller and memory and/or other components that provide logic and other apparatus for storing and executing instructions concerning the operation of the pressure controller 206. The electronic circuitry 226 or elements of the electronic circuitry can be included on a printed circuit ("PC") board or a plurality of PC boards.

In various embodiments, the electronic circuitry 226 is connected to one or more of the devices included in the pressure controller 206. For example, one or more of the valve operator 220, the position sensors 223A, 223B, the pressure sensors 218A, 218B, and the temperature sensors 221A, 221B can be connected to the electronic circuitry 226. According to one embodiment, the pressure sensors 218A, 218B are integral to separate PC boards located within the pressure controller 206.

It is to be recognized that the electronic circuitry 226 may include communication circuitry employed to facilitate communication between the pressure controller 206 and the control device 104. For example, the electronic circuitry 226 may include a receiver to receive signals from the control device 104. In other embodiments, the electronic circuitry 226 may include a transceiver to allow for bi-directional communication between the control device 104 and the pressure controller 206. In one embodiment, the control device 104 is hardwire connected with the electronic circuitry 226. According to another embodiment, wireless communication occurs between the control device 104 and the pressure controller 206 and the electronic circuitry 226 includes a wireless transceiver.

As mentioned above, the control device 104 may be remote from the inflatable device 202. The control device 104 communicates information to the pressure controller 206 concerning the pressure and/or posture desired by the user for the inflatable device 202. According to one embodiment, the control device 104 is sized and adapted to be a hand held control device. In a version of this embodiment, the control device 104 is a wireless control device.

Figure 6C:
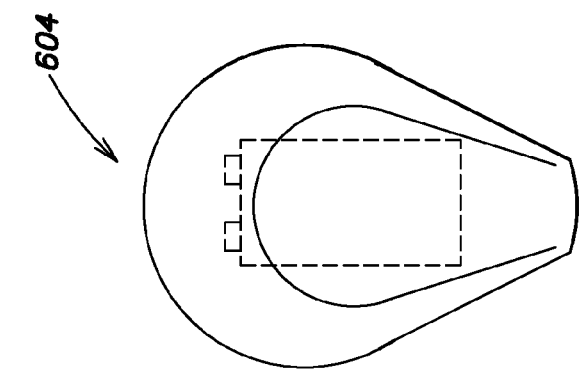
FIGS. 6A-6C illustrate a control device according to an embodiment of the invention.
Figure 6B:
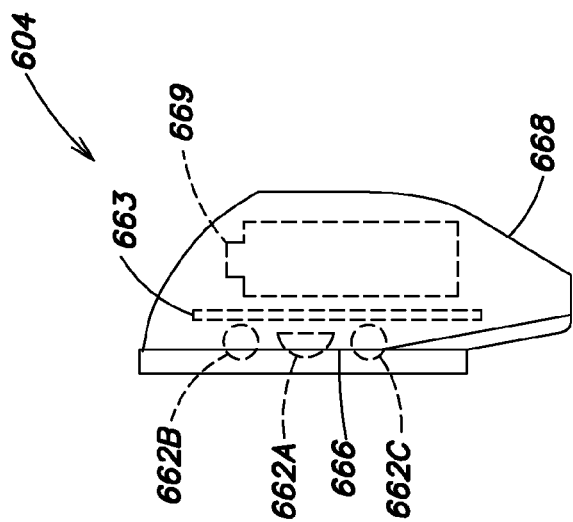
Figure 6A:
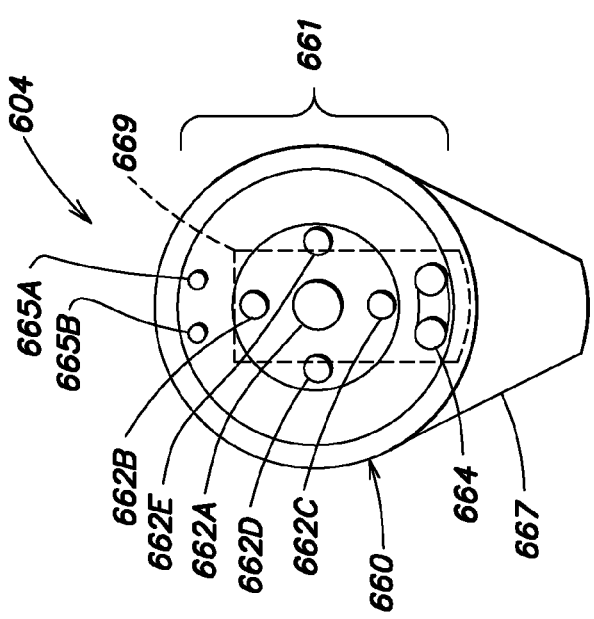

An embodiment of the control device is illustrated in FIGS. 6A-6C. The control device 104 includes a housing 604, a user interface 661, a power source 669 (e.g., a 9 volt battery), and electronic circuitry 663. According to one embodiment, the user interface 661 includes a plurality of control elements 662, a selector 664, and one or more indicating lights 665. In a version of this embodiment, the selector 664 allows the user to choose the chamber (e.g., the chambers 210A, 210B) whose pressure is to be adjusted from among a plurality of chambers included in the inflatable device. The control elements 662 can be employed by the user to set the pressure in the selected chamber of the inflatable device 202.

According to one embodiment, the housing 660 includes a tapered section 667 and a concave section 668. Further, the housing 660 may be sized and adapted to conform to a hand of the user. In various embodiments, the control device is sized and adapted to be a hand held control device. According to one embodiment the control device has a maximum diameter of 2.5 inches. In a version of this embodiment, the control device has a diameter of 2.4 inches.

In one embodiment, the user interface 661 is a touch screen with a display that is responsive to a user locating their fingertip in the vicinity of a selected control element displayed in the interface. In another embodiment, where the control elements 662 are discrete items, the user interface 661 is adapted to provide a substantially solid surface that includes one or more openings through which the plurality of control elements located beneath the surface may extend for access by the user. For example, referring to FIG. 6B, the control elements 662A, 662B, and 662C may be raised above a surface 666 of the user interface 661. In yet another embodiment, the user interface 661 provides a substantially solid surface that is flexible and may flex in response to pressure applied by the user in the direction of the interior of the housing. In this embodiment, the surface 666 of the user interface 661 includes an indication of the location of each control element. In a version of this embodiment, the user selects a control element from among the plurality of control elements 662 by applying pressure on the surface in the vicinity of control element, e.g., control element 662A.

According to one embodiment, the user interface 661 includes a first control element 662A that is employed by the user to establish a control setting associated with a preferred pressure setting of the inflatable device, a second control element 662B to increase the pressure in the inflatable device, a third control element 662C to decrease the pressure in the inflatable device, a fourth control element 662D to decrease the pressure in the inflatable device to one or more established pressures, and a fifth control element 662E to increase the pressure in the inflatable device to one or more established pressures. In one embodiment, the control elements 662D and 662E provide fixed increments of pressure adjustment.

In one embodiment, the first control element 662A is located in a central location in the user interface 661 and the indicating lights 665A, 665B are located radially outward from the first control element 662A at approximately 12 o'clock, using a clock face as a positional reference. Applying the same reference, the second control element 662B is located at approximately 12 o'clock on the user interface radially inward relative to the indicating lights, the third control element 662C is located at approximately 6 o'clock on the user interface, the fourth control element 662D is located at approximately 9 o'clock on the user interface, and the fifth control element 662E is located at approximately 3 o'clock on the user interface 661. In a version of this embodiment where the control device 604 is employed to set the pressure in a plurality of chambers of the inflatable device, the selector 664 is located at approximately 6 o'clock radially outward of the third control element 662C.

According to one embodiment, the control elements 662 are located within the user interface 661 to provide the user with a known, repeatable, and easy to use approach to controlling the pressure in the inflatable device. As will be recognized by those of ordinary skill in the art, however, the control elements 662 can be located in the user interface 661 in any of a variety of locations and in a variety of manners including locations that provide a different spatial relationship between the plurality of control elements 662.

In various embodiments, the control device 604 provides the user with a convenient and easy to use approach to set a preferred pressure setting and return to it. In one embodiment, the user selects the first control element 662A once, for example, by pressing and holding the control element to establish a preferred pressure setting corresponding to a preferred pressure for the inflatable device. Once the preferred pressure is initially established, the user may later select (e.g., momentarily select) the first control element 662A to return to the preferred pressure from any other pressure. For example, the user can return to the preferred pressure after the inflatable device has been used by another user who has adjusted the pressure.

According to one embodiment, the second control element 662B and the third control element 662C allow the user to adjust the pressure in the inflatable device 202 within a continuous range of control. For example, the pressure adjustment provided by the second control and third elements may allow the user to raise and lower the pressure between 0 psi (completely deflated) and an established maximum pressure for the inflatable device 202. In other words, the system does not require that the user adjust the pressure in the inflatable device in fixed increments or steps.

In various embodiments, the system also provides the user with an ability to easily establish a control setting corresponding to the pressure that they prefer. More specifically, the control device 604 allows the user to establish the control setting without any knowledge of the quantitative pressure level and without reference to any other pressure levels. For example, while the user employs the inflatable device 202 (e.g., lies on an inflatable mattress) he or she can adjust the pressure in the inflatable device using the second, third, fourth and/or fifth control elements. When the adjustment is complete and the user determines that the inflation is at a level that they desire, they may simply select the first control element for a previously established minimum amount of time (e.g., press and hold) to establish a control setting corresponding to the then current pressure level. The control setting is stored in memory either in the control device or the pressure controller. The user can later re-establish the desired pressure in the inflatable device by momentarily selecting the first control element. Once selected, the control setting is provided to the pressure controller (e.g., the pressure controller 206) and the desired pressure is re-established in the inflatable device (or in the selected chamber, where the inflatable device includes a plurality of chambers).

In some embodiments, the control device 604 provides an interface that allows the user to adjust the pressure level in the inflatable device using an approach that is clear even where the user interface does not include indicia. In one embodiment, the control elements do not include any indicia, for example, the control elements are unmarked. That is, as described above, the user's tactile sensation concerning the inflatable device may be the only information that is required for the user to establish the control setting corresponding to their desired pressure. For example, the control device 604 may, but need not, include an indication of the pressure, for example, a pressure gauge that displays the pressure in the inflatable device or an indication of the pressure relative to a reference pressure (e.g., a pressure scale from 1-10). In a further embodiment, the locations of the control elements are marked but the control elements are otherwise unlabeled.

Further, embodiments of the control device need not include a pre-defined plurality of discrete control settings in order for the user to establish the desired pressure level and corresponding control setting. Thus, according to one embodiment, the control device 604 can include a user interface 661 with no indicia or other markings. For example, the control elements 662 may be directly accessible because they protrude through a surface of the user interface (e.g., a faceplate) or they are located beneath a transparent surface of the user interface. In another embodiment, the control elements themselves are not visible, but the regions of the user interface where the control elements are located are contoured, i.e., raised or lowered relative to the other regions of the user interface.

According to one embodiment, the second control element 662B and the third control element 662C can be employed by the user for posture control. Posture control allows the user to adjust the position of the inflatable device via the rapid increase or decrease of the pressure in the inflatable device. For example, posture control may allow the user to adjust an inflatable device from a first configuration in which it is employed as a mattress (e.g., it provides a substantially horizontal surface on which the user reclines) and a second configuration in which the inflatable device includes a vertical backrest, for example, a chair. Thus, posture control may allow the inflatable device to be rapidly converted between the first configuration and the second configuration.

In one or more embodiments, posture control requires the rapid movement of substantial volumes of fluid, for example air, to adjust the inflatable device between the first configuration and the second configuration while the user is employing the inflatable device. That is, the user may desire to move from a seated position to a fully reclined position or visa versa. Embodiments of the invention allow the rapid postural control of the inflatable device, at least in part, because the pump (e.g., the pump 208) is designed to rapidly move large volumes of air at a relatively low pressure, for example, at less than one PSI.

According to one embodiment, the control device also includes one or more pressure settings corresponding to pressure settings pre-set at, for example, the time of the manufacture of the system. These pre-set pressure settings may be established because, for example, it corresponds to a pressure in the inflatable device that is commonly employed by users or is a moderate pressure that is located approximately in the middle of a pressure range most commonly preferred by users of the inflatable device.

According to one embodiment, the fourth control element 662D and the fifth control element 662E can provide control settings that are preset by the supplier/manufacturer of the inflatable device. In one embodiment, the fourth control element 662D provides a factory preset firm setting (e.g., a manufacture's setting) when it is selected once and a factory preset extra-firm setting when it is selected twice, for example, twice in rapid succession (i.e., with a minimal time delay). In a version of this embodiment, the fifth control element 662E also provides one or more factory preset settings, for example, a soft setting when it is selected once and a super-soft setting when it is selected twice. As will be recognized by those of skill in the art, the control elements 662 may provide any number of preset control settings from one setting to any of a plurality of settings.

In one embodiment, the settings provided by the fourth and fifth control elements 662D, 662E provide settings that correspond to pressure settings a fixed amount greater than (firm, extra-firm) or less than (soft, extra-soft) the setting established by the user with the control element 662A (e.g., the firm, extra-firm, soft and extra-soft settings are relative to a "home" setting). In one embodiment, the actual pressures corresponding to the extra-firm, firm, soft and extra-soft settings are not established until the user establishes a preferred setting using the control element 662A.

In accordance with one embodiment, a user may automatically establish a plurality of control settings (e.g., pressure settings) once a first pressure is established. In one embodiment, the first pressure is the pressure preferred by the user. Further, the user may establish the pressure based on the preferred firmness of the inflatable device and without knowledge of an actual pressure value. Thus, the user may adjust the pressure in the inflatable device to establish a suitable comfort level where the pressure has a first value, for example, 0.3 psi. A first control setting corresponding to the pressure is established by the user with the control device 604, for example, by depressing or otherwise selecting a control element (e.g., the control element 662E). The setting may be stored in memory and may be stored as an actual pressure value or some other information (such as a number associated with the pressure value) that will allow the system to return the pressure in the chamber to that preferred by the user.

The system may automatically establish, a second setting that corresponds to a second pressure having a second value once the first setting is established. In accordance with one embodiment, the second value has a difference from the first value by a predetermined amount, for example, 0.05 psi. The second setting may correspond to a pressure that is either greater than or less than the pressure associated with the first setting. Accordingly, in the preceding example the difference may be +0.05 psi or −0.05 psi. In further embodiments, a plurality of additional control settings may be automatically established by the system once the first setting is established. For example, a third setting may be automatically established with the control device 604 where the third setting corresponds to a third pressure having a third value that differs from the first value by a predetermined amount. That is, in one embodiment, difference between the value of the first pressure and the value of the third pressure is negative 0.05 psi relative to the first value. In the preceding embodiment, each of the differences in pressure values is equal, however, other embodiments may employ a "difference-scale" that is graduated such that the difference in values between adjacent pressure settings increases (or decreases) as the values move away from the value of the first pressure.

In the immediately preceding example, the second value and the third value are established relative to the first value. Alternatively, a series of control settings may be established and include control settings that are referenced to pressure setting in the series other than the first setting that is established. For example, the settings may be established with reference to the value of the immediately preceding setting in the series. In one example, a pressure difference of 0.01 psi is established as the desired difference in the pressure associated with adjacent control settings. Thus, if the first setting corresponds to a pressure of 0.3 psi, the second setting may correspond to 0.31 psi, the third setting may correspond to 0.32 psi, etc. Further, as described above, control settings associated with pressures greater than or less than the pressure associated with the first setting may be automatically established. Thus, referring back to the preceding example, a fourth setting may correspond to 0.29 psi, a fifth setting may correspond to 0.28 psi, etc.

In one or more alternate embodiments, one or more of the control elements 662 include indicia. In another embodiment, the control device includes a pressure indicator that can, for example, display the pressure in each of the chambers included in the inflatable device.

The selector 664 allows the user to choose which of the plurality of chambers (e.g., the chambers 210A, 210B) of the inflatable device in which they will adjust the pressure. According to one embodiment, the selector is a switch operable between a plurality of switch positions, for example, a slide switch that can be moved to a left position or a right position to select the left chamber 210A and the right chamber 210B, respectively. Any other type of electromechanical or solid state switch, such as a rocker switch, can also be used.

According to one embodiment, the control device 604 includes one or more indicating lights where each indicating light 665A, 665B corresponds to a chamber of the inflatable device, e.g., chambers 210A, 210B, respectively. For example, where the left chamber is selected with the selector switch, the left indicating light is on and where the right chamber is selected the right light is on. The indicating lights may be a LED, an incandescent lamp, or any other light source.

Figure 22:
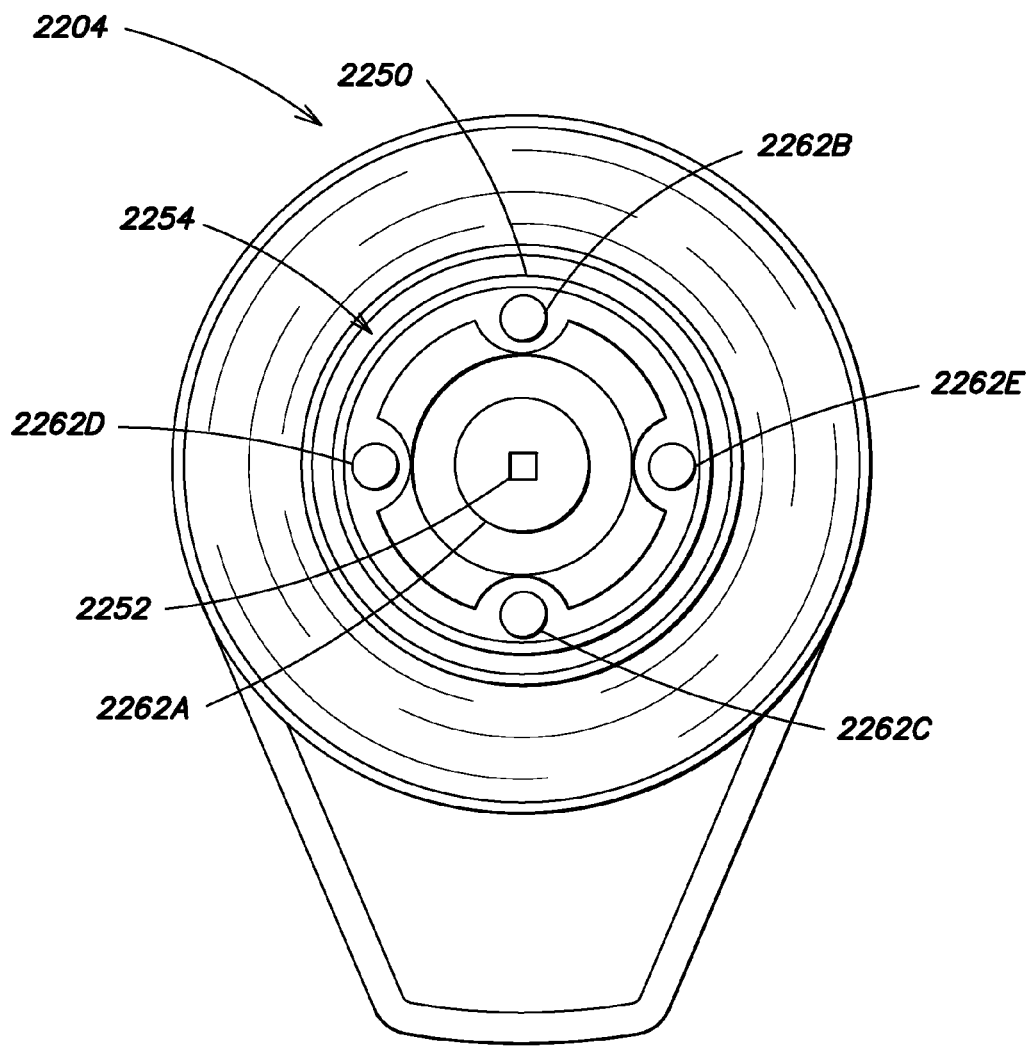
FIG. 22 illustrates a control device in accordance with another embodiment of the invention.

FIG. 22 illustrates another embodiment of a control device 2204. According to one embodiment, a surface 2250 includes a contoured, translucent flexible surface that covers the control elements 2262. In one embodiment, the control elements provide a variety of control features that allow a user to adjust the firmness of an inflatable device by activating each control element in a plurality of operations. For example, one or more of the control elements can may provide a different operation when activated in each of the following manners: the control element can provide a first operation when tapped; a second operation when tapped twice; a third operation when pressed and held; and a fourth operation when first being tapped, and then pressed and held. The preceding methodology can provide an even wider variety of operations by employing different but similar variants. For example, a different operation may correspond to each of a different quantity of taps (i.e., 3, 4, etc.) or if a different sequence of the same steps are employed. That is, a first operation may results when a control element is tapped, pressed and held while a second operation may result when the same control element is pressed and held for a minimum amount of time and is then tapped.

In one embodiment, a first selection (e.g., a tap or other activation) of a control element begins a continuous pressure adjustment either up or down until the control element is selected again. That is, the control element provide an on/off feature for firmness adjustment.

According to one embodiment, the control device 2204 has two general operating modes: a first "factory preset" mode that allows the user to select inflation levels that correspond to pressures/firmness that is established, for example, at the time of manufacture and/or at the point of sale; and, a "custom" mode that allows the user to establish a wide variety of pressure/firmness settings that are selected based on the tactile feel of the inflatable device to the user. In one embodiment, 200 different pressure/firmness settings are available.

Referring to the illustrated embodiment shown in FIG. 22, the control element 2262A can provide the user with an ability to: establish a custom "home" firmness that corresponds to a pressure/firmness preferred by the user; return the pressure/firmness to a factory preset "medium" pressure; set a new home pressure/firmness; and initiate a reference check. In one embodiment, activation of the reference check results in an operation of the pressure controller that adjusts the firmness of the inflatable device to a known reference firmness (for example, the mid-range or medium firmness selected from the factory preset settings), holds the firmness steady at the known reference firmness, and then automatically returns the firmness to the level that immediately preceded the reference check. In a version of this embodiment, the firmness is returned to the "pre-reference check" level after a pre-defined period of time (e.g., 5, 8, or 10 seconds, etc.).

According to one embodiment, the control device operates in the factory preset mode after the factory preset medium pressure is selected and operates in the custom mode following selection of the custom "home" firmness.

The control element 2262B can provide the following functions: increasing the firmness up to a maximum provided by the pressure controller; storing a custom home position to memory; and providing a momentary function switch that provides a continuous increase in firmness so long as the control element remains activated (e.g., depressed). The control element 2262C can provide the following functions: decreasing the firmness to a minimum provided by the pressure controller; adjusting the firmness to the previous setting; providing a momentary function switch to provide a continuous decrease so long as the control element remains activated;

and controlling a light source that may illuminate a region of the user interface. Similarly, the control element 2262D can provide the following functions: an incremental decrease of the firmness (i.e., a step adjustment) of the inflatable device to a "semi-soft" level of firmness; an incremental decrease of the firmness (i.e., another step adjustment) of the inflatable device to a "soft" level of firmness; access to historical information concerning past firmness settings, for example, access to previous "home" firmness settings; and initiation of a reference check. Similarly, the control element 2262E can provide the following functions: an incremental firmness increase (i.e., yet another step adjustment) to a "semi-firm" level of firmness; an incremental firmness increase (i.e., still another step adjustment) to a "firm" level of firmness; access to historical information concerning past firmness settings; and initiation of a reference check.

In various embodiments, the control elements 2262 are elements (e.g., buttons) that are activated when they are depressed. In one embodiment, the center of region 2254 can be depressed axially inward to activate the control element 2262A and "rocked" in anyone of four directions to activate the control elements 2262B, 2262C, 2262D, and 2262E, respectively.

According to one embodiment, the user interface includes a light source 2252 that may illuminate the user interface or a portion thereof. For example, in one embodiment, the user interface includes a region 2254 beneath which the control elements 2262 are located. The region or portions thereof may be transparent, translucent or otherwise configured to transmit light generated by the light source 2252. The light source may be an LED, incandescent lamp or other light source that is sized and adapted for inclusion in the hand held control device 2204. The light source 2252 may be controlled by an electronic controller (e.g., a processor) located in the control device 2204. According to one embodiment, an intensity of the light source 2252 is controlled. For example, the intensity of the light source 2252 may be periodically adjusted to provide a soothing effect on the user of the inflatable device. That is, in one embodiment, the intensity of the light source 2252 is adjusted to create a beat or rhythmic variance in the intensity of the light source from a relatively lower level of intensity to a relatively higher level of intensity and back. According to one embodiment, one or more control elements 2262 can be employed to adjust the minimum and maximum intensity levels, a steady state intensity level, the beat or frequency and other operational characteristics of the light source 2252. In one version, the light source 2252 is controlled to generate a slow pulse of varying light intensity, for example, the light source completes a cycle of varying light intensity in approximately 4 seconds.

In addition, the light source 2252 may be used to illuminate the control elements 2262 so that the user can locate the control elements regardless of whether they are marked and regardless of an ambient light level where the control device 2204 is used. For example, where the control elements 2262 are located beneath a translucent face of the user interface, the light source may also be located beneath the translucent face. In one version, the light source is centrally located in the user interface and may be co-located with a control element 2262, e.g., beneath the control element 2262A.

In various embodiments, the light source 2252 may be employed to provide information to the user. For example, the light source 2252 may communicate information concerning the current firmness/pressure setting of the inflatable device. In one embodiment, the light source maintains a continuous beat of varying intensity when the inflatable device is in the current home position. The light source 2252 may provide feedback concerning a user's firmness selection. For example, the light source 2252 may blink once for each tap applied to a control element by the user. Further, the light source may change in intensity over a first period (i.e., have a first beat) when the control device 2204 is in the factory preset mode and change in intensity over a second period (i.e., have a second beat) when the control device is in the custom mode.

Figure 7:
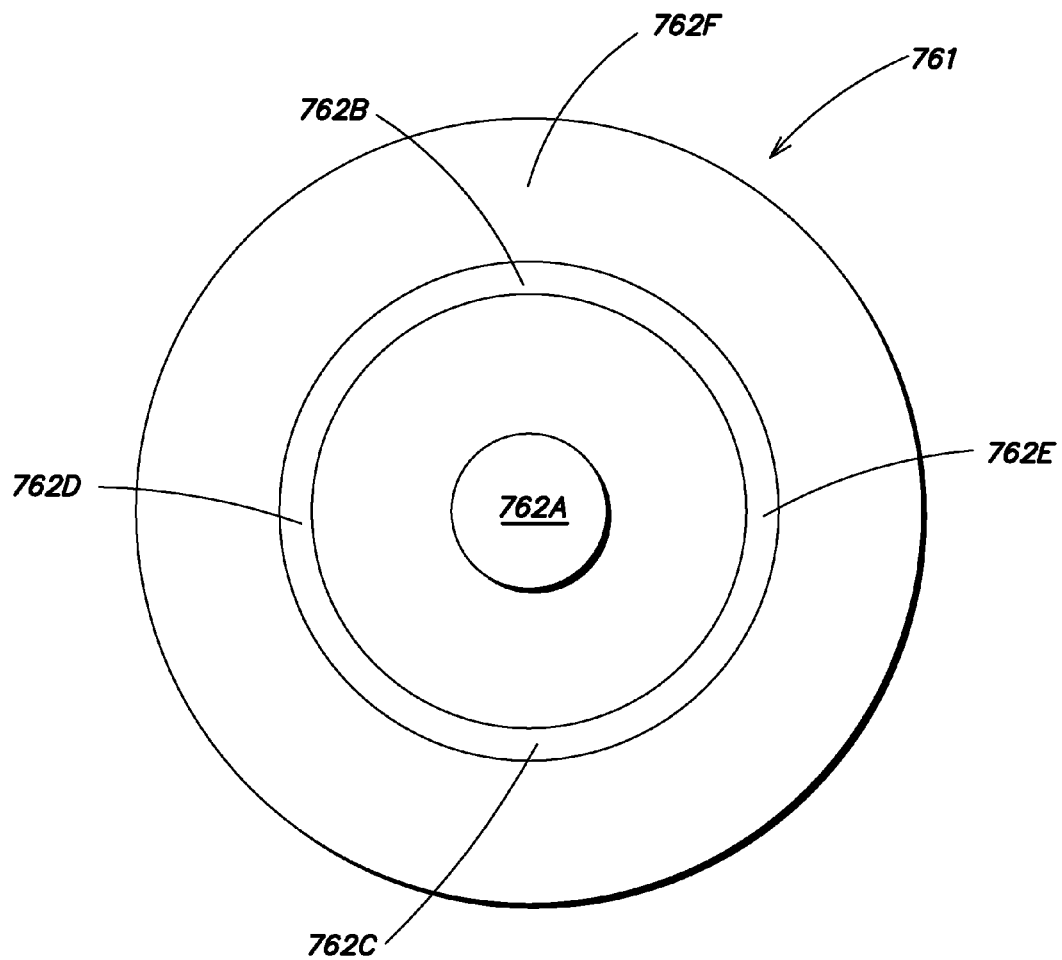
FIG. 7 illustrates a user interface according to an embodiment of the invention.

FIG. 7 illustrates another embodiment of a user interface 761 for a control device (e.g., the control device 604). The user interface 761 includes a plurality of control elements 762A, 762B, 762C, 762D, 762E and 762F. Here, according to one embodiment, the user interface 761 does not include any indicia or other markings. For example, the user may select a first control element 762A to establish a control setting corresponding to a preferred pressure of the inflatable device. The user may learn of the action required to make the selection (e.g., pressing, pressing and holding, toggling between positions, simultaneously pressing multiple control elements, etc.) at the time they first use the control device 604. For example, the inflatable device may include instructions concerning the operation of the control device 604. As previously described concerning the user interface 661, the user's selection may be made simply by pressing or tapping the first control element 762A once. Regardless of the required action, however, in one embodiment, the user may establish the control setting corresponding to the preferred pressure setting of the inflatable device based only on the user interacting with the inflatable device, e.g., based on the user's tactile senses. Thus, the user selects the preferred pressure without any quantitative knowledge of the actual pressure of the inflatable device or any knowledge of the relative pressure of the inflatable device. For example, the user need not refer to a sequence of pre-defined pressure settings.

It should be recognized that embodiments of the invention may provide a user with a method of establishing a control setting corresponding to a "home-pressure" that may correspond to their preferred pressure setting (e.g., by selecting the control element 762A in a first predetermined manner) from which further adjustment of the pressure of the inflatable device may be made. It will also be recognized that once the "home-pressure" is established, the user may return to it from any other pressure by selecting the control element 762A in a second predetermined manner.

Further control of the pressure in the inflatable device may be provided by the control elements 762B, 762C, 762D, 762E as originally described with reference to the user interface 661 of FIG. 6. For example, the control element 762B may be used to increase the pressure in the inflatable device and the control element 762C may be used to decrease the pressure in the inflatable device. According to one embodiment, the control elements 762B and 762C each provide a continuous range of pressure control. In a version of this embodiment, the longer the control element 762B, 762C is held the greater the corresponding increase or decrease in pressure.

In an alternate embodiment, the control elements 762B and 762C each provide pressure adjustments in a plurality of discrete pressure-steps. That is, in this embodiment, the length of time for which a control element is selected is not determinative of the amount of the pressure change of the inflatable device—the control element must be selected to make a first pre-determined pressure adjustment and then de-selected before a further pressure change can be made using that control element.

The control elements 762D, 762E may also be employed to increase and decrease the pressure in the inflatable device in two or more predefined increments as previously described with reference to FIG. 6.

In addition, the user interface 761 includes a control element 762F that provides a predefined control setting corresponding to a predefined pressure setting.

In one embodiment, the predefined pressure setting and corresponding control setting are established by the manufacturer or distributor of the inflatable device. In a version of this embodiment, the control setting cannot be changed by the user.

Although not illustrated in FIG. 7, embodiments of the user interface 761 may be employed with a multi-chamber inflatable device (e.g., the inflatable device 202). In these embodiments, the user interface 761 may include a selector switch (e.g., the selector switch 664) by which the user may select the chamber for which a pressure adjustment is desired.

It will be recognized by those of ordinary skill in the art, that the locations of each of the plurality of control elements 662, 762 may be varied from the embodiments depicted in FIGS. 6 and 7, and may be anywhere on the user interface. For example, the control element 762A need not be centrally located in the user interface 761, and for example, may be located at 6 o'clock on the user interface 761 or somewhere else on the user interface. The remainder of the control elements may be similarly re-located provided that the established positions of the plurality of control elements 662, 762 are known by the user. Further, where the user interface 661, 761 includes an electronic display a plurality of control elements may appear at the same location in different screens of the display.

As mentioned above, the control device 104, 604 may employ wireless communication to communicate with the pressure controller 206. As will be recognized by those of ordinary skill in the art, other forms of communication may be supported by the control device 604. Further, electronic circuitry 663 included in the control device may include a receiver or transceiver for the transmission of information to the pressure controller 206.

According to one embodiment, any of the control settings established by the user with the control device (e.g., the control device 604) may be wirelessly-transmitted to the pressure controller 206. In general, the user selects the pressure (for example, based on their interaction with the inflatable device) that provides a high degree of comfort. Thus, information corresponding to the preferred pressure setting may be transmitted to the pressure controller 206. In addition, information concerning other requested pressure changes can also be wirelessly transmitted. This information may be, for example, a control setting established by the user which corresponds to the requested pressure. The control setting may be an actual pressure value or any other control signal from which the desired pressure or pressure adjustment may be determined by the pressure controller 206. The information transmitted from the control device (e.g., the control device 604) is processed by the electronic circuitry 226 of the pressure controller 206. In response to the information, the pressure controller may operate to adjust the pressure (if necessary) of the inflatable device 202.

In further embodiments, the above information transmission may occur via conductors (e.g., included in the tether 114) that connect the control device 604 to the pressure controller 206. Any of the above-described embodiments of the user interface 661, 761 and the control device 104, 604 may be employed in a wireless system or with hardwire communications.

Figure 8:
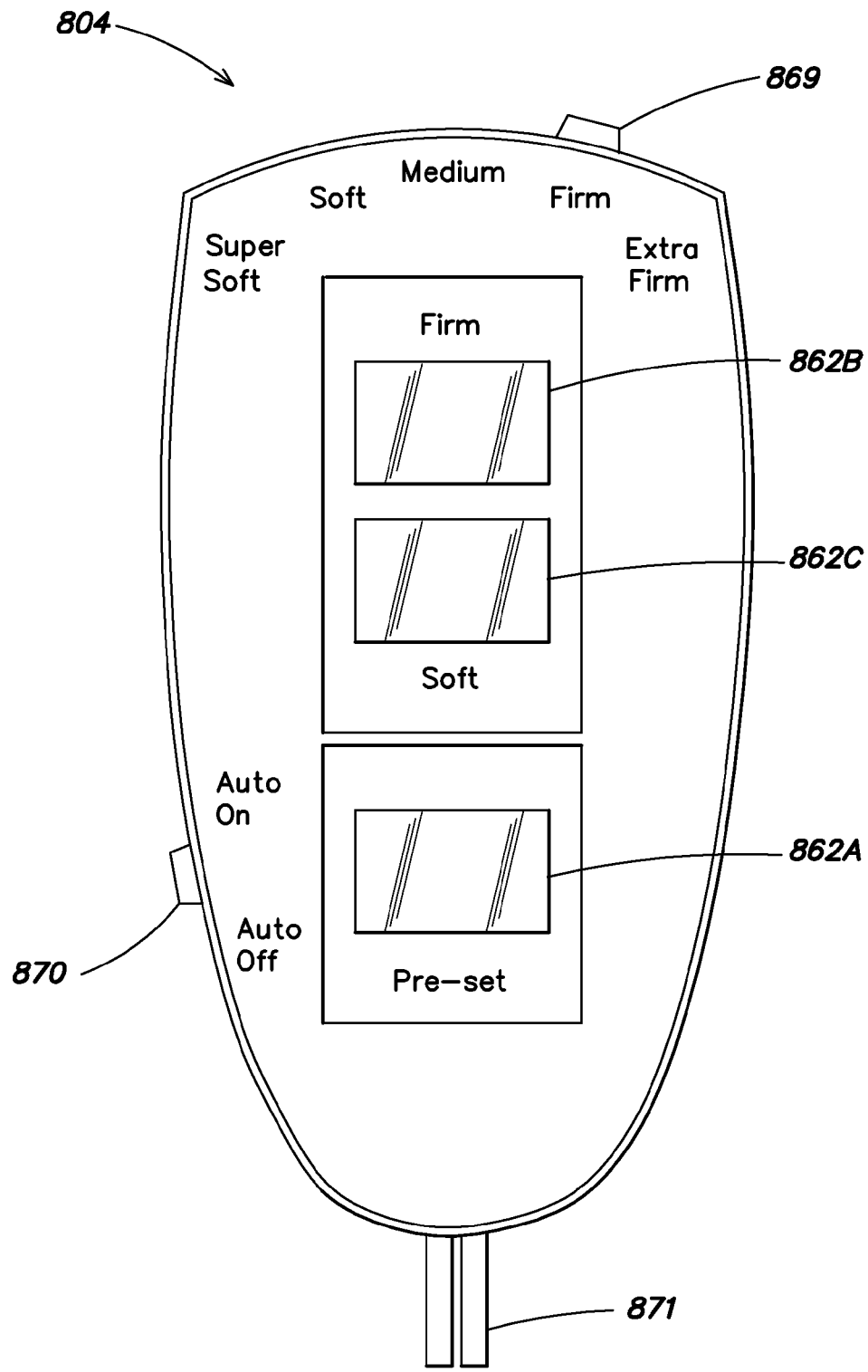
FIG. 8 illustrates a control device in accordance with another embodiment of the invention.

Referring now to FIG. 8, yet another embodiment of a control device 804 is illustrated. According to one embodiment, the control device 804 includes a first control element 862A, a second control element 862B, a third control element 862C, a fourth control element 869, a fifth control element 870 and a tether 871. In a version of this embodiment, the first control element 862A permits the user to establish a control setting associated with a preferred pressure in the inflatable device (e.g., establish a preferred firmness level), the second control element 862B permits the user to increase the pressure in the inflatable device, and the third control element 862C permits the user to decrease the pressure in the inflatable device. According to one embodiment, the control elements 862B, 862C provide a continuous range of pressure control. In another embodiment, the control elements 862B, 862C provide incremental pressure adjustments when selected.

According to one embodiment, the control element 869 allows the user to select a pressure setting from among a plurality of available firmness/pressure settings, e.g., super-soft, soft, medium, firm, and extra-firm. In one embodiment, the control element is a switch that slides between a plurality of positions where each position corresponds to a respective pressure setting.

In one embodiment, the fifth control element 870 allows the user to select an automatic control feature, for example, a control mode whereby the pressure in the inflatable device is maintained substantially constant. The automatic control feature may be selected, for example, by moving the control element 870 to a first position. In a version of this embodiment, the fifth control element 870 can be moved to a second position where the automatic control not active, i.e., automatic control is off.

Some embodiments of the control device 804 may include wireless communication between the control device 804 and the pressure controller. Other embodiments of the control device 804 can communicate with the pressure controller via a hardwire communication link provided, for example, by the tether 871.

According to one embodiment, an inflation system for an inflatable device includes a pressure control system including a pump, a valve, a valve operator and a hand held control device. In one version, the inflation system also includes one or more pressure sensors, one or more temperature sensors and one or more position sensors.

Figure 9:
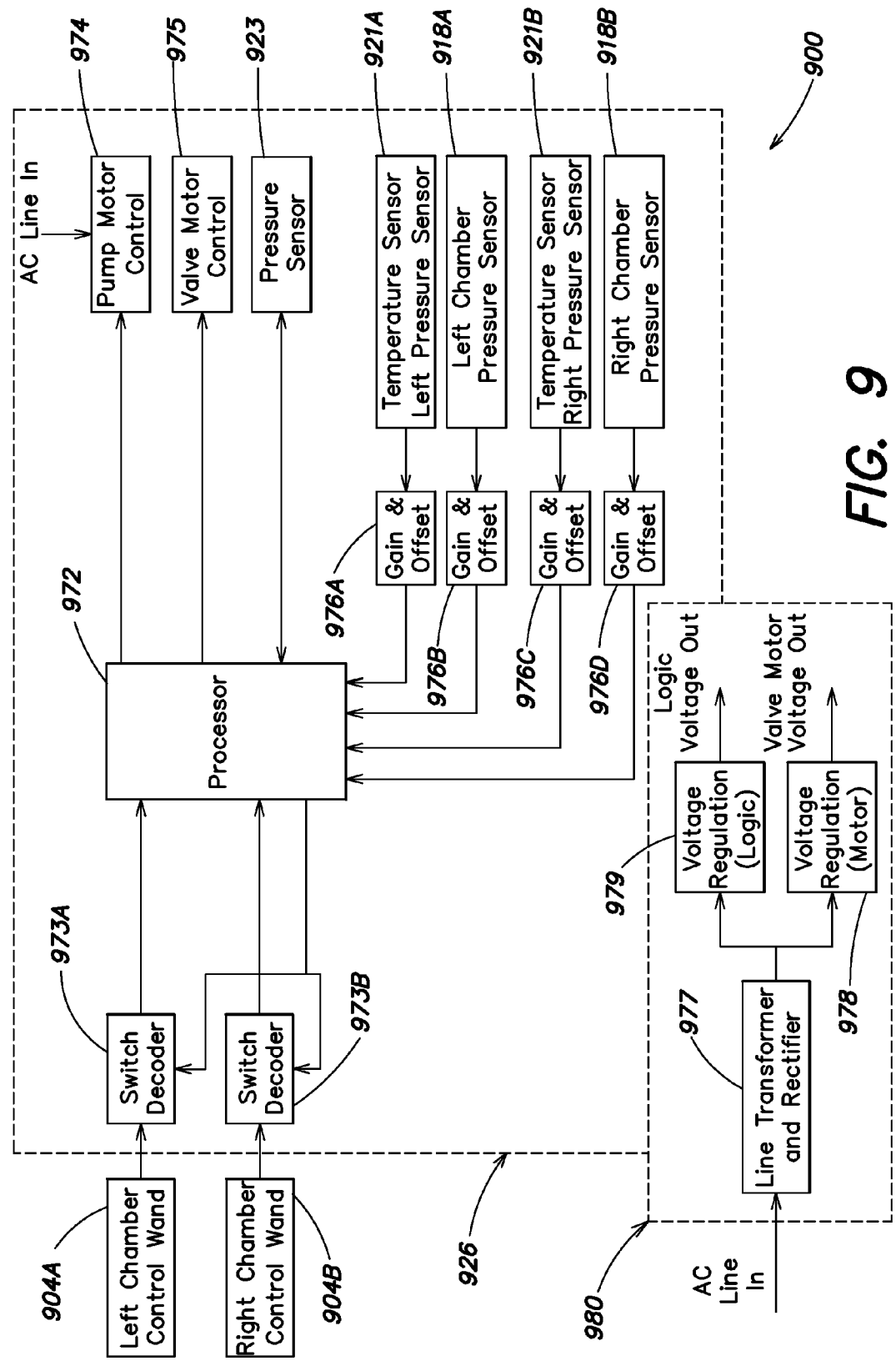
FIG. 9 is a block diagram of a system for monitoring and controlling pressure in an inflatable device in accordance with an embodiment of the invention.

Referring now to FIG. 9, a block diagram of a pressure control system 900 employed with a two chamber inflatable device is shown. The inflation system includes a first control device 904A for a first chamber and a second control device 904B for a second chamber. It will be recognized that the functionality of the control devices 904A, 904B may instead be included in a single control device, for example, as previously described concerning the control device 604.

According to one embodiment, the pressure control system 900 also includes circuitry 926 included in a pressure controller (e.g., the pressure controller 206). In one embodiment, the circuitry 926 includes a processor 972, a first switch decoder 973A associated with the first control device 904A, a second switch decoder 973B associated with the second control device 904B, a pump controller 974, a valve controller 975, a position sensor 923 (e.g., an optical position sensor, a limit switch, etc.), a first temperature sensor 921A and a first pressure sensor 918A each associated with the first chamber, and a second temperature sensor 921B and a second pressure sensor 918B each associated with the second chamber. In a version of this embodiment, the circuitry 926 may also include a plurality of gain and offset modules 976A, 976B, 976C, 976D. In one embodiment, the offset modules 976B and 976D are employed to provide bias and offset adjustment for the pressure sensors 918A, 918B, respectively, to minimize sensor output offset and variability due to temperature changes.

The pressure control system 900 may also include power regulation circuitry 980 used, for example, to convert an AC line voltage to one or more regulated DC voltages employed by the circuitry 926. In one embodiment, the power regulation circuitry 980 may include a transformer and rectifier module 977, a voltage regulator 978 for the valve motor power supply, and a voltage regulator 979 for the logic circuitry included in the circuitry 926. According to one embodiment, the power regulation circuitry 980 is included in the circuitry 926 which is located in the pressure controller (e.g., the pressure controller 206).

Further, in one embodiment, the switch decoders 973A, 973B, the pump controller 974, and the valve controller 975 may be modules, for example, a module that includes circuitry to perform the intended function.

In general, the pressure control system 900 operates with the processor 972 receiving inputs supplied from the first control device 904A (i.e., the first switch decoder), the second control device 904B (i.e., the second switch decoder), the first pressure sensor 918A, the first temperature sensor 921A, the second pressure sensor 918B, the second temperature sensor 921B, the first position sensor 923A, and the second position sensor 923B. As a result of the information received as inputs, the processor 972 provides a plurality of outputs including an output to the pump controller 974 and an output to the valve controller 975 to operate each of the pump motor and the valve operator, respectively.

Figure 10:
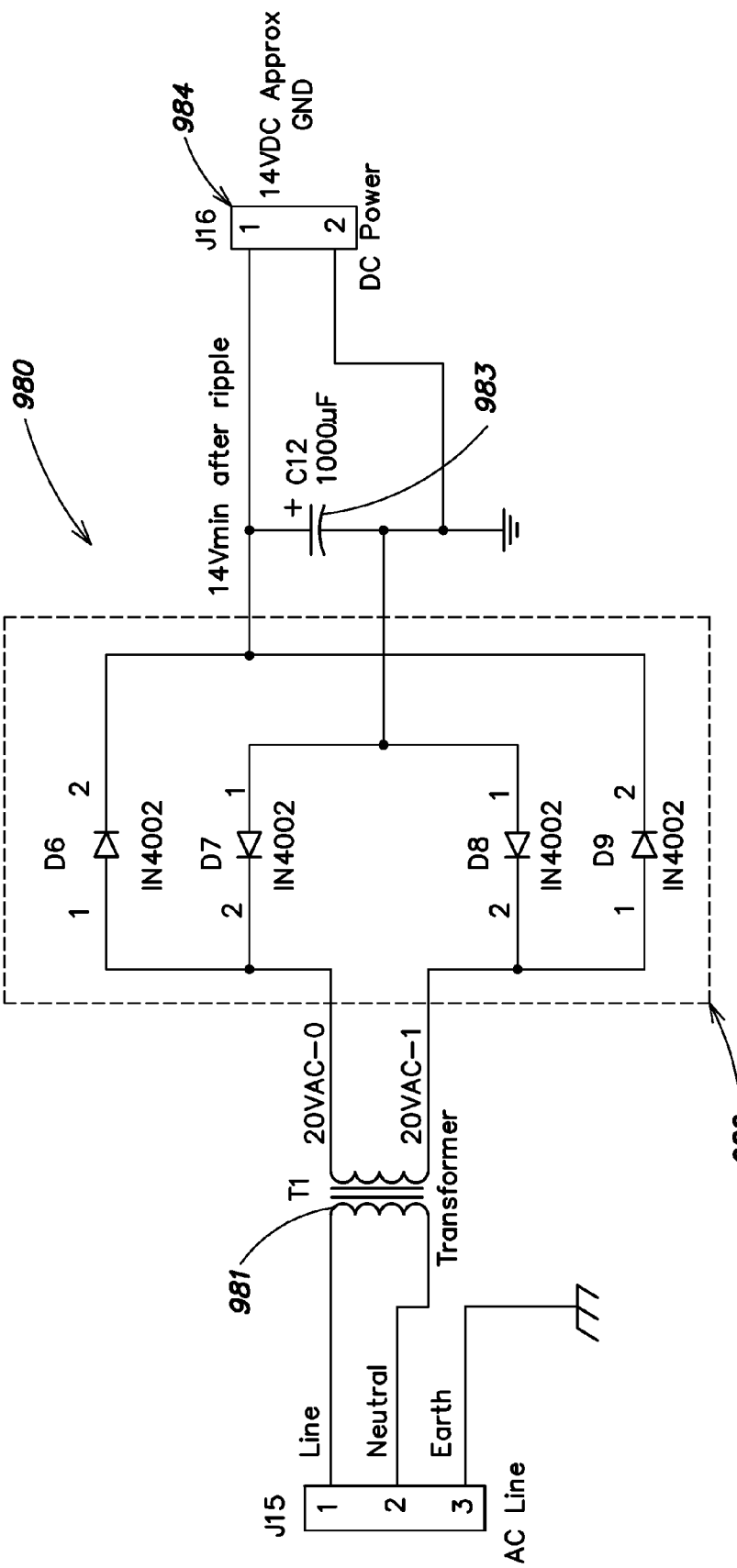
FIG. 10 is a schematic diagram of a transformer and rectifier according to an embodiment of the invention.

FIG. 10 illustrates a block diagram of the power regulation circuitry 980 which includes a transformer 981, a full wave rectifier 982, a capacitor 983 and a connector 984. Operation of the power regulation circuitry 980 is well understood by those of ordinary skill in the art and is briefly explained here. The transformer 981 reduces the AC line voltage (e.g., 120 VAC) to a lower value AC voltage (e.g., 20 VAC) which is converted to DC voltage by the rectifier 982. The capacitor 983 averages the output of the rectifier to provide a low ripple DC voltage in the range of 14 VDC when the rectifier is under load. The DC output provided at the capacitor 983 can be connected to control circuitry, for example, the voltage regulator 978 for the valve motor power supply and the voltage regulator 979 for the logic circuitry, via the connector 984.

Figure 11:
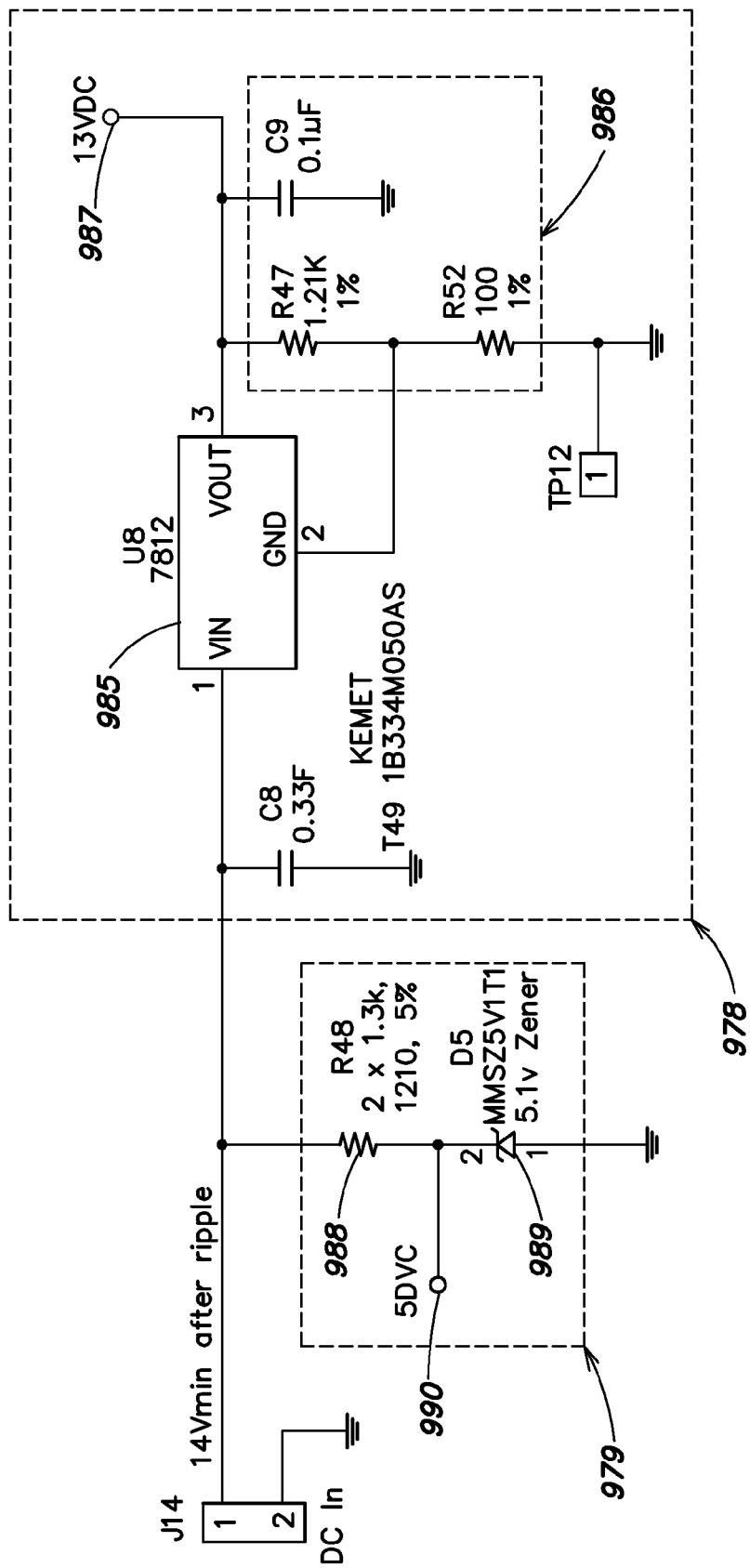
FIG. 11 is a schematic diagram of voltage regulation modules in accordance with an embodiment of the invention.

FIG. 11 provides a schematic diagram of both the voltage regulator 978 and the voltage regulator 979. The voltage regulator 978 includes an adjustable voltage regulator 985, RC components 986 and an output 987. According to one embodiment, the output 987 of the voltage regulator 978 is set to 13 VDC and the RC components 986 provide stability and noise reduction for the regulator 978 as is well known by those of ordinary skill in the art. In one embodiment, the output 987 provides a relatively high current (e.g., 1 Amp) regulated output that is used by the valve controller 975 and other portions of the circuitry 926.

The voltage regulator 979 includes a resistor 988, a diode 989 (e.g., a zener diode), and an output 990. According to one embodiment, the resistor 988 and the diode 989 are configured to produce a regulated output of 5 VDC in a manner that is well known by those of ordinary skill in the art. In a version of this embodiment, the output 990 provides a relatively low current 5 VDC output for operation of one or more logic circuits included in the circuitry 926.

Figures 12A, 12B, 12C:
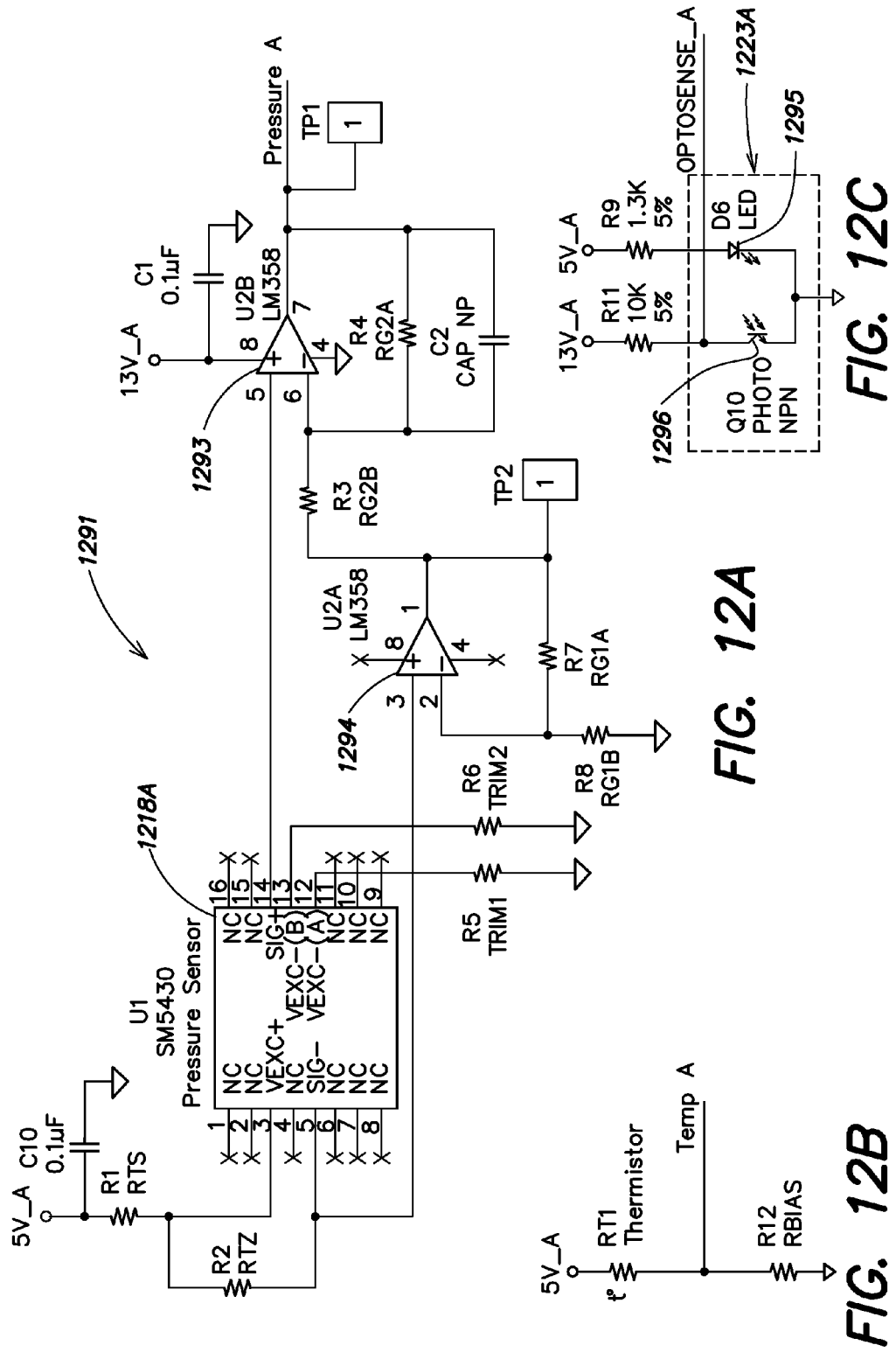
FIGS. 12A-12C are schematic diagrams of sensing circuitry in accordance with an embodiment of the invention.

FIGS. 12A-12C illustrate sensing circuitry according to one embodiment. In one embodiment, the sensing circuitry is employed with a single chamber of a multi-chamber inflatable device, e.g., the chamber 210A. Thus, the circuitry associated with the pressure sensor 918A, the temperature sensor 921A, and the position sensor 923A for the first chamber is described in the following. It will be recognized that similar circuitry may be employed with the pressure sensor 918B, the temperature sensor 921B, and the position 923B for the second chamber 210B, and with sensors for any number of additional chambers that may be included in the inflatable device.

Referring now to FIG. 12A, a schematic of the pressure sensor circuitry 1291 is illustrated. The circuitry 1291 includes the pressure sensor 1218A, for example, a resistive bridge differential pressure sensor. The pressure sensor circuitry 1291 generates a pressure signal (PRESSURE A) as an output. The circuitry 1291 also includes a first amplifier 1293, a second amplifier 1294, resistors R1, R2, R3, R4, R5, R6, R8, and capacitor C2. It should be recognized that, in one embodiment, the circuitry 1291 also includes various circuit elements included in the gain and offset module 976B.

In one embodiment, the pressure sensor 1218A is responsive to the difference between ambient pressure at the location of the inflatable device and fluid pressure in the first chamber of the device. In this embodiment, the resistors R1, R2, R5 and R6 provide bias and offset adjustment for the sensor and are selected to minimize sensor output offset and variability due to temperature changes. In addition, the capacitor C2 and resistor R4 are connected in parallel and provide a first order low pass filter to the pressure signal.

In operation, the pressure sensor 1218A generates a first output signal (SIG+) and a second output signal (SIG−) which are supplied to an input of the first amplifier 1293 and an input of the second amplifier 1294, respectively. A differential gain is applied to the output of the pressure sensor to generate the pressure signal. In one embodiment, where the resistors R4 and R8 have substantially equal resistance, the pressure signal (i.e., Pressure A) is determined as shown here:

$$\text{Pressure } A = [(\text{SIG}+) - (\text{SIG}-)][(R3+R4)/R3] \quad \text{Eq. (1)}$$

According to one embodiment, the pressure signal is sensitive to changes in temperature. In a version of this embodiment, the changes in the pressure signal resulting from changes in temperature are predictable. Thus, in one embodiment, the temperature of the pressure sensor 1218A is monitored and a corresponding temperature signal is generated. The temperature signal may be used by the controller to compensate the pressure signal for any temperature related variance and provide a more accurate pressure signal.

According to one embodiment, as illustrated in FIG. 12B, the temperature compensation is provided by a thermistor RT1 which has a resistance that varies with changes in temperature. In FIG. 12B, it will be recognized that the thermistor is included in a voltage divider to generate a temperature signal output TEMP A. In one embodiment, the output of the voltage divider corresponds to the following, where T is the temperature of the thermistor:

$$\text{TEMP } A = 5V \times [R12/(R12+RT(T))]$$

In one embodiment, the thermistor RT1 is located in close thermal proximity to the pressure sensor 1218A to increase the accuracy of the temperature compensation by accurately approximating the temperature of the pressure sensor 1218A. The signal TEMP A is employed by the processor to more accurately determine the pressure differential between the ambient pressure and the pressure in the chamber.

According to one embodiment, the inflation system monitors the open/closed position of the valves using a separate optical position sensor (e.g., position sensors 223A, 223B) for each valve. For example, referring to FIG. 12C, the optical sensor 1223A for the first chamber (e.g., the chamber 210A) includes a light emitting circuit component such as a light emitting diode 1295, and an associated light sensitive circuit element such as a phototransistor 1296. In one version, the optical sensing circuitry provides a voltage output OPTOSENSE A.

The circuitry in FIG. 12C operates such that the phototransistor 1296 is off and the output OPTOSENSE A is high when no light is detected by the phototransistor 1296. When the phototransistor 1296 detects light the transistor conducts and the output OPTOSENSE A is low. The signal produced at the output OPTOSENSE A is supplied to the processor 972.

Other types of sensing devices and associated circuitry may be used in various embodiments of the invention. For example, the pressure sensors (e.g., the pressure sensors 218A, 218B) may be solid state devices that are secured to PC boards including a mother board for the electronic circuitry 226. In some embodiments, the pressure sensors provide an analog output signal corresponding to the sensed-pressure while in other embodiments the pressure sensor provides a digital output. Further, other temperature sensors (e.g., the temperature sensors 221A, 221B) such as thermocouples may be employed in embodiments of the invention. In one embodiment, the temperature sensors include integral circuitry to modify the signal provided by a temperature sensing device (e.g., the thermistor RT1) and provide a temperature signal (e.g., the signal TEMP A).

In addition, embodiments of the invention may employ other approaches to sensing the position of the valves (e.g., the valves 216A, 216B). For example, limit switches may be employed to sense the valve position, the position of the valve operator (e.g., the valve operator 220), and/or the position of the mechanical coupling (e.g., the mechanical coupling 222).

According to one embodiment, valve-position sensing is accomplished by using the position sensors (e.g., the position sensors 223A, 223B) to monitor a change in position of a mechanical coupling (e.g., the mechanical coupling 222) that couples the valve operator (e.g., the valve operator 220) and the valve (e.g., the valve 216A). In one version, the mechanical coupling is a bar or a disk.

In one embodiment, the light emitting component (e.g., the LED 1295) and the light sensing component (e.g., the phototransistor 1296) are located such that the mechanical coupling blocks the light source from the light sensing component when the valve is in a first position and permits the transmission of the emitted light to the light sensing component when the valve is in a second position. For example, a generally solid mechanical coupling can include one or more slits or openings that are located in the coupling to provide for light transmission/light blocking such that the output OPTOSENSE A has a low output (i.e., light is detected) when the valve is open and a high output (i.e., light is not detected) when the valve is closed. As will be recognized by those skilled in the art, the slits or openings may be located to provide the opposite logic convention, i.e., a low output when the valve is closed and a high output when the valve is open.

Further, as illustrated in FIG. 4, a single mechanical coupling may be used to connect the valve operator to a plurality of valves where a single valve operator is employed to operate each of the plurality of valves. According to one embodiment, the mechanical coupling may include slits or openings to allow light detection by the first position sensor (e.g., the position sensor 223A) when the valve for the first chamber is open (e.g., the valve 216A), light detection by the second position sensor (e.g., the position sensor 223B) when the valve for the second chamber is open (e.g., the valve 216B), and light to be detected by both the first position sensor and the second position sensor when both valves are closed (e.g., with the mechanical coupling in a neutral position).

Figure 13:
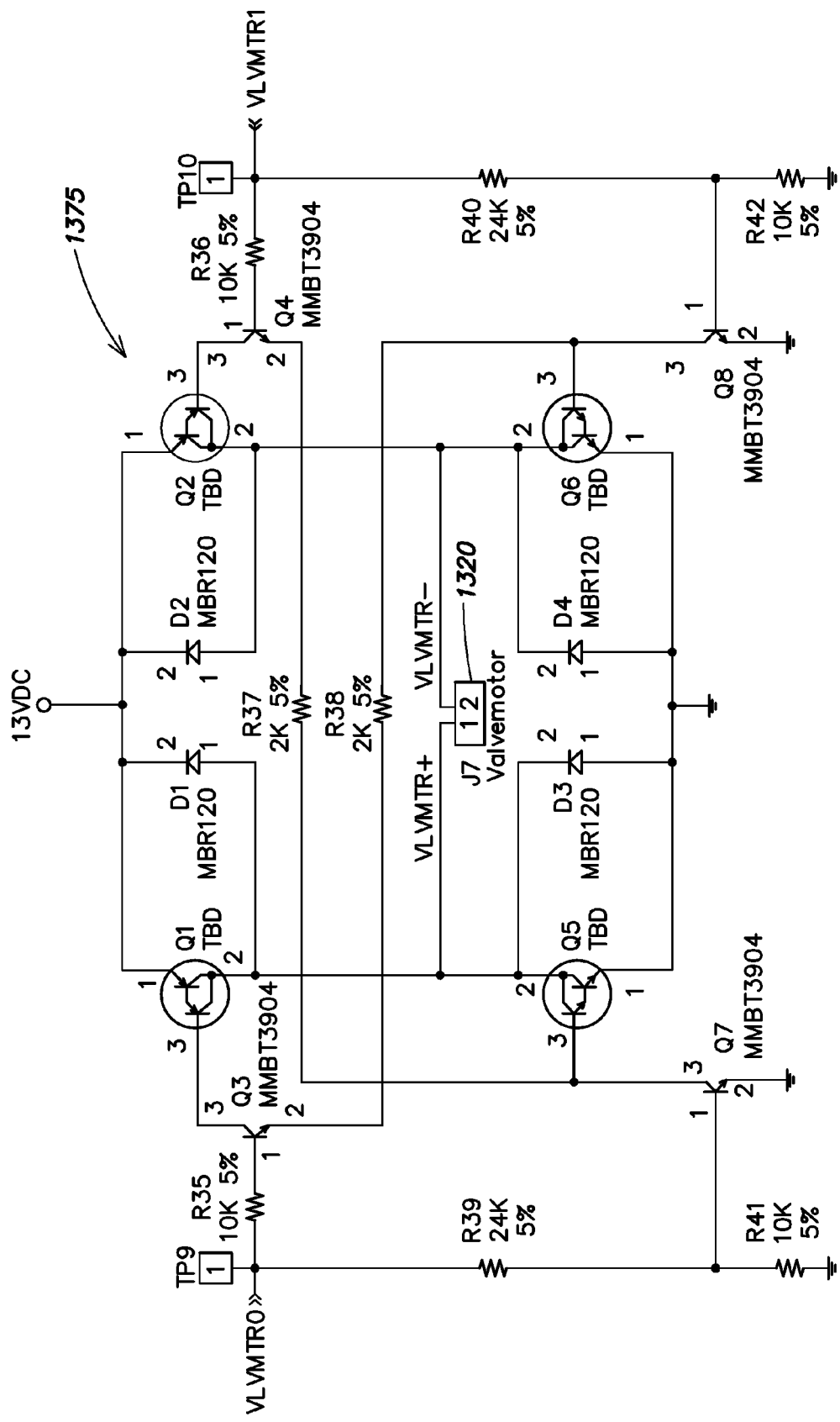
FIG. 13 is a schematic diagram of a valve controller in accordance with an embodiment of the invention.

Operation of the valve controller 975 can also be implemented using any of a variety of approaches to control operation of the valve operator. FIG. 13 illustrates a schematic of the valve controller 1375 in accordance with one embodiment. The valve controller 1375 provides a control circuit to operate two valves (e.g., the valves 216A, 216B) using a single valve operator 1320 where the valve operator is a motor. Because the valve operator 1320 may open each of the two valves, according to one embodiment, the valve operator may be operated in one of four states, a first state where the valve operator is in an off state, a second state where the valve operator operates to open a valve to the first chamber, a third state where the valve operator operates to open a valve to the right chamber, and a fourth state where the valve operator is in a braking mode.

The valve controller 1375 includes a "H-bridge" design employing four Darlington transistors Q1, Q2, Q3, Q4 to control the direction of current flow to the motor, and as a result, to control the state of the valves. The operation of the circuit is well known to those of ordinary skill in the art and is therefore only explained briefly here.

In the first state, none of the Darlington transistors is conducting and the valve operator 1320 is de-energized. In the second state, transistors Q1 and Q6 are on, transistors Q2 and Q5 are off, and the motor rotates in a first direction. The second state can be employed to move the valve operator 1320 such that the mechanical coupling engages and opens the valve to the first chamber (for example, from the neutral position). In addition, the second state can be employed to return the mechanical coupling to the neutral position when it has previously been engaged with and opened the valve to the second chamber. In the third state, transistors Q2 and Q5 are on, transistors Q1 and Q6 are off, and the motor operates in a second direction. The third state can be employed to move the valve operator 1320 such that the mechanical coupling engages and opens the valve to the second chamber. In addition, the third state can be employed to return the mechanical coupling to the neutral position when it has previously been engaged with and opened the valve to the first chamber. In the fourth state, the transistors Q1 and Q2 are on, the transistors Q5 and Q6 are off and the motor operator is in a braking state.

Figure 14A:
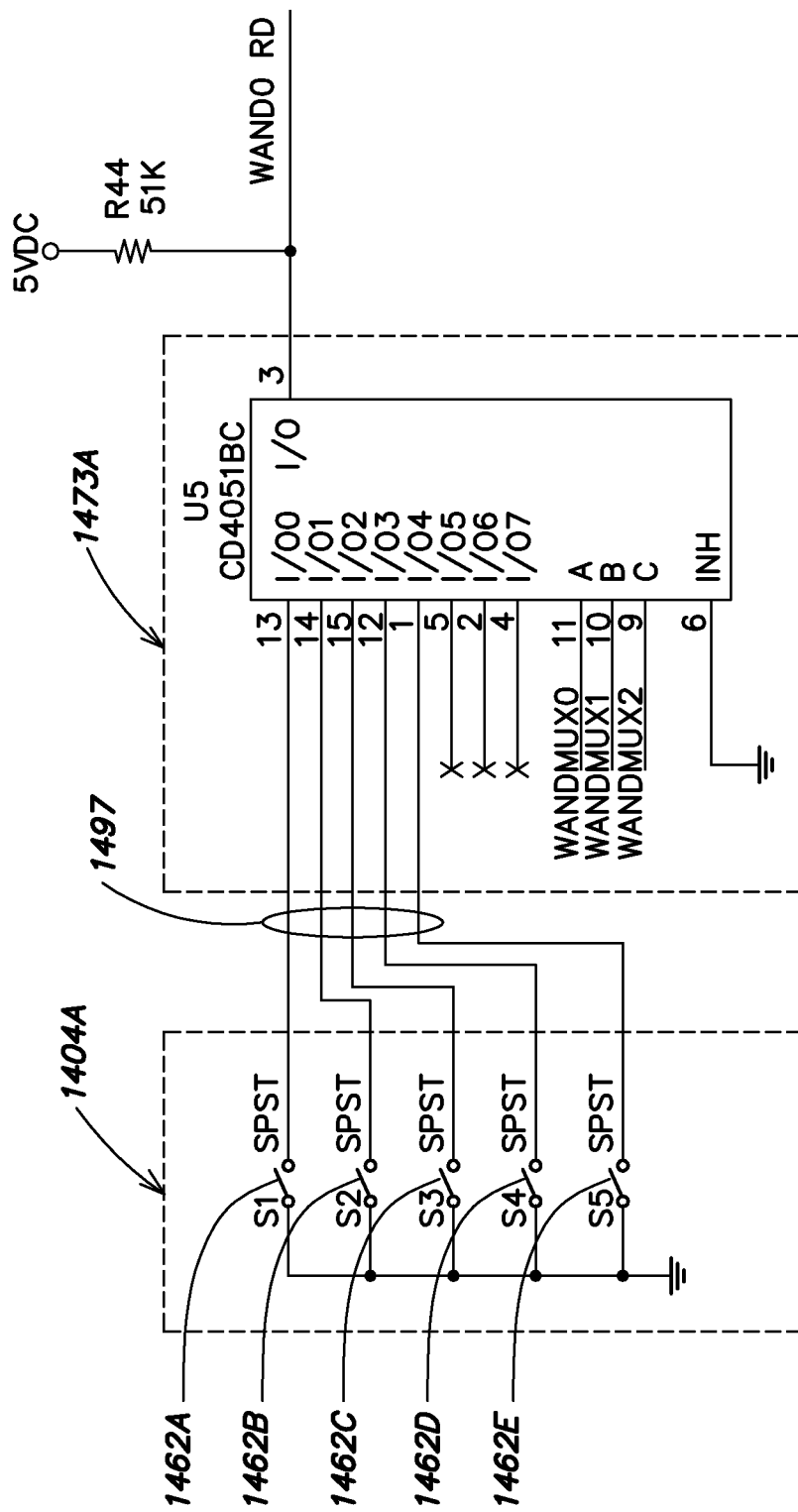
FIGS. 14A and 14B are schematic diagrams of control devices in accordance with an embodiment of the invention.

FIG. 14A illustrates a control device 1404A and a switch decoder 1473A in one embodiment of the invention. According to one embodiment, the control device 1404 may be a hand-held control device that is tethered to a pressure controller (e.g., the pressure controller 206). As described above, the control device may include a plurality of control elements 1462A, 1462B, 1462C, 1462D, 1462E that are included in a user interface (e.g., the user interface 661) that allows the user to select and operate the control elements. According to one embodiment, the control elements are momentary contact switches, for example, single pole, single throw switches that are normally open. In a version of this embodiment, the user depresses the control elements to change them from the open state to a closed state. In addition, the control device for the left chamber includes a multiplexer U5 where each of the contact switches are provided as an input to the multiplexer. The multiplexer includes an output WAND0 that is supplied to the processor 972. Additional inputs WANDMUX0, WANDMUX1, WANDMUX2 are also connected to the processor 972. The inputs WANDMUX0, WANDMUX1, WANDMUX2 are employed to sequentially connect each of the switch inputs to the output WAND0.

A closed contact results in a logic low signal and an open contact results in a logic high signal. In operation, the processor (e.g., a processor 1472 of FIG. 14C) supplies signals to the inputs WANDMUX0, WANDMUX1, WANDMUX2 to select the switch whose corresponding multiplexer input will be supplied to the multiplexer output WAND0. According to one embodiment, the processor 1472 sequentially connects each of the multiplexer inputs to the multiplexer output at a rate of speed that is faster than the rate at which a user can press and release the switch. Thus, the processor 1472 can detect when any of the contact switches are selected and the amount of time for which any contact switch is selected. For example, in one version, the processor scans the switches every 0.001 seconds. As a result, the length of time a switch is selected can be determined to within 0.001 seconds.

According to one embodiment, the switch S1 corresponds to a user selection to increase the pressure level in the chamber, the switch S2 corresponds to a user selection to decrease the pressure level in the chamber, the switch S3 corresponds to a user selection to return to a home position, the switch S4 corresponds to a user selection to decrease the pressure in the chamber in one or more steps, and the switch S5 corresponds to a user selection to increase the pressure in the chamber in one or more steps. Further, in this embodiment, the user may increase or decrease the pressure level in the chamber within a continuous range of adjustment by pressing and holding the control element corresponding to the switch S1 and the switch S2, respectively. Thus, in one embodiment, the pressure controller may operate to adjust the pressure in the chamber where the amount of adjustment is determined by the length of time a switch remains closed (i.e., remains selected by the user). For example, where the switches S1 or S2 are selected the pressure controller may adjust the pressure without determining a pressure differential between the current chamber pressure and the desired chamber pressure.

In one embodiment, the multiplexer 1473A is located in the pressure controller and a communication link 1497 allows communication between the control device 1404A and the multiplexer 1473A. The communication link 1497 may be a wireless communication link or, as illustrated in FIG. 14A, a hardwired communication link. Where the communication link 1497 is wireless, a transmitter may be included in the control device 1404A to transmit signals corresponding to the switch outputs (e.g., the outputs of control elements 1462A, 1462B, 1462C, 1462D, 1462E) from the control device 1404A to the multiplexer 1473A, for example, via a receiver located in the pressure controller.

In one embodiment, the control device 1404A includes a transceiver that allows the control device 1404 to receive signals transmitted by the pressure controller. That is, the pressure controller may transmit information to the control device. For example, the pressure controller may transmit information corresponding to the pressure of the inflatable device and the pressure may be received by the control device and displayed in the user interface, e.g., the user interface 661. In one embodiment, the electronic circuitry (e.g., the electronic circuitry 226) includes a transceiver to both send signals to and receive signals from the control device 1404D.

The control device 1404A may include control elements used to control the pressure in a single chamber or multiple chambers. In one embodiment, a single set of control elements (e.g., control elements 1462A, 1462B, 1462C, 1462D, 1462E) are used to control the pressure in a plurality of chambers, for example, by using a selector switch (e.g., the selector switch 664). In another embodiment, separate control elements are employed for each of a plurality of chambers in the inflatable device. In yet another embodiment, separate control devices are employed for each of a plurality of chambers.

Figure 14B:
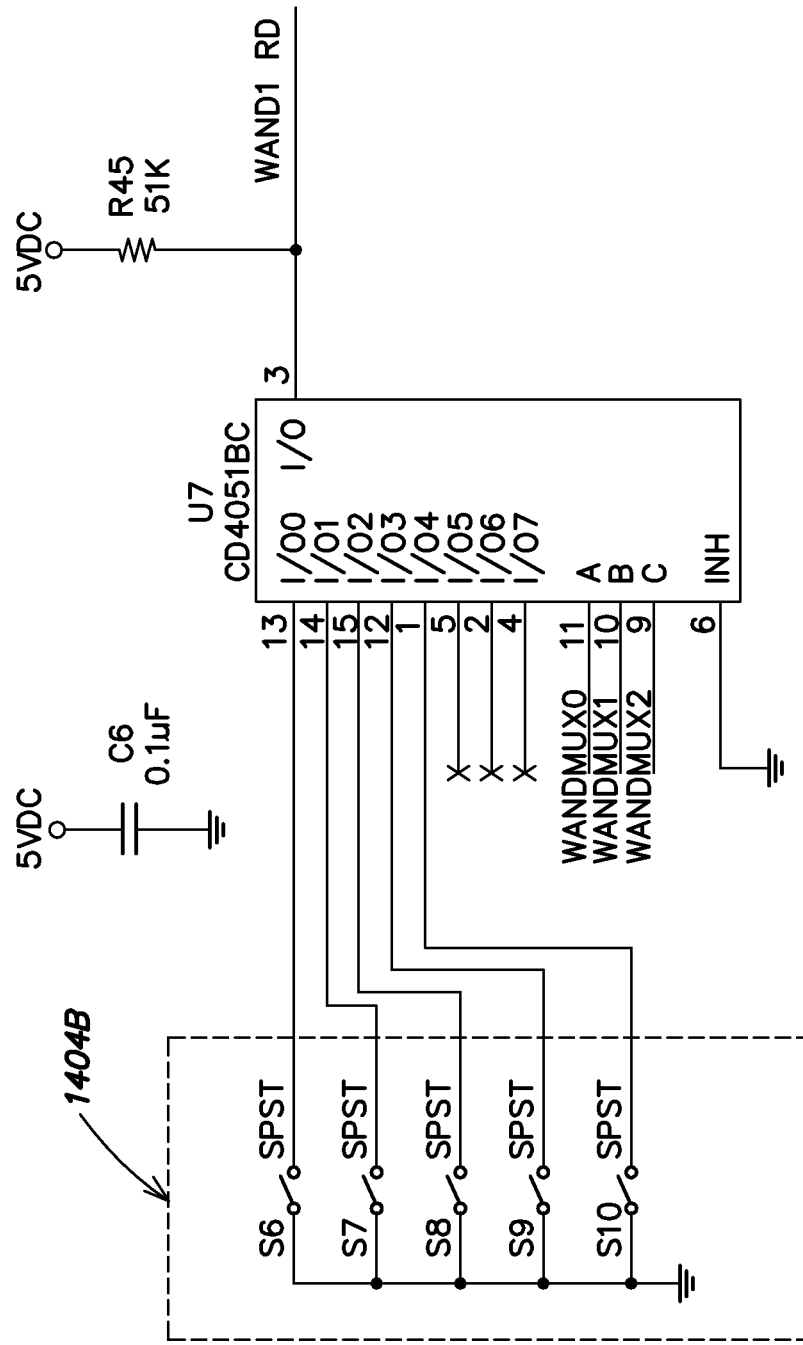

According to one embodiment, a first control device and a second control device are employed for a first chamber and a second chamber, respectively, of the inflatable device. FIG. 14B illustrates a second control device 1404B for controlling the pressure in a second chamber of an inflatable device where the control device 1404A provides control for the pressure in the first chamber. Where a plurality of control devices 1404A, 1404B are employed, each of the control devices may employ wireless communication with a pressure controller.

Figure 14C:
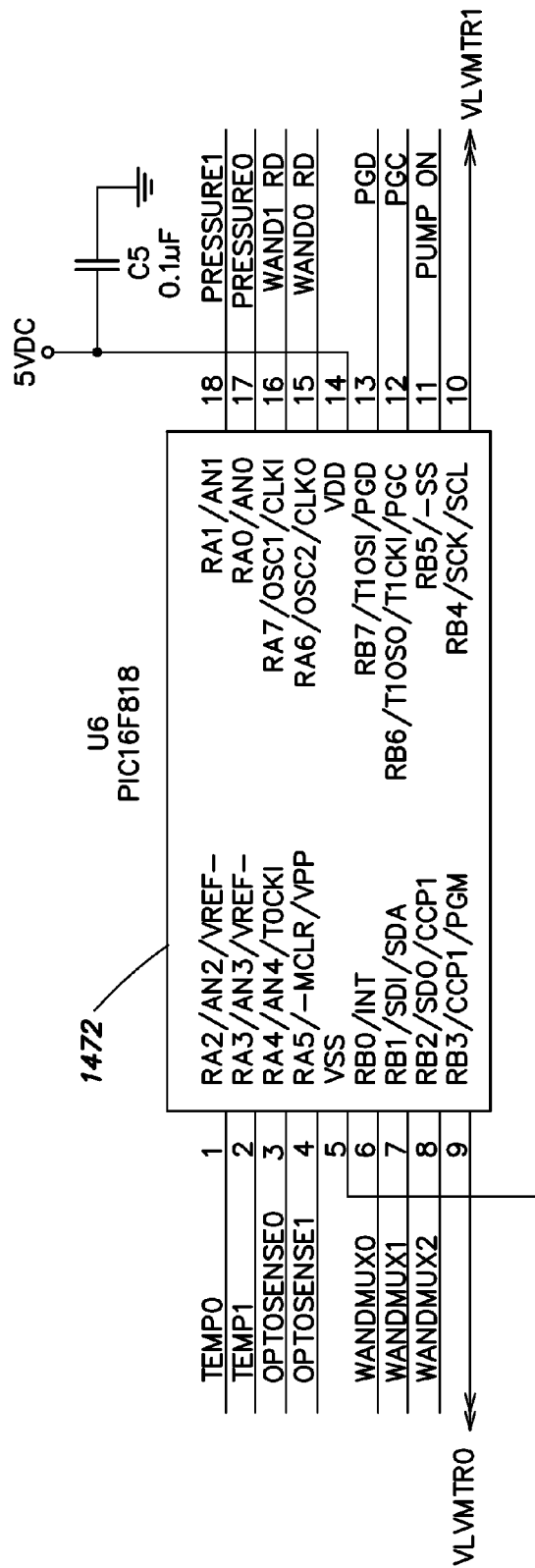
FIG. 14C illustrates a processor in accordance with an embodiment of the invention.

FIG. 14C illustrates the processor 1472 according to one embodiment of the invention. The processor 1472 receives as inputs: a signal corresponding to the pressure in a first chamber of the inflatable device (PRESSURE0); a signal corresponding to the pressure in a second chamber of the inflatable device (PRESSURE1); a signal corresponding to the temperature of the first pressure sensor (TEMPERATURE0); a signal corresponding to the temperature of the second pressure sensor (TEMPERATURE1); a signal corresponding to the position of the valve to the first chamber (OPTOSENSE0); a signal corresponding to the position of the valve to the second chamber (OPTOSENSE1); signals from the multiplexers (WAND0 RD, WAND1 RD), and programming inputs (PGC, PGD). In addition, the processor 1472 provides outputs for pump control (PUMP ON); valve operator control (VLVMTR0, VLVMTR1); and multiplexer control (WANDMUX0, WANDMUX1, WANDMUX2).

According to one embodiment, the processor 1472 is a microcontroller such as a programmable logic device that monitors and processes logic signals and generates the appropriate output logic signals for the control of pressure in the inflatable device. In one embodiment, the processor 1472 includes an integral analog-to-digital ("A/D") converter. According to one embodiment, the temperature and pressure signals are analog signals that are converted to digital signals by the processor 1472. In addition, the processor may also include an internal timing function (e.g., a clock signal) that allows cyclical, timed scanning of the control elements (e.g., the control elements 1462A, etc.), for example, to determine which of the contacts are in a closed state and for how long.

In general, the valve operator remains de-energized while the processor first scans the state of the control elements. In one embodiment, the processor 1472 detects when a control element transitions to a closed state and, in response, determines which chamber is affected and whether the user is requesting a pressure increase or a pressure decrease. The processor 1472 supplies a signal to the valve operator (e.g., the signal VLVMTR0 or VLVMTR1) to operate the correct valve while monitoring the output of the position sensors, e.g., 223A, 223B. The valve operator is de-energized when the output of the position sensors indicates that that valve is in the correct position. In this embodiment, the pump is turned on if inflation is required as a result of the user's input to the control device 1404.

In one embodiment, the processor 1472 generates a value indicative of the pressure differential between the chamber pressure and the ambient pressure. As the pressure in the chamber is adjusted, the value indicative of the pressure differential is periodically compared to a target value determined by the state of the control elements (e.g., the control element 1462A) selected by the user. When the value indicative of the pressure differential corresponds to the target value the current pressure adjustment is complete, i.e., enough fluid has been either added to or released from the chamber. The processor 1472 provides a signal to the valve operator to close the open valve. If fluid was added to the chamber, the processor 1472 also provides a signal to turn off the pump. According to one embodiment, the pump is turned off when the position sensors indicate that the mechanical coupling is in a position where the valves to each chamber are closed, e.g., in a neutral position.

Figure 14D:
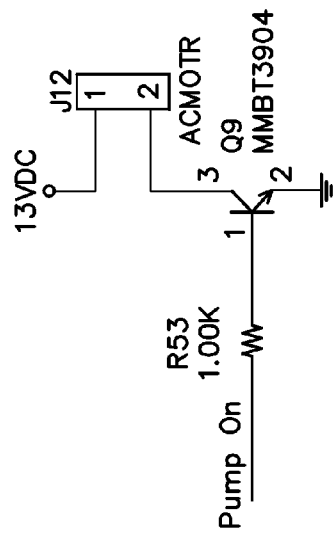
FIG. 14D is a schematic of a pump control circuit in accordance with an embodiment of the invention.

FIG. 14D illustrates an embodiment where the PUMP ON signal is a logic HI signal that operates the transistor Q9 to energize the coil of a pump relay which then operates to close a set of contacts that operate at 120 VAC to turn the pump motor on.

Figure 15A:
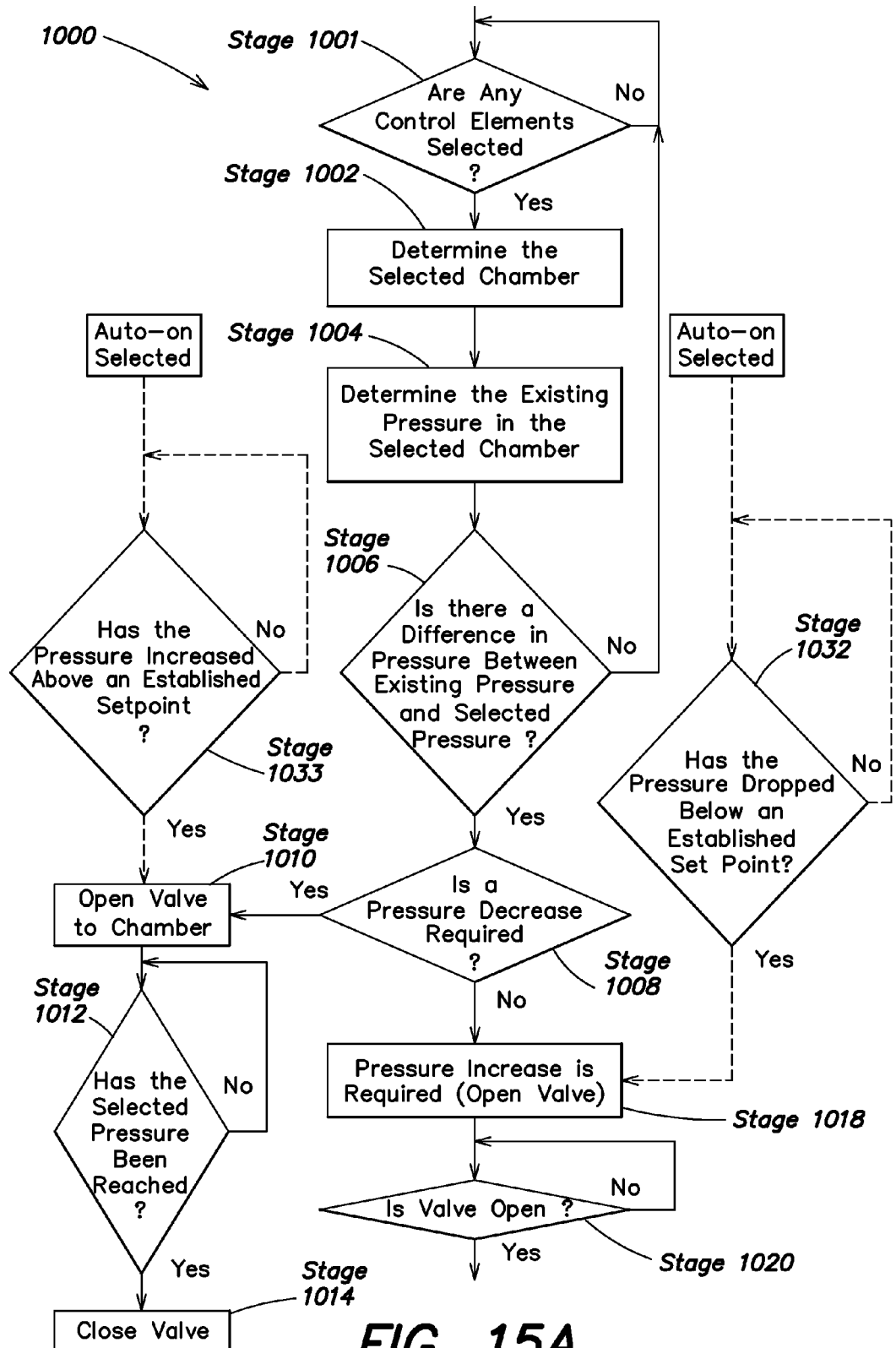
FIGS. 15A and 15B are flow diagrams of a process for monitoring and controlling the pressure in an inflatable device in accordance with an embodiment of the invention.
Figure 15B:
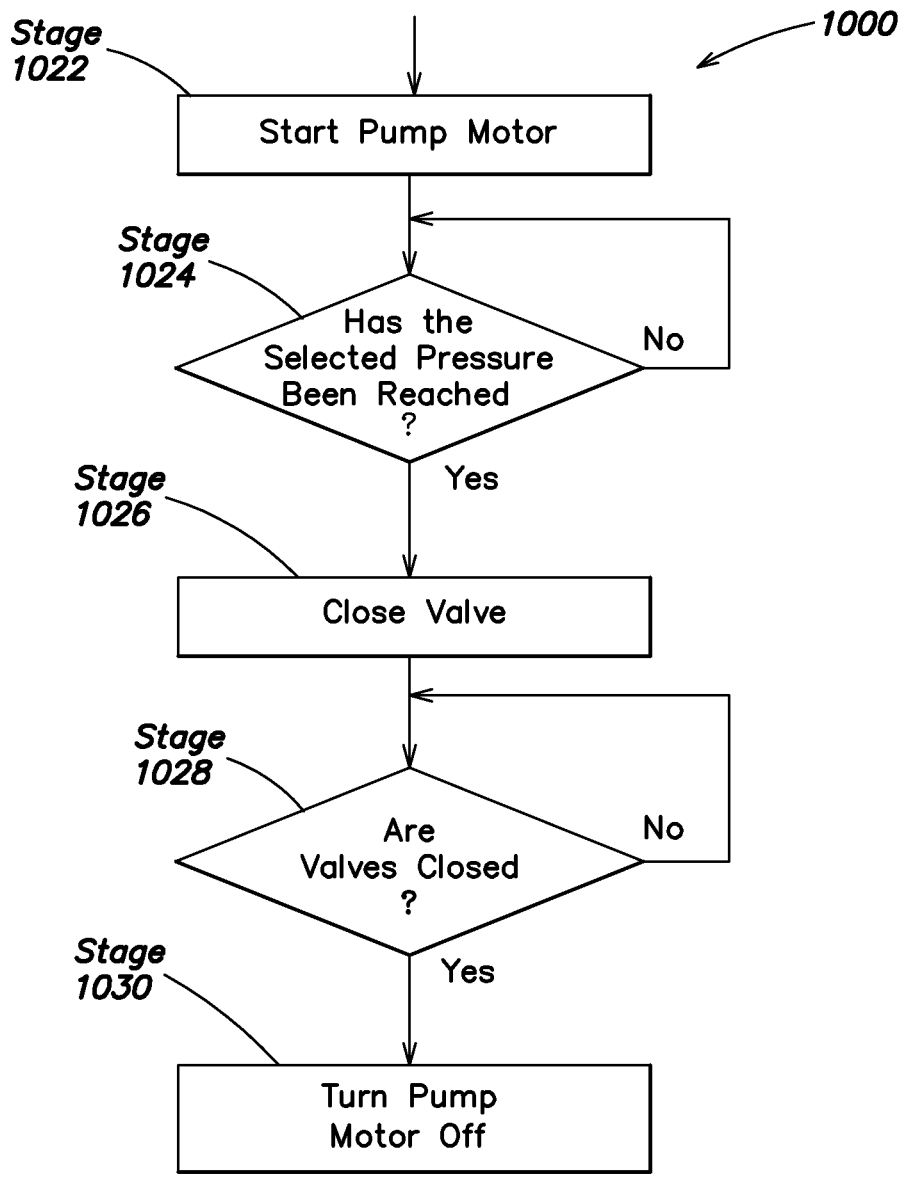

FIGS. 15A and 15B illustrate a flow diagram of a process 1000 for monitoring and controlling the pressure in an inflatable device according to one embodiment. In general, the user requests an adjustment of the pressure in the inflatable device by selecting a control element. Referring to FIG. 7, for example, if the inflatable device is at the super-soft level of inflation and the control element for a firm level of inflation is selected (e.g., the control element 762D) the pressure controller operates to change the pressure level from super-soft to firm by adding fluid to the selected chamber. If the inflatable device is already at the firm level, a change in pressure is not required. Similarly, where the inflatable device is at the pressure associated with the extra-firm setting, a selection of the firm setting results in the pressure controller operating to decrease the pressure by releasing fluid from the selected chamber.

At Stage 1001 a pressure control system monitors the inputs from the control device to determine whether any control elements are selected. If no control elements are selected, the process returns to the start of Stage 1001. If a control element is selected, however, the process proceeds to Stage 1002 where the chamber associated with the selected control element is determined. Of course, Stage 1002 may be unnecessary in a single-chamber inflatable device. At Stage 1004, the existing pressure in the selected chamber is determined. At Stage 1006, the difference in pressure between the existing pressure in the chamber and the selected pressure is determined. If no difference in pressure exists (for example, if a user requests the firm pressure level when the device is already at the firm pressure level), the process returns to Stage 1001. Otherwise, the process continues at Stage 1008 where it is determined whether a pressure decrease is required. If a pressure decrease is required to adjust the pressure of the selected chamber to the desired pressure level, at Stage 1010, the valve to the chamber is opened to allow fluid to escape from the chamber. At Stage 1012, the pressure control system continues to monitor the pressure in the chamber until the selected pressure is reached. At Stage 1014, the valve to the chamber is closed when the selected pressure is reached. Stage 1014 may include an operation whereby a position sensor provides feedback concerning the position of the valve.

It should also be apparent that, in various embodiments, the stages illustrated in FIGS. 15A and 15B need not occur only in the sequence illustrated and that the process 1000 may include fewer stages, additional stages, and stages occurring in a different sequence. For example, stage 1008 may be replaced with a stage in which it is determined whether a pressure increase is required. In this approach, the process proceeds to Stage 1018 if an increase is required, and proceeds to Stage 1010 if a pressure decrease is required.

Further, it may be unnecessary to determine a pressure difference where a pressure adjustment is initiated with the selection of a control element associated with a continuous range of adjustment. For example, where a control element such as the element 762B (firmer) or element 762C (softer) are selected, a change in pressure is generally required. Thus, the process 1000 may bypass Stage 1006 and proceed to Stage 1008 to determine whether the pressure should be increased or decreased. As described previously, the amount of the change in pressure may be determined by the length of time the control element is selected by the user.

Referring to Stage 1008, a pressure increase is required when the pressure to difference determined at Stage 1006 indicates that the selected pressure is greater than the existing pressure in the chamber. At Stage 1018, the processor provides a signal to open the valve. In one embodiment, the pressure control system confirms that the valve is open, at Stage 1020, before the pump motor is energized. Once the processor receives a signal from the position sensor indicating that the valve is open, the pump motor is started at Stage 1022 and fluid is added to the chamber. It should be apparent, however, that in other embodiments, the valve may be opened as the pump is turned on. At Stage 1024, the pressure control system continues to monitor the pressure in the chamber to determine if the selected pressure is reached. At Stage 1026, the valve is closed when the selected pressure is reached. In one embodiment, where a single motor operated pump is employed to inflate multiple chambers, the motor is not turned off until the processor detects that the valve for each chamber is closed. According to this embodiment, at Stage 1028, the system determines whether the valves are closed. At Stage 1030, the pump motor is turned off if the valves are closed.

In addition, in some embodiments, the pressure controller (e.g., the pressure controller 206) may be employed to automatically maintain a pressure in the inflatable device, for example, to maintain the user's preferred pressure. For example, the system may include an "auto-on" feature that automatically monitors and adjusts the pressure in the inflatable device. Stage 1032 illustrated in FIG. 15A provides one approach for maintaining a minimum pressure in a chamber of an inflatable device where, for example, the user has previously established a preferred pressure. In one embodiment, Stage 1032 can be included in the process 1000 as shown in FIG. 15A where it may be executed concurrently with some of the previously-described stages of the process. With the auto-on feature active, at Stage 1032, the processor determines whether the pressure in the inflatable device is less than the pressure value previously established by the user (e.g., a setpoint). If the pressure is not lower than the setpoint, the process continues to monitor the actual pressure relative to the setpoint at Stage 1032. If the pressure has dropped below the setpoint, then the process continues at Stage 1018, as described previously, to increase the pressure in the chamber until the selected pressure is reached (i.e., the setpoint) as determined at Stage 1024.

In a version of the preceding embodiment, the process 1000 may be employed to maintain a pressure corresponding to the setpoint. That is, the pressure controller may not only add fluid to increase the chamber pressure but is may also operate to release fluid from the chamber if the pressure has increased above the setpoint, for example, as a result of an increase in the ambient temperature where the inflatable device is located.

Stage 1033 illustrated in FIG. 15A illustrates one approach to maintaining the inflatable device at or below a minimum pressure. With the auto-on feature active, at Stage 1033, the processor determines whether the pressure in the inflatable device is greater than the pressure value previously established (e.g., a setpoint) for the maximum allowable pressure. If the pressure is not greater than the setpoint, the process continues to monitor the actual pressure relative to the setpoint at Stage 1033. If the pressure has increased above the setpoint, then the process continues at Stage 1010, as described previously, to decrease the pressure in the chamber until the selected pressure is reached (i.e., the setpoint) as determined at Stage 1012.

According to one embodiment, the user employs the control device 604 and one or more control elements 662 to establish the setpoint. The user then transmits the setpoint or information corresponding to the setpoint to the pressure controller 206 where it is stored in memory included in the electronic circuitry 226.

According to another embodiment, the pressure controller may include a "pressure-relief" setting that automatically reduces the pressure in the inflatable device to a pre-set value when an established maximum pressure is sensed. In various embodiments, the maximum pressure may be established by the user (for example, using the control device 604) or by a manufacturer or distributor of the inflatable device. In these embodiments, the pressure controller may operate to open the valve and exhaust fluid from a chamber when the pressure controller determines that the pressure in the chamber exceeds the maximum value, for example, as described above with reference to Stage 1033.

Figure 16:
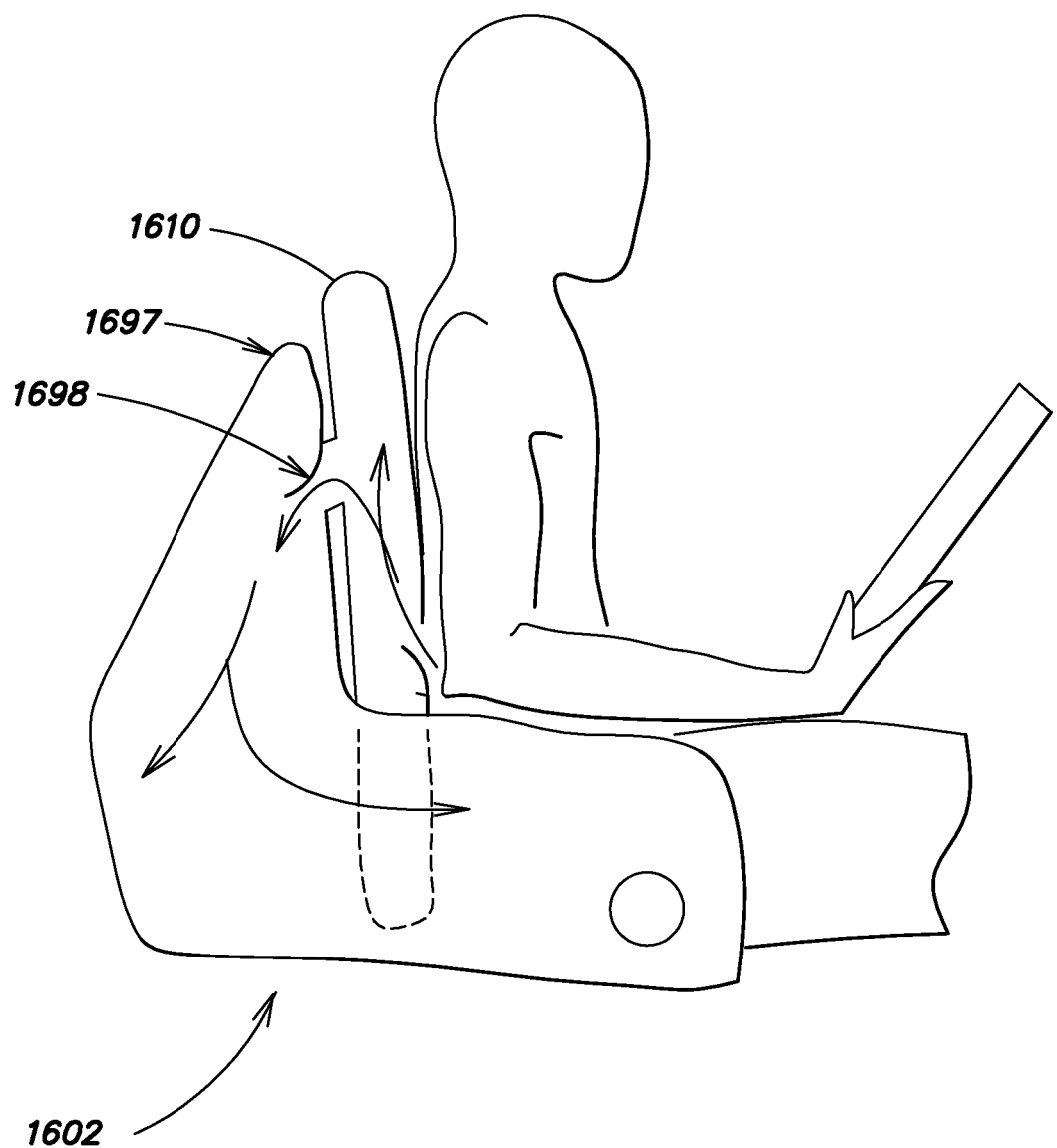
FIG. 16 illustrates a multi-layer inflatable device in accordance with an embodiment of the invention.

Referring now to FIG. 16, in one embodiment, the system (e.g., the system 100, 900) is employed with an inflatable device 1602 that includes a plurality of chambers. In the illustrated embodiment, a first chamber 1610 is a comfort layer and a second chamber 1697 is a support layer. In one embodiment, a pressure controller (e.g., the pressure controller 106) is fluidly coupled to the first chamber 1610 and the first chamber is fluidly coupled by a valve 1698 to the second chamber 1697. The valve 1698 can be a self-sealing valve. In addition, the valve can be a one-way valve for example a check valve that allows fluid to enter the second chamber from the first chamber.

Figure 23A:
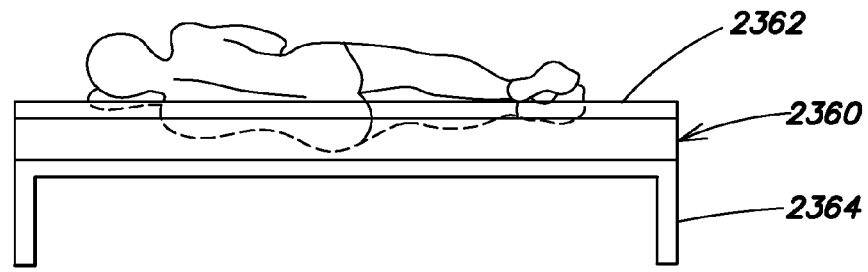
FIG. 23A illustrates a mattress in accordance with one embodiment of the invention.

Referring now to FIG. 23A, a mattress 2360 may include a bladder 2362 and the mattress may be set on a frame 2364. The bladder 2362 may be fluidly coupled to a pressure controller as previously described.

Figure 23B:
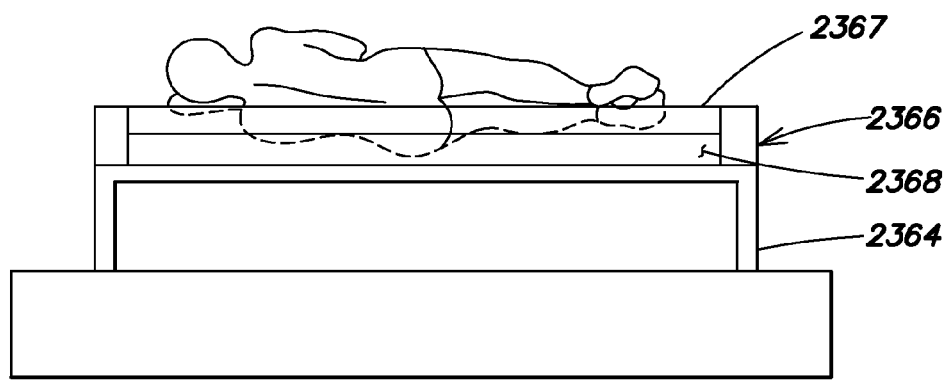
FIG. 23B illustrates a mattress in accordance with another embodiment of the invention.

FIG. 23B illustrates an embodiment where the mattress 2366 includes a combination of an inflatable bladder 2367 and a compressible layer 2368 that can provide a greater degree of comfort than the mattress 2360 illustrated in FIG. 23A. According to one embodiment, the bladder 2367 is relatively thin, that is, it may be 2" thick, or less than 2" thick when fully inflated. The compressible layer may be a layer of foam, an inner spring or other structure that can compress when weight is placed upon it. According to one embodiment, the compressible layer 2368 interacts with the inflatable bladder 2367 to distribute the weight of the user in a manner that increases the user's level of comfort and allows the user to feel subtle changes in pressure within the inflatable bladder.

In various embodiments, the inflatable bladder 2367 may be coupled to a pressure controller as previously described. Further, a control device (e.g., the control device 2204) may be employed to adjust the firmness of the inflatable device as described above. In addition, various multi-layer embodiments may include three or more layers which may include either or both of a plurality of inflatable bladders and a plurality of compressible layers. According to one embodiment, the inflatable bladder 2367 and the compressible layer 2368 are integrated into an upper layer of a mattress of conventional size, shape and appearance.

Figure 17A:
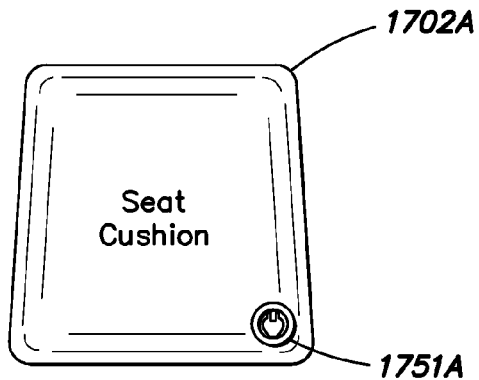
FIGS. 17A-17D illustrate inflatable devices in accordance with embodiments of the invention.
Figure 17B:
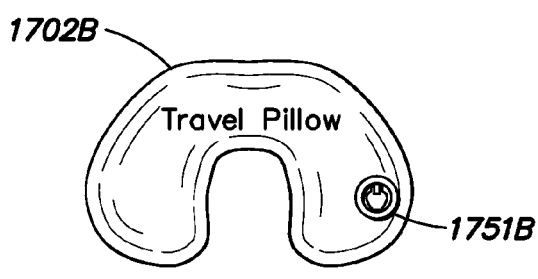
Figure 17C:
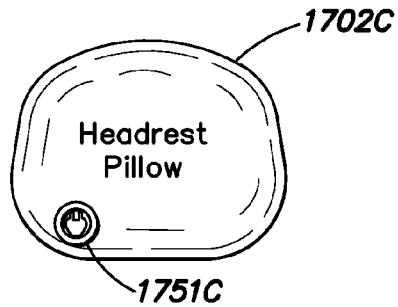
Figure 17D:
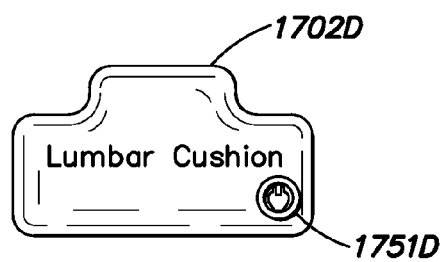

FIGS. 17A-17D illustrate inflatable devices that may be employed with a system (e.g., the system 100, 200, 900) in various embodiments. As indicated in the figures, FIG. 17A illustrates a seat cushion, FIG. 17B illustrates a travel pillow, FIG. 17C illustrates a headrest pillow, and FIG. 17D illustrates a lumbar pillow. In various embodiments, each of the inflatable devices 1702 may be employed with a pressure controller (e.g., the pressure controller 102), a control device (e.g., the control device 104), and a pump (e.g., the pump 108). The fluid couplings for coupling the pressure controller to the pump and to the chamber can be adapted to suit the type of inflatable device with which the controller and pump are employed, for example, a flexible conduit can be employed to couple the pressure controller to the inflatable device. Each of the embodiments illustrated in FIGS. 17A-17D may, for example, be employed with an inflatable device as an accessory device as previously described with reference to FIG. 1. In these embodiments a port 1751 may be fluidly coupled to the pump 108, for example, by a fluid conduit. In one embodiment, the port 1751 includes a self-sealing valve.

Figure 18:
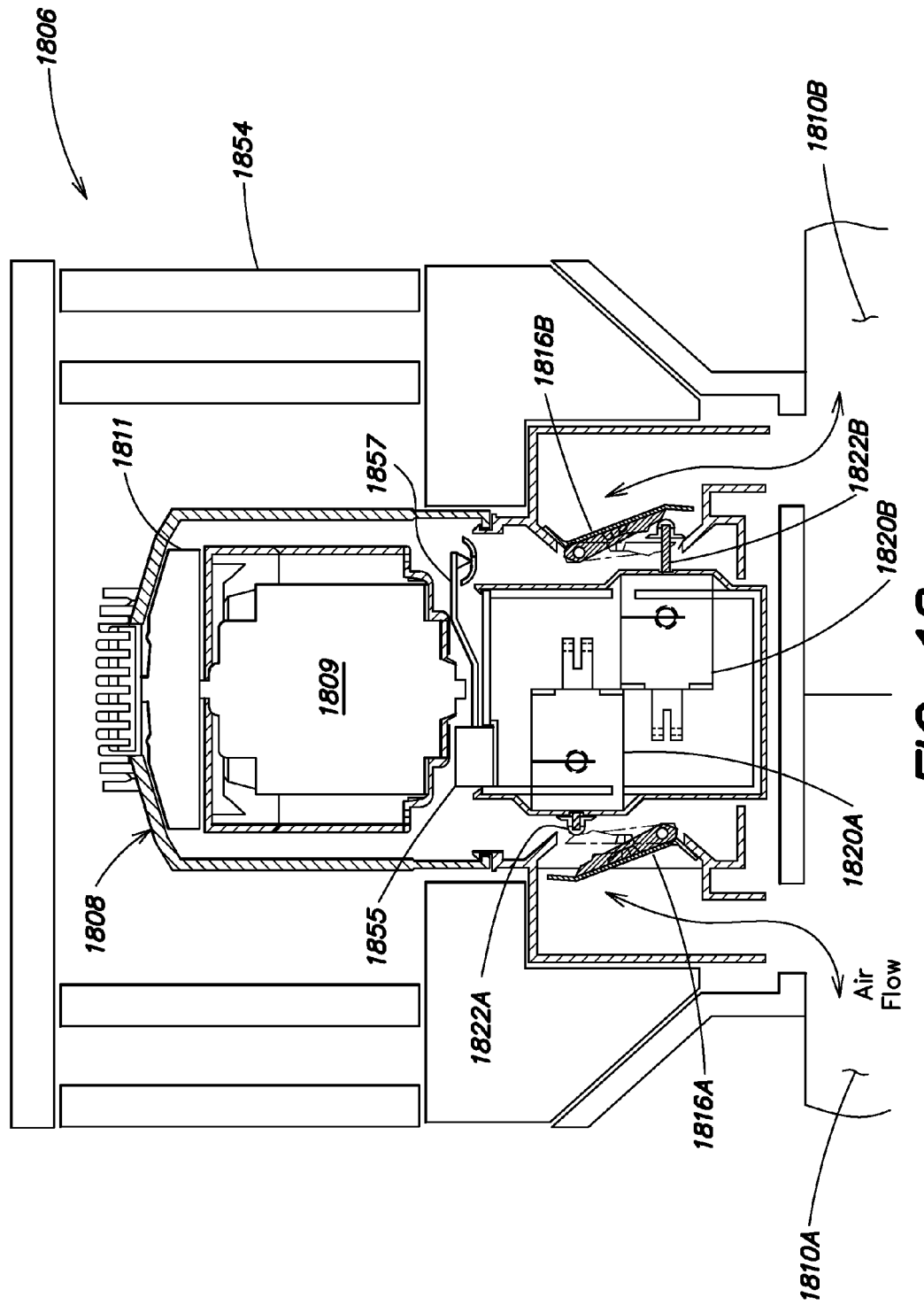
FIG. 18 illustrates a pressure controller in accordance with one embodiment of the invention.

Further, each of the pressure control systems illustrated herein may include any of a variety of embodiments of the pressure controller. As illustrated in FIG. 18, a pressure controller 1806 may include a housing 1854 in which an integral pump 1808, a first valve 1816A, a second valve 1816B, a first valve operator 1820A and a second valve operator 1820B are located. According to one embodiment, the valve operators 1820A, 1820B are solenoids that open the associated valve when energized. In a version of this embodiment, the valve operators 1820A, 1820B are connected to the associated valve by their respective mechanical coupling 1822A, 1822B. In a version of this embodiment, the valves 1816A, 1816B are biased closed by a spring or other structure included in the valve as described below.

In one embodiment, the pressure controller 1806 is fluidly coupled to an inflatable device that includes a first chamber 1810A and a second chamber 1810B. In this embodiment, fluid enters and exits the chambers 1810A, 1810B via a single valve 1816A, 1816B, respectively.

According to one embodiment, the pressure controller 1806 includes an electromechanical device 1855 that biases a control arm 1857 to isolate the chambers 1810A, 1810B from the pump 1808, i.e., to provide a fluid tight seal between the pump 1808 and the valves 1816A, 1816B. In one embodiment, the electromechanical device 1855 biases the control arm 1857 to one of two positions to either allow fluid to be provided to or exhausted from the first chamber 1810A or the second chamber 1810B. In particular, the electromechanical device 1855 biases the control arm 1857 so as to seal off one of the valves from the pump so that fluid can only be provided to or exhausted from one chamber at a time. For example, the first chamber 1810A may be filled with fluid from the pump 1808, wherein the valve 1816A opens up under pressure of fluid provided by the pump 1808. With this condition, the control arm 1857 is rotated under influence from the electromechanical device 1855 to a position to seal off the valve 1816B from the pump 1808 such that fluid is prevented from being provided to the second chamber 1810B. It is to be appreciated that with this arrangement, the control arm 1857 can also be rotated to a second position to seal off the first chamber 1810A from the pump 1808, such that fluid is prevented from being provided to the first chamber 1810A. In the second position of the control arm 1857, fluid can be exhausted from or provided to the second chamber 1810B. In other words, in one embodiment of the pressure controller 1806 of FIG. 18, only one of the two chambers may be inflated or exhausted at any one time. It is thus to be appreciated that with the arrangement of FIG. 18, one chamber cannot be inflated at the same time that the second chamber is deflated. It should also be appreciated that the electromechanical device 1855 may not be included in some embodiments which employ an overseal (e.g., the overseal 236B).

A variety of pumps or other fluid moving devices may be employed with the inflatable device where the pump selection may depend, in part, on the fluid with which the chamber is filled. For example, where the chamber is filled with air, the pump 1808 may be an air pump that includes a motor 1809 and an impeller 1811. The pump 1808 can also be located remote from the pressure controller 1806 where the pump 1808 and the controller 1806 are fluidly coupled by a fluid conduit.

Figure 19:
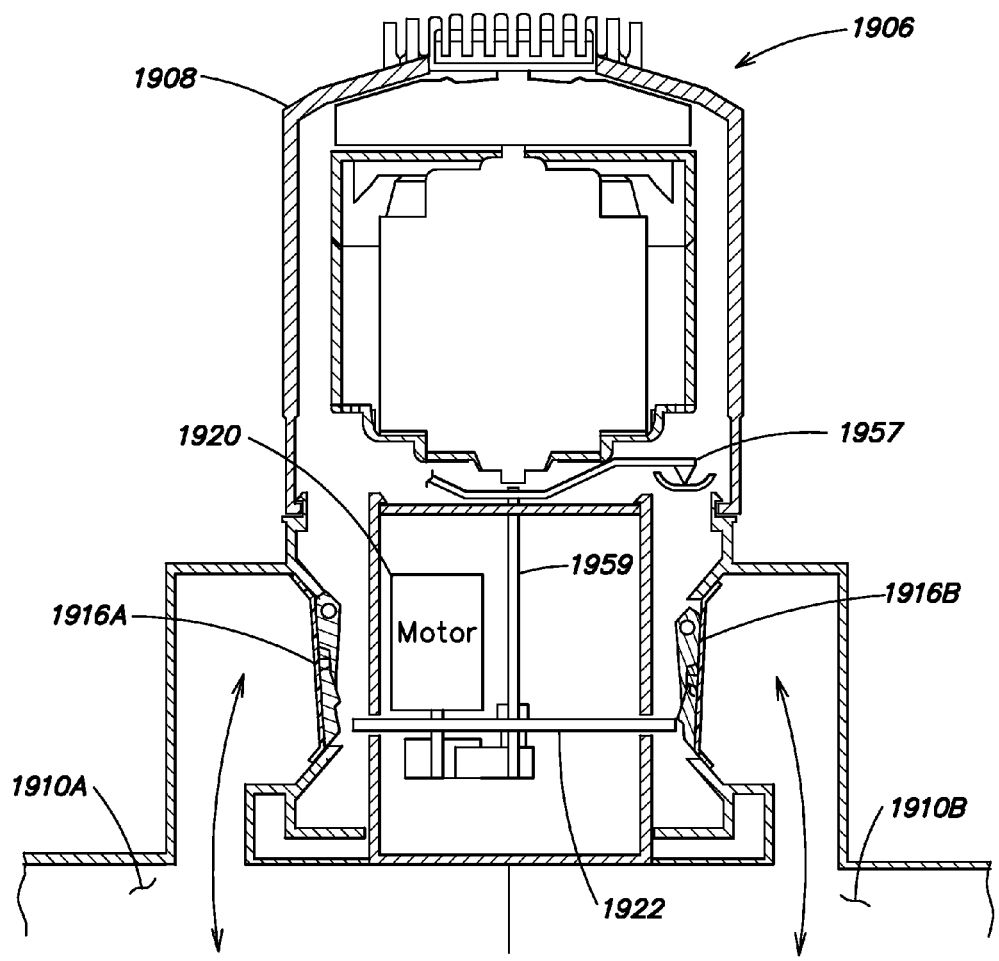
FIG. 19 illustrates a pressure controller in accordance with another embodiment of the invention.

FIG. 19 illustrates another embodiment of a pressure controller 1906 that may include an integral pump 1908. The pressure controller 1906 differs from the pressure controller 1806 because the pressure controller 1906 includes a single valve operator 1920 (e.g., a motor) that can operate in a plurality of positions to alternatively open each of a plurality of valves 1916A, 1916B. For example, the valve operator 1920 may open the valves 1916A, 1916B via a mechanical coupling 1922.

In addition, in one embodiment, a shaft 1959 may also be mechanically coupled to the valve operator 1920 and the control arm 1957 to selectively isolate the valves 1916A, 1916B from the pump 1908 generally in the manner described with reference to FIG. 18. However, in this embodiment, the electromechanical device 1855 is not required. Instead, the control arm 1957 is operated by the valve operator 1920 to fluidly couple the pump to the chamber that is being inflated or deflated while the remaining chamber remains isolated.

Figure 20:
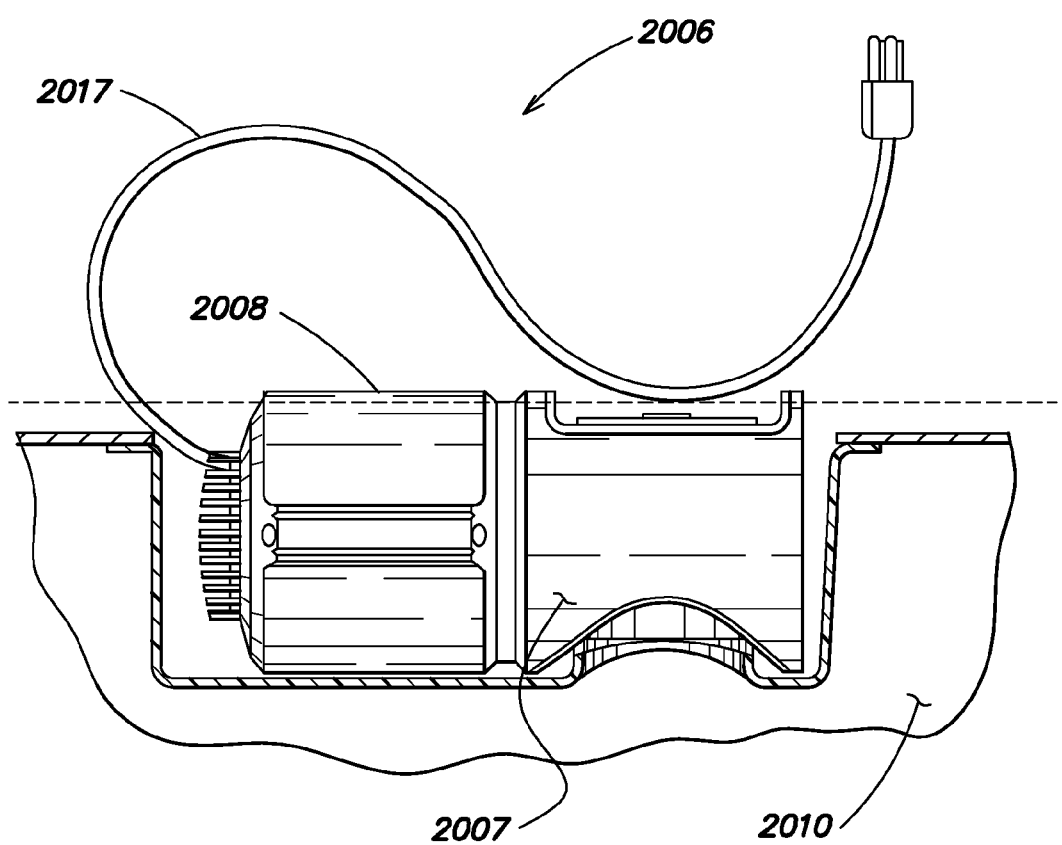
FIG. 20 illustrates a pressure controller in accordance with yet another embodiment of the invention.

Embodiments of the system (e.g., the system 100, 200, 900) may also allow the pressure controller to be located in any of a variety of locations. Referring to FIG. 20, the inflatable device includes a chamber 2010 (e.g., an inflatable bladder) where the pressure controller 2006 includes a valve housing 2007 and a pump 2008 that are located within a profile of the chamber 2010. According to one embodiment, a valve, electronic circuitry, a pressure sensor, a temperature sensor, and a valve operator are included in the pressure controller 2006. In one embodiment, electric power is supplied to the pressure controller 2006 via an electrical cord 2017.

In various embodiments, a hand held control device may be employed with any of the pressure controllers 1806, 1906, and 2006, for example, to communicate a user's preferred pressure setting to the pressure controller.

The valves employed with the pressure control system may include any of a variety of valves. For example, the valves may include a diaphragm including either a flexible diaphragm, a semi-rigid diaphragm, or a rigid diaphragm. The valves may be mechanically coupled to a valve operator that is employed to open and close the valve. In some embodiments, the valve is a self-sealing valve that is biased closed by a spring or other structure included in the valve. In versions of these embodiments, the self-sealing valve may be biased open by the pressure of the fluid that is exhausted from the outlet of the pump (e.g., the pump 108) included in the pressure control system.

Figure 21A:
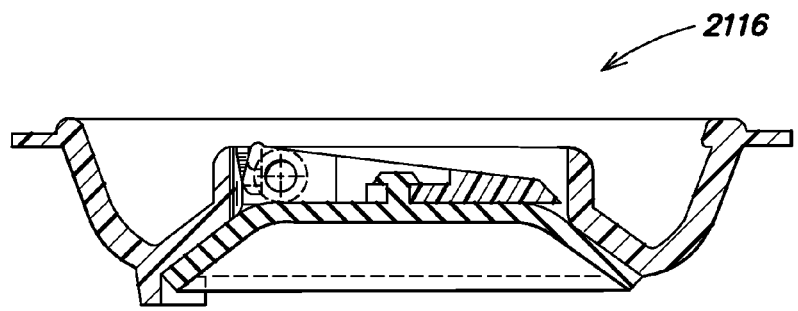
FIGS. 21A-21C illustrate a valve in accordance with an embodiment of the invention.

FIG. 21A is a cross sectional view of one embodiment of a self-sealing valve assembly that can be used with embodiments of the pressure control system described above. FIG. 21A illustrates the valve 2116 in a closed position. This embodiment and other embodiments of a self-sealing valve assembly are described in more detail in U.S. Pat. No. 6,237,621 owned by applicant, which is incorporated herein by reference.

According to one embodiment, the self-sealing valve includes a single port, that provides for inflation, deflation and comfort control of the inflatable device in which the self-sealing valve is integrated. The self-sealing valve 2116 self-opens upon inflation of the device by an inflation device, for example, by turning the pump on, and self-seals upon cessation of inflation.

In one embodiment, the single fluid port may have an unobstructed fluid path that is greater than approximately 0.25 inches in diameter. However, it is to be appreciated that the single fluid port may have other diameters to accommodate different inflatable devices sizes and fluid flow parameters.

Figure 21B:
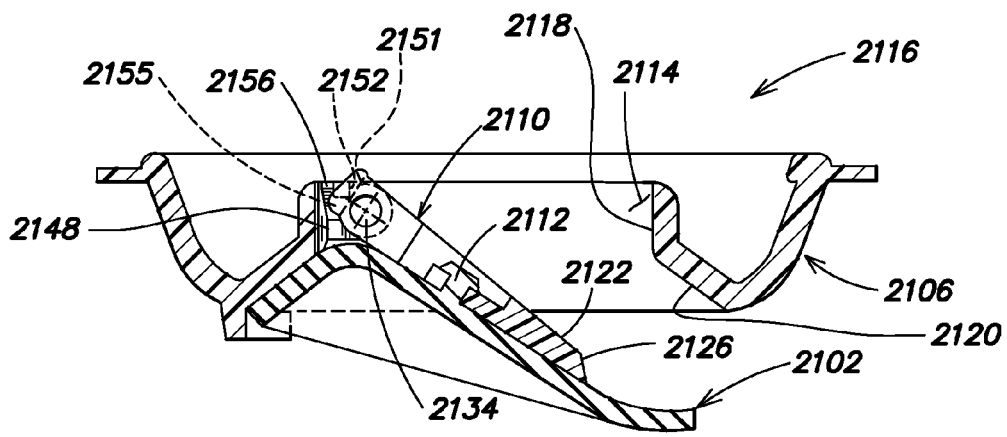
Figure 21C:
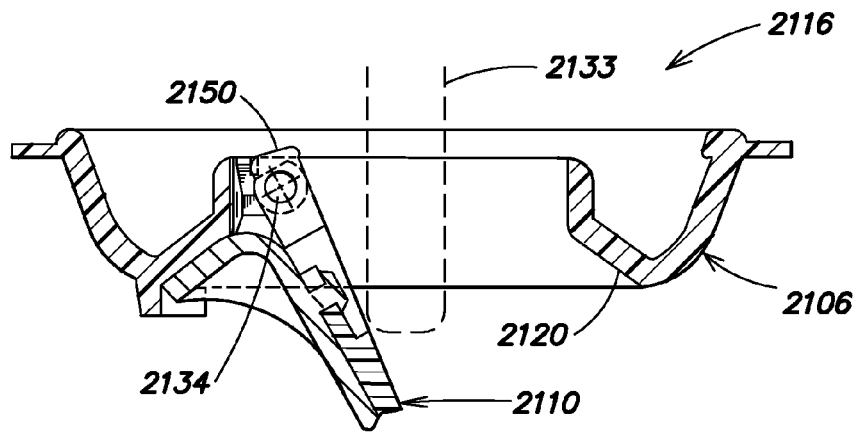

Referring to FIGS. 21B and 21C, there are illustrated various views of the embodiment of the self-sealing valve 2116 of FIG. 21A in an open position when employed with an air fluid system. Some of the structure that allows for the self-sealing valve to operate as herein described includes a diaphragm 2102 positioned within a valve housing 2106 by a movable hanger arm 2110 which suspends the diaphragm from a mounting point 2112 in the center of an air inlet 2114. The hanger arm 2110 is a rotating diaphragm hanger that is removably contained within the air inlet 2114 of the valve housing 2106, with one end secured adjacent to an inner wall 2118 of the air inlet 2114. A point of attachment of the one end of the hanger arm 2110 to the inner wall 2118 is configured to allow the hanger arm 2110 to pivot downward into the valve housing 2106, a motion which unseats the diaphragm 2102 from a valve seat 2120, in a closed position, and opens an airpath into the bladder of the chamber to allow for both inflation and deflation of the surface comfort layer device.

According to one embodiment of the self-sealing valve 2116, the hanger arm 2110 flares outward towards the inner wall 2118 of the air inlet 2114 creating a "paddle" surface 2122 which occupies some of the air inlet 2114. The paddle surface 2122 of the hanger arm 2110 provides stability to the flexible diaphragm 2102 as it rotates with the hanger arm 2110 from the closed position to the open position. The paddle surface 2122 of the hanger arm 2110 may also facilitate manipulation of the hanger arm 2110 by, for example, a valve operator and an associated mechanical coupling, to control a pressure of the inflatable device in which the self-sealing valve is integrated. An embodiment of a mechanical coupling 2133 is illustrated in phantom in FIG. 21C. The paddle surface 2122 projects outward to a point 2126, extending the length of the hanger arm 2110. This projection bears upon the flexible diaphragm 2102, thereby preventing it from flexing upward when the hanger arm 2110 is pressed downward for firmness control or deflation.

The hanger arm 2110 may be secured within the air inlet 2114 with, for example, a pair of hinge pins 2134. In one example, there is a contoured section 2148 between the hinge pins 2134 of the inner wall of at least one of the brackets and the inner wall 2118 of the air inlet 2114. The contoured section 2148 interfaces with a contoured end 2150 of the projecting tabs to provide a plurality of distinct interaction possibilities. A first possibility exists when surface 2151 on the projecting tabs bears on surface 2152 of the inner wall, restricting rotation of the arm above a horizontal position, thereby securing the valve diaphragm in a substantially closed position.

A second possibility exists when a beveled surface 2155 on the projecting tab bears on counter-beveled surface 2156 on the wall. An inclined angle of this counter-beveled surface 2156 causes the projecting tab to increasingly compress inward as the hanger arm 2110 is pressed downward into the valve housing 2106. This may occur both during inflation (by air pressure or deflection of the hanger arm by the valve operator) and deflation (deflection of the hanger arm engaged by the valve operator to unseat the valve from the valve seat). The compression of the projecting tab also results in a counter action, so that, with removal of the downward pressure the tab "springs back" to its original position and forces the hanger arm 2110 and diaphragm 2102 to return to the closed position. When the hanger arm 2110 is depressed fully (for example at the maximum stroke of the valve operator), the projecting tabs rotate slightly beyond the counter-beveled surface 2156 and lock the rotating arm in a locked open position. This locked open position maximizes airflow through the valve housing and will, under certain conditions improve efficiency of both inflation and deflation.

Figure 24A:
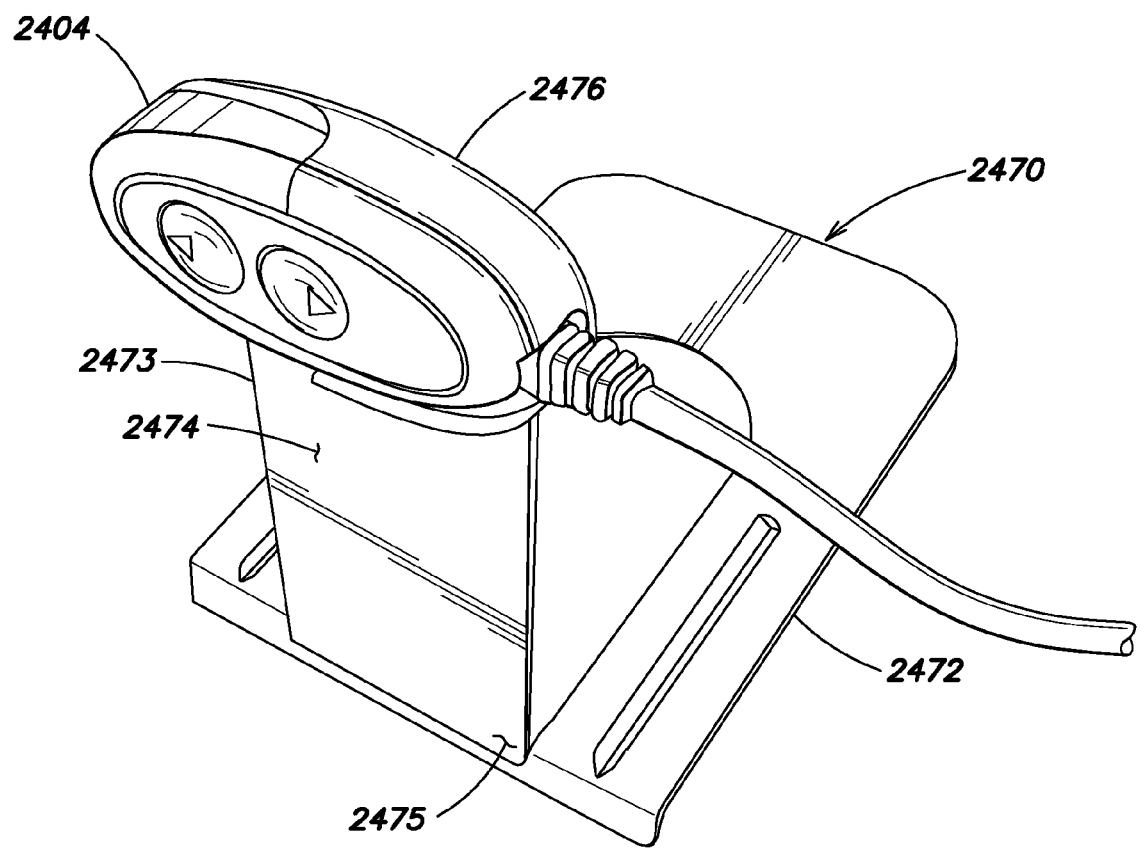
FIG. 24A illustrates an apparatus for storing a control device according to an embodiment of the invention.

Referring now to FIG. 24A, an apparatus for storing a handheld control device 2470 is illustrated according to various embodiments of the invention. In accordance with one embodiment, the apparatus 2470 includes a base 2472 with an arm 2474 projecting from the base. In one embodiment, the arm 2474 includes a proximate end 2475 and a distal end 2473. Further, the apparatus 2470 may also include a receiving member 2476 which in some embodiments may include a housing and/or receptacle. In various embodiments, apparatus 2470 may be configured to receive any of a wireless handheld control device and/or a hardwired (e.g., tethered) handheld control device.

In general, the apparatus 2470 is configured to locate a control device 2404 within reach of a user while the user is employing an inflatable device. Embodiments of the apparatus 2470 may be employed with all types of inflatable devices. In particular, embodiments of the apparatus 2470 may be employed with one or more body support devices such as mattresses, pillows, seat cushions, lumbar support devices and/or body pillows. According to various embodiments, the receiving member 2476 is configured to both secure the control device 2404 to the apparatus 2470 and to allow the user to remove the control device from the apparatus, e.g., when the user is employing the inflatable device. Accordingly, the user may employ the apparatus 2470 to locate [e.g. removably locate] the control device 2404 in a known location that is easily accessed when the user is employing the inflation device and which allows operation of the control device from multiple positions including those provided with the control device 2404 received by the apparatus 2470. Thus, in some embodiments, the apparatus 2470 allows the user to more easily operate the control device 2404 to adjust an inflation level of the inflatable device while the user maintains contact with the inflatable device. For example, embodiments allow the user to employ the control device 2404 to adjust the inflation level while the user maintains contact with the inflatable device when the control device 2404 is received by the apparatus 2470.

According to one embodiment, the base 2472 is configured to secure the apparatus 2470 adjacent the inflatable device. In one embodiment, the arm 2474 projects substantially perpendicular from the base 2472. Further, in one embodiment, the receiving member 2476 is located at the distal end 2473 of the arm 2474 while the proximate end 2475 is connected to the base 2472. It should be recognized that the receiving member 2476 need not be located at the distal end 2473 but may instead be located at any other position along the length of the arm 2474. In various embodiments, the receiving member 2476 is configured to allow the secure storage of the control device 2404 while also facilitating easy attachment and removal of the control device 2404 to and from, respectively, the apparatus 2470.

Figure 24B:
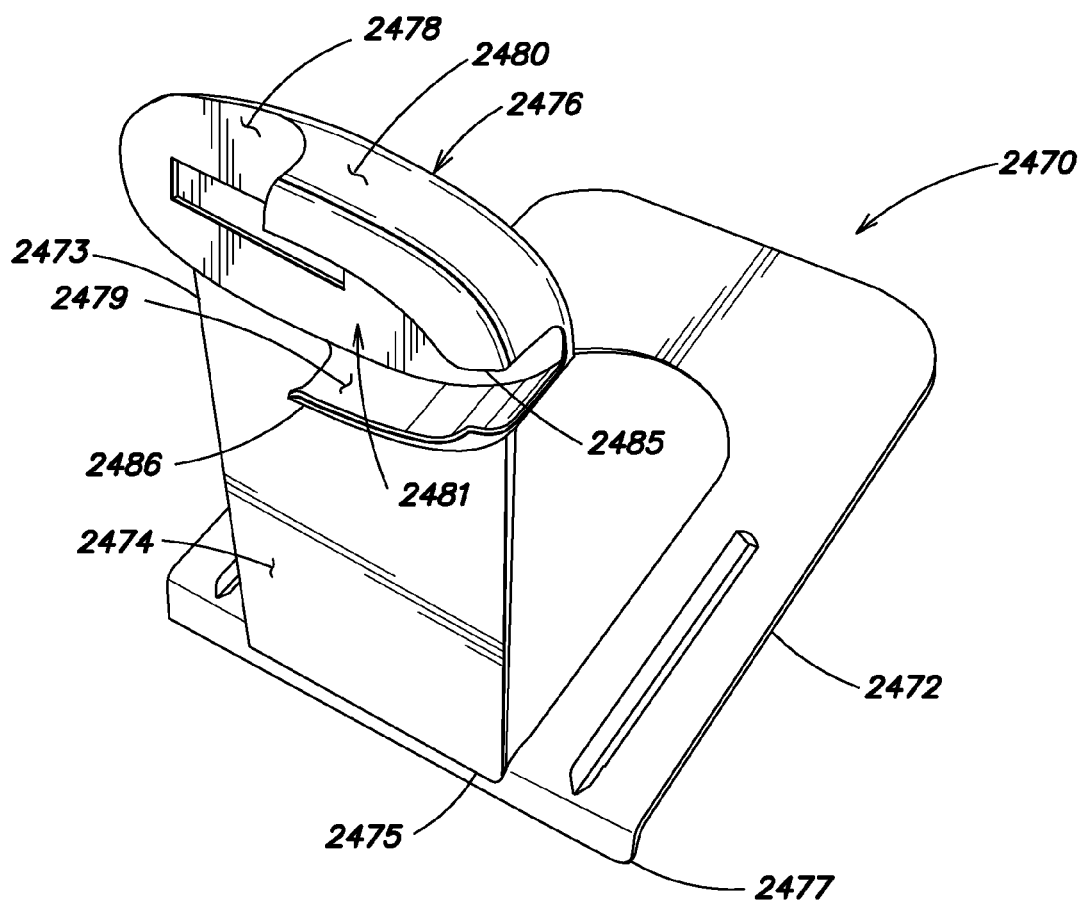
FIG. 24B illustrates another view of the apparatus of FIG. 24A in accordance with one embodiment.

Referring now to FIG. 24B, the apparatus 2470 is illustrated without the control device 2404. FIG. 24B illustrates one embodiment of the receiving member 2476. In this embodiment, the receiving member 2476 includes a base 2478, a first sidewall 2479 and a second sidewall 2480. The base 2478 and the first and second sidewalls 2479, 2480 define an opening 2481 in which the control device 2404 is received. In one embodiment, the first and second side walls 2479, 2480 are attached at opposite sides of the base 2478. Further, in some embodiments, the side walls may include a rim 2485, 2486, respectively, that are configured to retain the control device 2404 within the opening. FIG. 24B also illustrates an embodiment of the apparatus 2470 where the base 2472 includes a flange 2477 to which the proximate end of the arm 2474 is attached.

As illustrated in FIG. 24A, in some embodiments, the opening 2481 is configured to allow access to the control elements of the control device 2404 when the control device 2404 is received by the receiving member 2476. Accordingly, these embodiments allow the user to manipulate and/or activate the control elements when the control device 2404 is received by the receiving member 2476.

As is described in further detail below, the receiving member 2476 may take a variety of forms. For example, the receiving member 2476 may provide a structure that allows the control device 2404 to be located at any of the plurality of locations along the arm 2474. Such a structure may be provided via a plurality of fixed locations along the arm 2474. Alternatively, or in combination therewith, a structure including a plurality of positions may be provided via one or more adjustable elements of the apparatus 2470. In one embodiment, the adjustment(s) allow the user to adjust the location of the receiving member 2476.

According to various embodiments, the base 2472 may include any structure that allows the apparatus 2470 to be securely located adjacent the inflatable device. Here, the term securely refers to the fact that the apparatus 2470 is located in a substantially fixed location that remains fixed during normal use of the inflatable device. As will be apparent to one of ordinary skill in the art, however, these embodiments of the apparatus 2470 also allow the user to adjust and reposition the apparatus 2470 and/or receiving member 2476 with respect to the inflatable device. For example, a first user may prefer to locate the apparatus 2470 closer to the head of a mattress. A second user, however, may prefer to locate the apparatus 2470 nearer the user's waist or on an opposite side of the mattress. Embodiments of the apparatus 2470 allow the relocation of the apparatus to a plurality of locations adjacent the inflatable device with which it is used. Accordingly, embodiments of the apparatus 2470 allow the relocation of the control device 2404, when received by the receiving member 2476, to a plurality of locations with respect to the inflatable device.

In various embodiments, the base 2472 need not include a shape that is substantially flat. Instead, the base 2472 may be any shape and include any structure that allows the apparatus 2470 to be securely located adjacent the inflatable device. For example, the base 2472 may include a clamp or other hardware that allows the base to be attached to the inflatable device, a frame of the inflatable device or to adjacent structure such as a headboard, or a table/nightstand located adjacent the inflatable device.

Figure 25A:
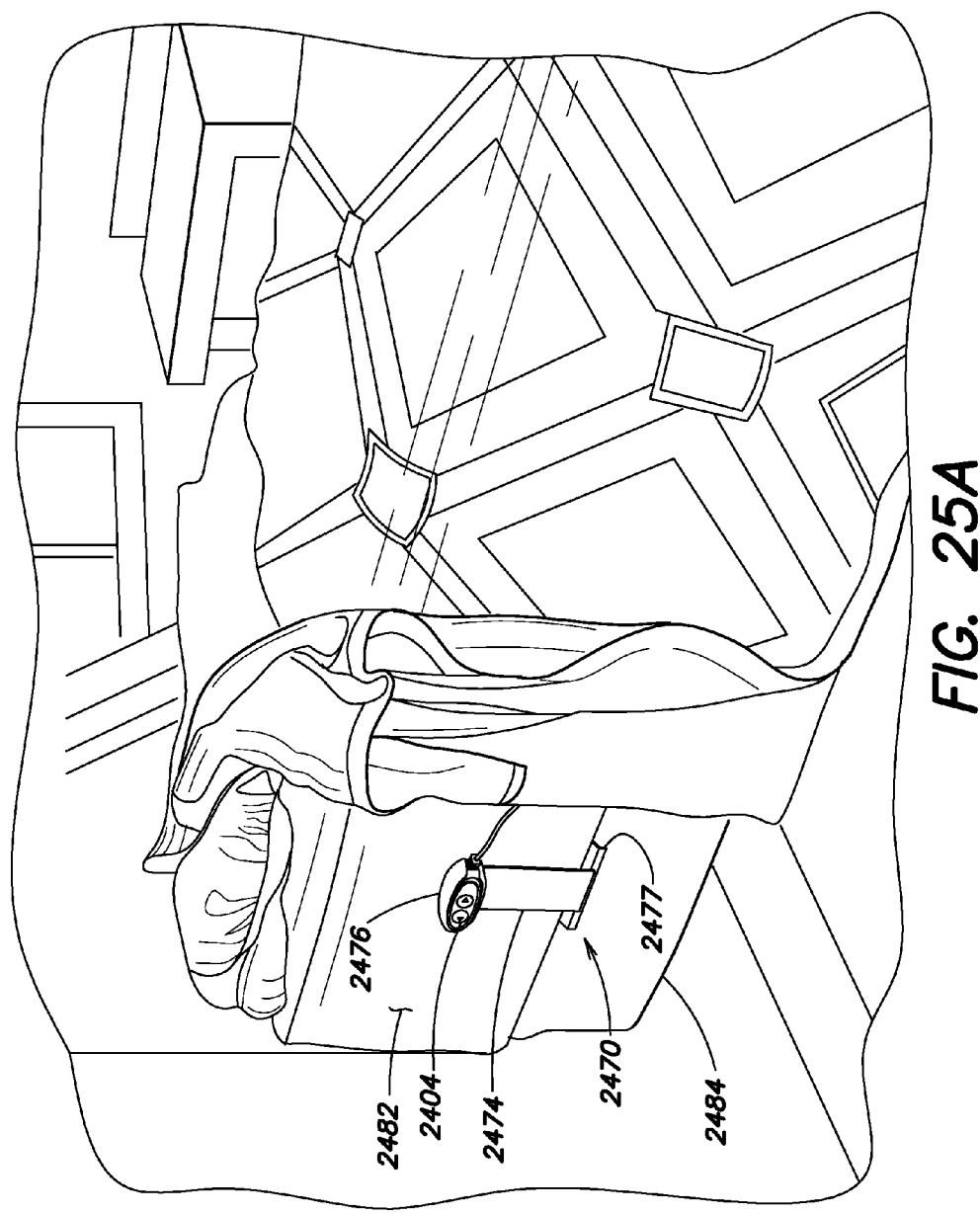
FIG. 25A illustrates the apparatus of FIG. 24A employed with an inflatable device in accordance with one embodiment.

Referring now to FIG. 25A, there is illustrated an apparatus 2470 is shown in use with an inflatable device. In the illustrated embodiment, the inflatable device is included in a mattress 2482. However, embodiments of the apparatus 2470 may be employed with all forms of inflatable devices that provide support for all or a portion of a user's body. In one embodiment, the mattress 2482 is included in a bed that includes a foundation 2484 that supports the mattress 2482 above the floor.

According to one embodiment, the base 2472 of the apparatus 2470 is inserted between the mattress 2482 and the foundation 2484 to locate the apparatus (including the receiving member 2476) at a suitable location which is easily accessed by a person using the bed. Further, in the illustrated embodiment, the flange 2477 provides a lip that may engage the foundation 2484 such that the arm 2474 and receiving member 2476 are located proximate the inflatable device when the base 2472 is fully inserted between the mattress 2482 and the foundation 2484.

Figure 25B:
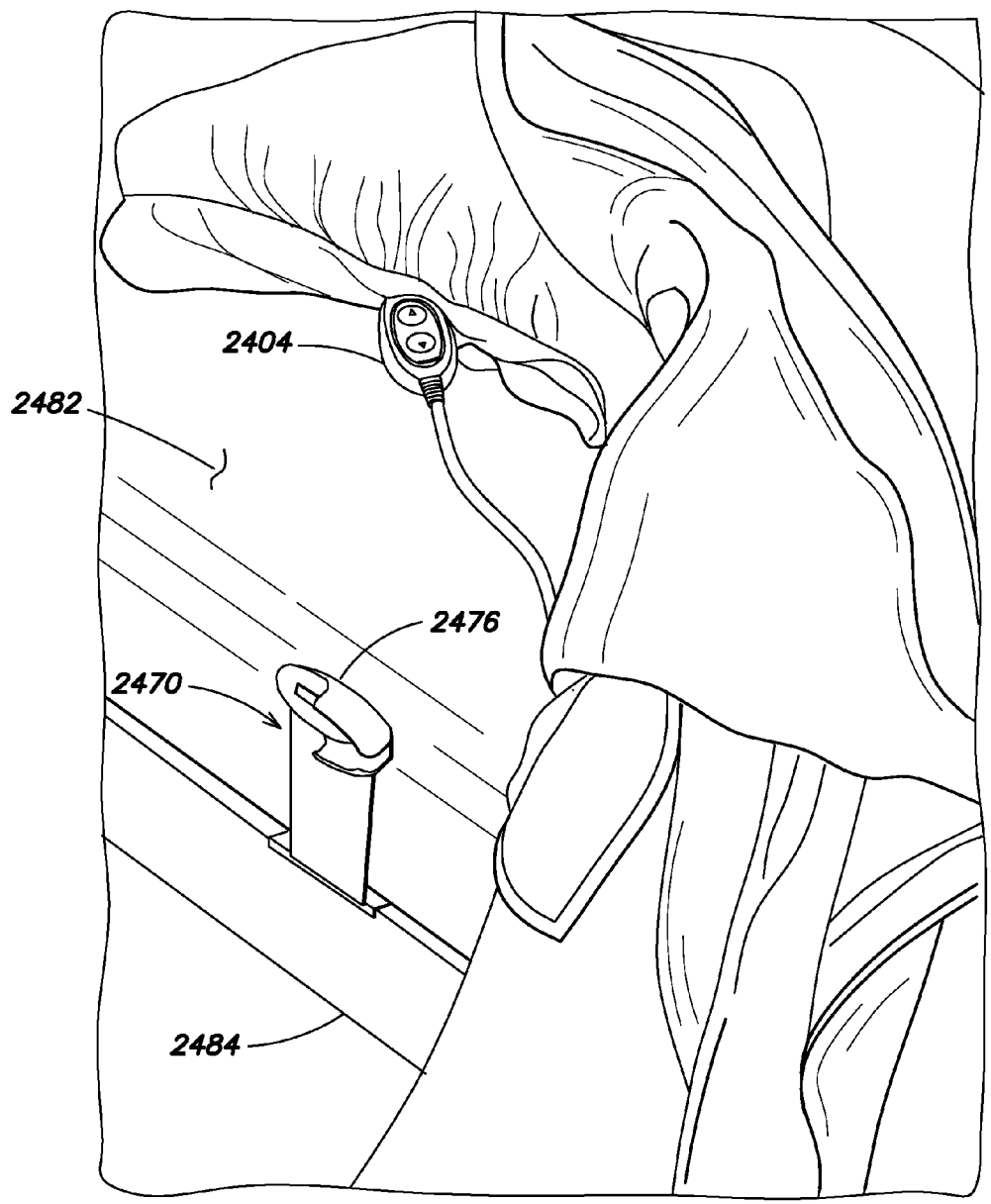
FIG. 25B illustrates another view of the apparatus of FIG. 24A employed with an inflatable device in accordance with one embodiment.

Referring now to FIG. 25B, the apparatus 2470 is illustrated with the control device 2404 removed from it. For example, a user lying on the inflatable device 2482 may desire to have the control device 2404 in-hand to adjust the inflation level of the inflatable device 2482. Following an inflation adjustment, the user may return control device 2404 to the apparatus by placing it in the receiving element 2476. The apparatus 2470 provides the user ready access to the receiving member 2476 and consequently the control device 2404 when it is received by the receiving member. Accordingly, the user lying on the mattress is aware of the location of the control device 2404. Further, the apparatus 2470 allows the control device to be stored in a location that is conveniently accessed yet out of the way.

According to one embodiment, the user may locate the receiving element 2476 within reach when employing the inflatable device. Such an approach allows the user to manipulate and/or activate the control elements of the control device 2404 without removing the control device from the receiving member. Thus, in some embodiments, the user may adjust the inflation level of the inflatable device without removing the control device 2404 from the receiving member 2476.

According to the illustrated embodiment the apparatus 2470 also allows the user to adjust the location of the apparatus 2470 and consequently the receiving member 2476 to any of a variety of positions by moving the apparatus 2470 laterally to the left or right as illustrated with reference to FIG. 25B. That is, the base 2472 may be slid between the mattress 2482 and the foundation 2484 to a variety of lateral positions. A foundation may include any structure that the mattress 2482 may rest upon including the floor. For example, the foundation may include a frame, springs and/or other structure suitable for supporting the mattress 2482.

Although, as illustrated, the arm 2474 of apparatus 2470 is fixed, other embodiments may include an arm that is adjustable to a plurality of positions with or without adjusting the position of base 2472. For example, the arm 2474 may be telescoping such that the elevation of the receiving member 2476 may be adjusted to any of a plurality of positions where the plurality of positions are at different elevations relative to one another. Further, the arm 2474 may be attached to the base 2472 in a manner that allows the arm to be pivoted and to be rotated about the point of attachment. According to one embodiment, the arm 2474 or a portion thereof is rotatable about a point of rotation located somewhere from the proximate end 2473 to the distal end 2475 of the arm 2474. In this embodiment, the arm 2474 may be adjustable to a plurality of positions through a substantially arcuate movement that allows simultaneous adjustment of both elevation and lateral position of the receiving member 2476. Alternate embodiments can provide an adjustment based on a primarily linear movement or a combination of linear and arcuate movement.

Thus, various embodiments provide an apparatus 2470 adapted to allow the receiving member 2476 to be moved through a plurality of positions in any direction. According to one embodiment, any combination of position adjustments may be made to the receiving member (for example, 360 degrees of movement relative to the then current position of the receiving member 2476).

The receiving member 2476 may include any of a variety of structure provided that the receiving member 2476 is configured both to securely and removeably receive the control device 2404. For example, in one embodiment, the apparatus 2470 includes a strip of hook and loop fasteners (i.e., VELCRO) that may be affixed either on or adjacent to the inflatable device. According to one embodiment, a vertical strip of hook and loop fasteners is attached to bedding within reach of the user. Such a strip of hook and loop fasteners may, in various embodiments, be fixed in alternate positions, for example, horizontally, diagonally, etc. either on or adjacent to the inflatable device. Further to these embodiments, the control device 2404 is provided with a corresponding set of hook and loop fasteners such that it may be placed in engagement with the apparatus 2470 to locate the control device 2404 proximate the inflatable device. In other embodiments, the apparatus 2470 includes pins, clamps, buttons, snaps or other fasteners suitable for securing the apparatus with a receiving member 2476 including a hook and loop fastener (or other structure) adjacent to the inflatable device. These embodiments may provide an embodiment of the apparatus 2470 where the plurality of locations are included along a strip of hook and loop fasteners.

The apparatus provides further advantages for the user of an inflatable device. For example, in one embodiment, the apparatus 2470 is configured to locate the handheld control device with respect to the inflatable device to be within reach of the user while the user is reclined on an inflatable device without the user adjusting from a reclined posture and without the user removing the control device 2404 from the receiving member 2476. In yet another embodiment, the apparatus 2470 is employed with an inflatable device that includes posture control. According to one embodiment, the apparatus 2470 is configured to locate the handheld control device with respect to the inflatable device to be within reach of the user while the user remains reclined on an inflatable device without the user adjusting a posture setting of the inflatable device and without the user removing the control device 2404 from the receiving member 2476.

Various embodiments of the apparatus 2470 may be employed to locate a valve (or other means of manual adjustment of the inflation level in an inflatable device) within reach of the user while the user employs the inflatable device, for example, without the user adjusting from a reclined position. According to one embodiment, the apparatus 2470 is employed with valve connected to the inflatable device by a conduit. According to this embodiment, the apparatus 2470 may include the previously-illustrated base 2472 and arm 2474 with a receiving member (e.g., the receiving member 2476) configured to receive and removably secure the valve.

According to one embodiment, the base 2472 is configured to secure the apparatus 2470 adjacent the inflatable device. In one embodiment, the arm 2474 projects substantially perpendicular from the base 2472. Further, in one embodiment, the receiving member 2476 is located at the distal end 2473 of the arm 2474 while the proximate end 2475 is connected to the base 2472. It should be recognized that the receiving member 2476 need not be located at the distal end 2473 but may instead be located at any other position along the length of the arm 2474. In various embodiments, the receiving member 2476 is configured to allow the secure storage of the control device 2404 while also facilitating easy attachment and removal of the control device 2404 to and from, respectively, the apparatus 2470.

Figure 26A:
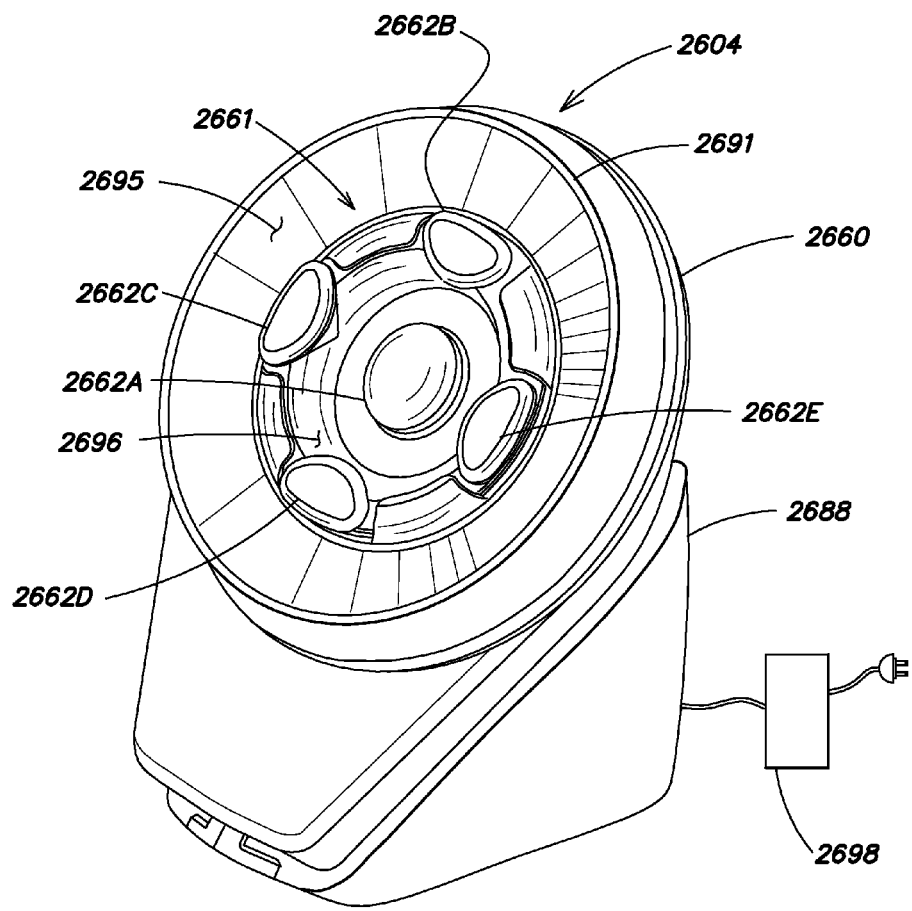
FIG. 26A illustrates a control device and receiving member in accordance with one embodiment.

Various embodiments of the invention may include a receiving member 2688 as illustrated in FIG. 26A. The receiving member 2688 may be employed with a variety of control devices 2604, for example, wireless control devices or hardwired control devices. The receiving member 2688 may be configured to receive a control device 2604 in any of the previously described configurations or combinations thereof.

As previously described herein, the control device 2604 may include a power source. Further, the power source may be a battery power source which may include rechargeable batteries or non-rechargeable batteries. According to one embodiment, the receiving member 2688 is employed with a hardwired control device 2604 and the receiving member 2688 is not connected to a source of external power. Alternatively, the receiving member 2688 may be connected to an external power source that is employed to recharge a rechargeable power source integral to the control device 2604 (e.g., trickle charge). For example, the receiving member 2688 may be connected to an external 120 volt power source which is converted by recharging circuitry 2698 to a voltage and current suitable for recharging a power source integral to the control to device 2604 when the control device 2604 is received by the receiving member. Further, the recharging circuitry 2698 may include either or both of power conversion circuitry and current limiting elements. According to one embodiment, the recharging circuitry includes one or more of a transformer and rectifier. In a further embodiment, the recharging circuitry 2698 is located external to the receiving member 2688, while in an alternative embodiment, the recharging circuitry 2698 is included as a part of the receiving member 2688. In a further embodiment, a receiving member 2688, which is connected to an external power source, is employed with a hardwired control device that does not require recharging. In other words, the available recharging circuitry may be provided but not used, or may not be included at all.

The receiving member 2688 may be employed in various configurations. For example, in one embodiment, the receiving member 2688 may be included with the apparatus 2470 for storing a control device as previously described with reference to FIGS. 24A through 25B.

Other features of the control device 2604 were previously described herein. For example, the control device may include a user interface 2661 that includes a plurality of control elements 2662. Further, the control device 2604 may include a housing 2660 that is configured for handheld use. According to the embodiment illustrated in FIG. 26A, the control device 2604 includes a rim 2691 with a surface 2695 that slopes radially inward from the rim towards the control elements 2695. A first set of control elements 2662B, 2662C, 2662D, and 2662E may be included at the radially inward end of the surface 2695. As illustrated in the embodiment shown in FIG. 26A, a centrally located control element 2662A may be included in a further recessed surface 2696. According to one embodiment, the overall configuration of the control device 2604 and the housing 2660 recess the control elements 2662 to help prevent accidental adjustments to the inflation level of the inflation device that the control device 2604 is employed with.

Figure 26B:
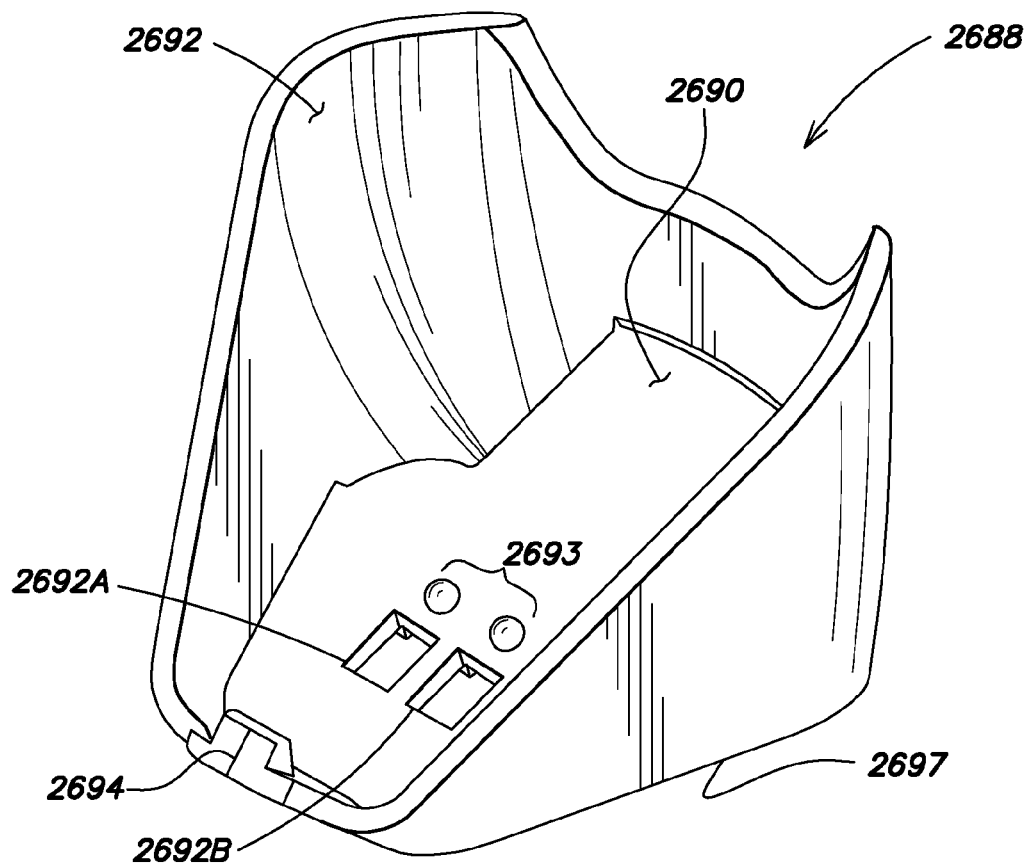
FIG. 26B illustrates the receiving member of FIG. 26A.

Referring now to FIG. 26B the receiving member 2688 is illustrated with the control device 2604 removed from it. In the illustrated embodiment, the receiving member 2688 includes a base 2690 and a sidewall 2692 connected to a periphery of the base 2690. In various embodiments, the height of the sidewall 2692 may vary relative to the base 2690 while in some embodiments the sidewall 2692 may include a more uniform height. The overall configuration of the sidewalls 2692 and base 2690, in the illustrated embodiment, define a recess that is configured to retain the control device 2604 and in particular, the housing 2660 when it is received by the receiving member 2688. Further, the sidewalls either alone or in combination with other structure not illustrated may provide a surface 2697 on which the receiving member 2688 rests when it is placed on, for example, a flat surface. In some embodiments, the receiving member 2688 may include additional structure or hardware that allow the receiving member 2688 to be attached to the apparatus 2470 as described previously with reference to FIGS. 24A through 25B.

Additional structure may be provided as part of the receiving member 2688 to help secure and properly align the control device 2604 when received by the receiving member 2688. For example, the receiving member may include tabs 2694 or projections 2693 or some combination of these and/or other structural features to accomplish the purpose of properly aligning and releasably securing the control device 2604 to the receiving member 2688. In the illustrated embodiment, the tab 2694 projects inward from the sidewall 2692. In a version of this embodiment, the control device 2604 includes a corresponding receptacle which mates with the tab 2694 when the control device 2604 is properly aligned and positioned within the receiving member 2688.

In the illustrated embodiment, the receiving member 2688 includes electrical receptacles 2692A and 2692B that are configured to locate one or more electrical contacts employed in connecting the control device 2604 to the recharging circuitry 2698 to recharge a power source located in the control device 2604. For example the receptacle 2692A and 2692B may be connected to recharging circuitry and an external source of power as previously described. In various embodiments, the control device 2604 will include corresponding structure and/or corresponding electrical contacts to mate with electrical contacts provided in the receptacles 2692A and 2692B to complete a recharging circuit when the control device 2604 is properly aligned and set in the receiving member 2688. The electrical contacts may include any of a variety of structure well known by those of ordinary skill in the art including male and female pins, flat contact surfaces, etc. The projections 2693 may be employed to properly align the control device 2604 in the receiving member 2688. This function may include alignment and control of the depth of penetration of elements of the control device 2604 that extend into the receptacles 2692A, 2692B when the control device 2604 is received by the receiving member 2688. In other words, the protrusions 2693 may provide structure that controls a contact engagement and/or penetration between the electrical contacts included in the receiving member 2688 and the contacts included in the control device 2604.

Figure 27:
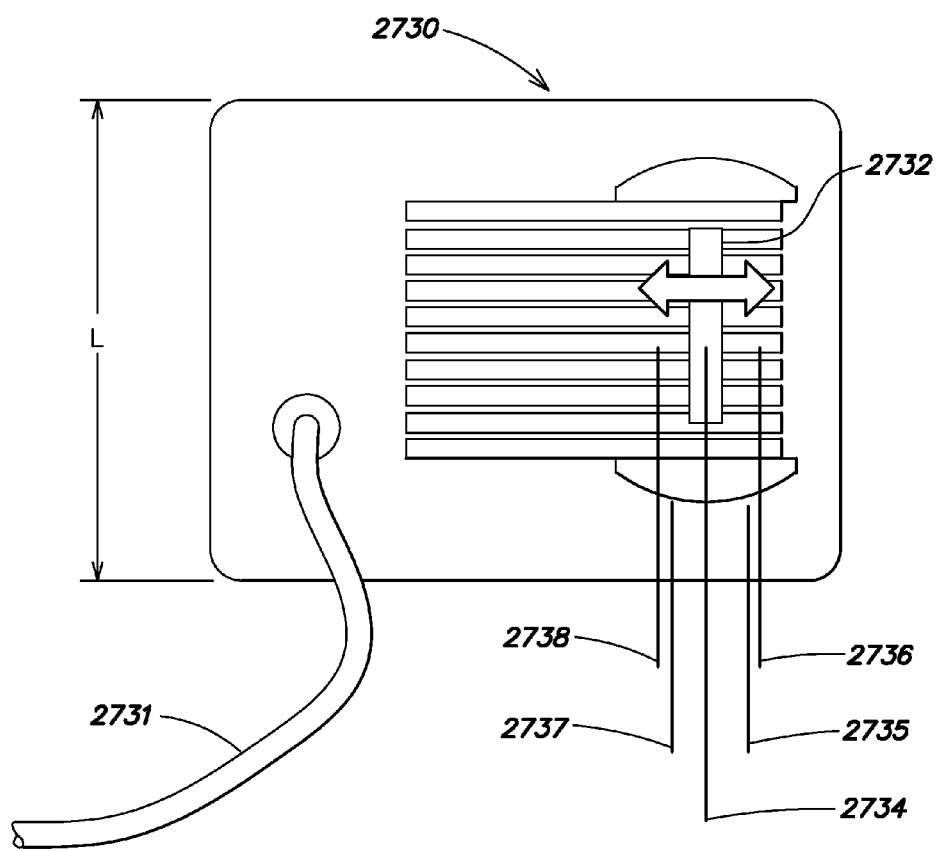
FIG. 27 illustrates a schematic view of a control device according to one embodiment.

Referring now to FIG. 27, there is illustrated one embodiment of a control device 2730 that can be used with a fluid controller and an inflatable device according to an embodiment of the invention, for example, the control device 2730 may be employed with the pressure controller 206 described herein. It is to be appreciated that one embodiment of an inflatable device can include a substantially fluid impermeable bladder and a fluid controller that comprises an electrically powered pump at least partly positioned within bladder, such as disclosed herein with reference to FIG. 20 and in applicant's U.S. Pat. No. 5,267,363. In addition, embodiments of the control device 2730 may be employed with systems such as the systems 100 and 200 described herein with reference to FIGS. 1 and 2, respectively. Further, embodiments of the control device, for example, control devices 604, 804, 2204 and 2604 may include one or more features of the control device 2730 or at least the functionality of the control device 2730 described herein.

The bladder may be constructed in any manner and of any material(s) capable of retaining a desired fluid under a degree of pressure necessary for its intended application. For example, the bladder may be constructed of a substantially fluid impermeable barrier and may be shaped in accordance with its intended use. Where bladder is intended for use as a mattress, bladder may be constructed in the shape and thickness of a conventional mattress. For example, the inflatable devices may include a mattress as illustrated in FIGS. 1-3, 23A and 23B.

The following aspects of embodiments of bladders may be included in various embodiments of the chambers and the bladders described herein (e.g., the chamber 100, the bladder 2362, etc.). For example, the bladder may include internal structure, such as ribs or partitions. For example, the bladder may be divided into two or more separate fluid containing compartments. The bladder may also include internal structure to control the movement of fluid within the bladder. For example, the bladder may include baffles or walls within the bladder to improve the flow of fluid when the bladder is inflated or deflated.

A wall of the bladder may be any thickness required to substantially contain a fluid under pressures at which the bladder will be used. A thickness of the wall of the bladder (e.g., the bladder 2362) may depend upon material from which the bladder is constructed. For example, more durable or elastic materials may not require the wall of the bladder to be as thick as a wall-thickness employed with less durable or elastic materials. Typically, the wall of the bladder may be 4-16 mils thick for polyvinyl chloride (PVC) film and polyurethane materials.

The bladder may be constructed of any material or materials capable of substantially containing a fluid and forming a bladder strong enough to withstand a pressure at which the bladder (e.g., the bladder 2362) is to be used. For example, the bladder may be constructed of a polymeric material, such as a thermoplastic. The bladder may be constructed from a relatively inexpensive, easy to work with and durable material. Some example materials include polyvinyl chloride (PVC) film and polyester. The manner of making the bladder may depend on its material of construction and configuration, as will be recognized by one of ordinary skill in the art.

The bladder may include additional materials to improve the utility and comfort of the bladder. For example, the bladder may include outer layers or coatings for durability, support or comfort. In some embodiments, the bladder may be coated with a material that is more pleasant to the touch than the material from which bladder is constructed. Where an inflatable device is for use in supporting a person, the bladder may also include a layer to provide additional comfort, particularly where the person is to contact the bladder. For example, the bladder may include a comfort layer. The comfort layer may be located on any surface of the bladder that may come into contact with a user of inflatable device. The comfort layer may improve the texture and feel of the bladder and, further, may allow air and moisture to pass between a person and the bladder, to prevent discomfort.

The fluid controller may be constructed in any manner and using any materials that allow fluid controller to control the flow of fluid into and/or out of the bladder. In one embodiment, fluid controller includes a pump that may be constructed in any manner and using any materials that allow it to inflate and/or deflate the bladder. For example, the pump may be a conventional fluid pump including a motor that drives an impeller moving air into, or out of, the bladder. Where the pump includes a motor, the motor may be powered by electricity. Electricity may be provided by a connection to standard house current or, where portability is desired, by batteries. Other types of pumps, such as diaphragm pumps, may also be used so long as they allow the pump to inflate the bladder to within a desired pressure range, which may include a pressure range that can be adjusted by, for example, by another fluid pumping device, such as someone blowing into a conventional valve stem within the bladder, a foot pump, and the like.

The fluid controller may direct fluid flow in any manner consistent with its construction. For example, where the fluid controller includes a pump with a motor and an impeller, the impeller may draw fluid into, or out of, the bladder through a conduit. According to one embodiment, where a pump is included in fluid controller, the pump is able to inflate bladder in a relatively short time period, for example, less than a minute to inflate an inflatable mattress. The pump may be designed to include an appropriately powerful fluid moving mechanism to achieve a desired pumping time to fill a particular inflatable device. The pump also may be small and consume as little power as possible. Low power consumption is particularly desirable where the pump is to be powered by batteries, as it may extend battery life. The pump may also be configured for quiet (e.g., low noise) operation. A balance of pumping capacity, size, power consumption, noise generation and cost may be selected for a particular application as will be recognized by those of skill in the art.

The fluid controller may be constructed of any material or materials that allow it to function as desired. Typical materials of construction of the various components of fluid controller will vary with the nature of fluid controller and any pump and are known to those of skill in the art. For example, the fluid controller may include some parts that are manufactured from rigid material and other parts that are manufactured from flexible and/or resilient material.

According to one embodiment, the fluid controller may be connected to the bladder in a manner that allows a pump to supply the bladder with fluid, inhibits undesired escape of fluid from bladder and does not interfere with the use of bladder. For example, the inflatable device may be constructed with at least a portion of fluid controller positioned within bladder. Where the fluid controller is positioned at least partially within bladder, the fluid controller will not interfere with the use of the inflatable device. In one embodiment, the exterior profile (total volume and shape) of the fluid controller and inflated device in combination are essentially the same as the exterior profile of the inflated device absent the combination, thus reducing the opportunity for the fluid controller to impact or interfere with the use of inflatable device. For example, where the fluid controller is located substantially within the bladder in a mattress application, it allows an inflatable standard sized mattress to fit into a standard sized bed frame. Where the fluid controller is located within the bladder, it may be sized such that it will not come into contact with the bladder when the bladder is inflated, except at the point(s) of connection.

Where at least a portion of the fluid controller is positioned within the bladder, it may be connected to the bladder in any manner that will not interfere with the use of the inflatable device or allow an undesired escape of fluid from the bladder. For example, the bladder may be adhered or sealed to a portion of the fluid controller, such as with an adhesive or a heat seal. In one embodiment, an outlet of the fluid controller is sealed to the bladder. The bladder may also include structure to facilitate the connection between the bladder and the fluid controller. The fluid controller may to be positioned within the bladder in a variety of ways.

According to one embodiment, there is a need to reduce the cost and simplify the mechanism for operating the fluid controller. The fluid controller may also include a device for controlling an operation of fluid controller, such as the control device 2730 (or, for example, any of control devices 604, 804, 2204, 2404 and 2604). The control device 2730 may be separate or separable from the fluid controller to allow the fluid controller to be controlled remotely. In one embodiment, the control device 2730 is a hand-held device for controlling the fluid controller. In a further embodiment, the dimension L is less than or equal to 3.75 inches. The control device 2730 may be physically connected to the fluid controller by a cord 2731. Alternatively, the control device 2730 may wirelessly communicate with the fluid controller.

The control device 2730 may include a variety of structure for controlling the operation of the fluid controller. For example, control may include a conventional power switch that energizes and de-energizes a pump within the fluid controller. The switch may be any of the many well-known mechanisms for selectively connecting two conductors to supply electricity to a point of use. The switch may allow the pump to be energized such that it inflates bladder. The control device 2730 may also include structure that directs the deflation of bladder. For example, a second switch or a multifunction switch may reverse the direction of the pump to deflate bladder. In some embodiments, the fluid controller may incorporate a valve, such as a self-sealing valve, which must be opened to allow deflation of bladder as well as inflation of the bladder. In these embodiments, the control device 2730 may also include structure to initiate an operation to mechanically or electro-mechanically open a valve to allow deflation of bladder. For example, the switch may act upon or energize a mechanical opening mechanism or activate a solenoid to open a valve and allow deflation of bladder. In one embodiment, the valve that is opened is a self-sealing valve, meaning that it is held closed, at least in part, by pressure within the bladder. For example, a self sealing valve may include a diaphragm that is urged against a valve seat by fluid pressure from within the bladder. Optionally, the switch may also energize the pump to withdraw fluid from the bladder.

In the embodiment of FIG. 27, the control device 2730 operates in the following manner. A control element 2732 is configured to normally rest in a center position 2734. According to one embodiment, the control element 2732 is configured to travel laterally to the left and/or to the right relative to the center position 2734 as illustrated by the arrow. With the control element 2732 located in the center position 2734, the fluid controller is off, such that neither the pump nor any electromechanical device are operating in accordance with one embodiment. The control element 2732 is also configured so that it can be moved to the right to a first position 2735. In accordance with one embodiment, the control element 2732 in the first position 2735, the motor of the fluid controller is activated to provide air to the bladder through the fluid controller so long as the control element 2732 is held in the first position 2735. Thus, the user can provide air to the bladder to, for example, increase the firmness of the inflatable device by maintaining the control element 2732 in the first position 2735. According to a further embodiment, the control element 2732 is also configured so that it can be moved further to the right where it may be locked into place in a second position 2736 so that the user need not hold the control element 2732 in the second position 2736 to, for example, inflate the inflatable device. In one embodiment, the fluid controller will continue to provide air to the bladder until the user taps or otherwise shifts the control element 2732 out of a locked second position 2736. In accordance with one embodiment, the control element 2732 will automatically return to the center position 2732 as described above when it is released from the second position 2736. In another embodiment, the fluid controller can be provided with a timing circuit so that the fluid controller and motor will be shut off after a pre-determined period of time during which the control element 2732 remains in the second position 2736. An approach similar to the preceding may employ a timing circuit to automatically stop the inflation even with the control element 2732 held in the second position 2736 by the user.

In accordance with one embodiment, the control element 2732 is also configured so that it can be moved to the left to a third position 2737 and to a fourth position 2738. In one embodiment, the third position 2737 and the fourth position 2738 each correspond to a deflation of the inflatable device or a bladder included therewith. In one embodiment, with the control element 2732 held in the third position 2737, the solenoid or electromechanical device is activated to open the self-sealing valve while the motor of the fluid controller is not activated so long as the control element 2732 is held in this third position 2737. Thus, the user can adjust air level in the bladder, for example, to make the inflatable device softer. In accordance with another embodiment, the control element 2732 is locked into place when it is moved to the fourth position 2738. According to one embodiment, the pump will be activated so as to remove air from the bladder with the control element 2732 locked in the fourth position 2738 so that the user need not hold the control element 2732 while deflating the inflatable device. The use of the pump during deflation can result in a more rapid deflation of the inflatable device. In the fourth position 2738, the fluid controller will continue to remove air from the bladder until the user taps or otherwise moves the control element 2732 out of the fourth position 2738, in which case it will automatically return to the center position 2734, as described above. In another embodiment, the fluid controller can be provided with a timing circuit so that the fluid controller and motor will be shut off after a pre-determined period of time during which the control element 2732 is in the fourth position 2738.

Various embodiments may also employ a timing circuit during deflation, for example, to de-activate the solenoid or electromechanical device to disengage with the valve after a pre-determined period of time. That is, a timing circuit may be employed to automatically stop the deflation after a pre-determined period of time even with the control element 2732 held in the second position 2735 by the user.

In addition to the preceding, various embodiments of the control 2730 may include pressure control that employs a pressure sensed inside the bladder of the inflatable device to operate the valve and/or the pump and stop an inflation or deflation when a predetermined pressure is reached.

It is to be appreciated that the control device 2730 can include any means, known to one of skill in the art, for maintaining the control element 2732 in the center position 2734 absent an outside force applied to the control element 2732. It is also to be appreciated that the above-described control 2730 can include any means, known to one of skill in the art, for maintaining the control element 2732 in either the second position 2736 or the fourth position 2738 absent an outside force applied to the control element 2732 for example, a detent, spring and/or latch may be employed. It is further to be appreciated that the above described control device can include any means, known to one of skill in the art, for moving the control element 2732 to the center position 2734 from either the first position 2735 or the second position 2737 absent an outside force applied to the control element 2732.

Figure 28A:
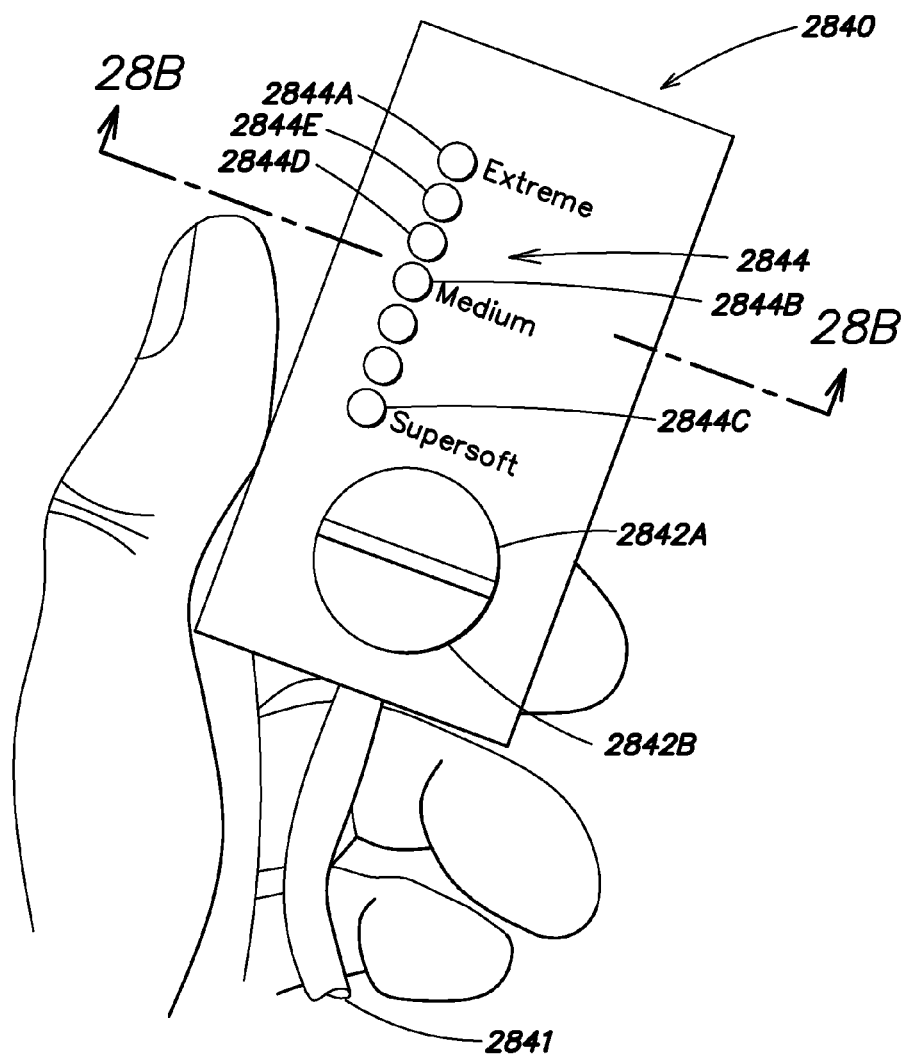
FIG. 28 illustrates a control device according to a further embodiment.
Figure 28B:
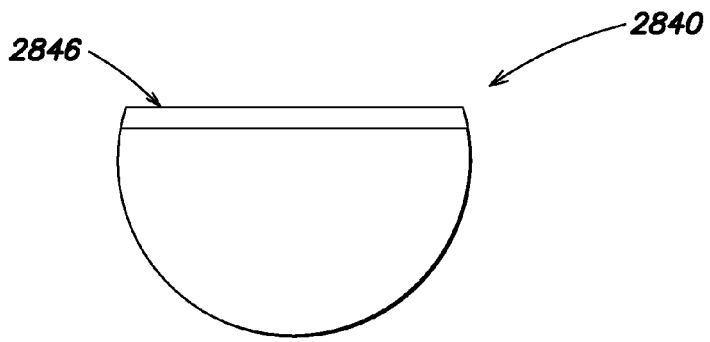

Referring now to FIG. 28A, a control device 2840 is illustrated in accordance with another embodiment. FIG. 28B illustrates a profile of the control device 2840 including the user interface 2846. In the illustrated embodiment the control device is connected to a pressure controller (not illustrated) via a cord 2841. In various other embodiments, however, the control device 2840 may interface with the pressure controller (e.g., the pressure controller 206) via wireless communication. The control device 2840 includes a first control element 2842A and a second control element 2842B and a plurality of indicating lights 2844. In accordance with one embodiment, the indicating lights 2844 are disposed in a linear arrangement where a location of the indicating lights is identified on the user interface 2846. According to the illustrated embodiment, each of the plurality of indicating lights corresponds to a level of inflation of an inflatable device (e.g., the inflatable device 102) with which the control device 2840 is employed. Where, for example, the indicating lights 2844 are each associated with a particular pressure of the inflatable device, the light corresponding to the selected inflation level is illuminated and may remain illuminated so long as the pressure is maintained. In another embodiment, the indicating light is only illuminated when the associated level of inflation is selected by the user (by, for example, operation of the control elements 2842A and 2842B).

The plurality of indicating lights 2844 can be arranged in a sequence from a minimum inflation level (e.g., the indicating light 2844C) to a maximum inflation level (e.g., the indicating light 2844A). Further, one or more indicating lights associated with a level of inflation between the minimum and the maximum can be located between the indicating lights 2844A and 2844C, for example, the indicating lights 2844B and 2844D. In the illustrated embodiment, the indicating light 2844B is associated with a level of inflation that is substantially midway between the minimum level of inflation and the maximum level of inflation. In accordance with one embodiment the pressure settings corresponding to each of the plurality of indicating lights are predetermined by the manufacturer. Further, the user interface 2846 may include text adjacent one or more of the indicating lights that identifies a level of firmness associated with the indicating light. For example, the illustrated embodiment identifies the indicating light 2844A, 2844B and 2844C as "ExtraFirm," "Medium" and "SuperSoft," respectively.

In accordance with one embodiment, a user can depress or otherwise activate the first control element 2842A to increase an inflation level in the inflatable chamber (e.g., the inflatable chamber 110). In addition, the user can activate the second control element 2842B to decrease an inflation level in the inflatable chamber. The control device 2840 may also provide a plurality of functions associated with each of the two control elements 2842A, 2842B, respectively. For example, the control device 2840 may provide for inflation adjustment using either or both of a press and hold feature and by a temporary operation of the control elements 2842A, 2842B. In one embodiment, the first control element 2842A may be pressed to activate a pump to begin to inflate the inflatable device and then held for a minimum predetermined amount of time after which the pump remains on even after the user releases the first control element 2842A. In one embodiment, the pump remains on until a predetermined pressure is reached in the inflatable device, e.g., a factory set maximum pressure. In an alternate embodiment, a pressure setting need not be employed, instead the pump will operate to inflate the inflatable bladder for a predetermined amount of time after the first control element 2842A is used to activate the press and hold feature. The amount of time that the control element 2842A should be held to "latch" the pump in an on-state may vary, however, the control element 2842A must be held for a minimum of two seconds to do so in one embodiment.

In addition to the preceding, the control element 2842A can be tapped (i.e., briefly activated) by the user to incrementally increase the pressure in the inflatable device. For example, when the pressure is set according to the second indicating light 2844B the user may increment or tap the first control element 2842A a first time to increase the pressure of the inflation level in the chamber to a pressure (e.g., a firmness level) associated with the indicating light 2844D. When the pressure reaches that associated with the indicating light 2844D, another tap of the control element 2842A will adjust the pressure to that associated with an indicating light 2844E.

The second control element 2842B can be employed in a similar fashion to that described concerning the control element 2842A. That is, the control element 2842B can be depressed or otherwise activated to decrease the pressure in the inflatable device in one or more steps. In one embodiment, the second control element 2842B may be pressed to activate a pump to begin to deflate the inflatable device and then held for a minimum predetermined amount of time after which the pump remains on even after the user releases the second control element 2842B. In one embodiment, the pump remains on until a predetermined pressure is reached in the inflatable device, e.g., a factory set minimum pressure. In an alternate embodiment, a pressure setting need not be employed, instead the pump will operate to deflate the inflatable bladder for a predetermined amount of time after the second control element 2842B is used to activate the press and hold feature. In accordance with one embodiment, the second control element 2842B may be pressed and manually held to allow the pump to assist in fully deflating the inflatable device. In a version of this embodiment, operation of the pump can be stopped by the user momentarily tapping the second control element 2842B.

One of ordinary skill in the art will recognize that the control elements 2842A and 2842B need not be discrete elements but instead may be integrated into a single control element that may, for example, be "rocked" from a neutral position to a first position to activate the above-described features associated with the control element 2842A and a second position to activate the above-described features associated with the control element 2842B.

Figure 29:
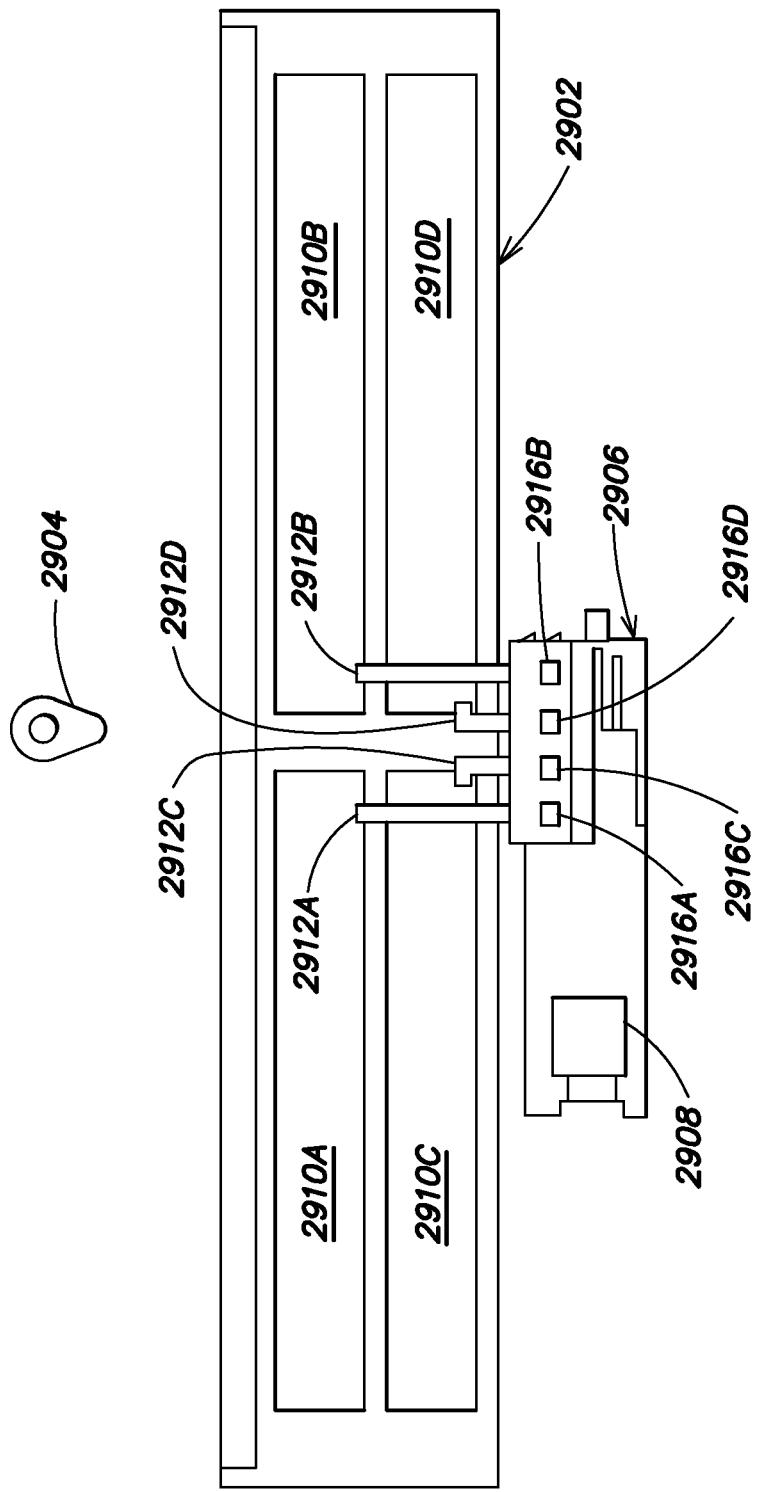
FIG. 29 illustrates an inflatable device in accordance with another embodiment.

FIG. 29 is a sectional view of yet another embodiment of a pressure controller 2906. In the illustrated embodiment, the pressure controller is employed with a multi-layer inflatable device 2902 (e.g., a mattress). In accordance with one embodiment, the inflatable device is a mattress suitable for sleeping two users. Accordingly, in the illustrated embodiment, the inflatable device 2902 includes a first chamber 2910A, a second chamber 2910B, a third chamber 2910C and a fourth chamber 2910D where the first chamber 2910A is an upper chamber located above the third chamber 2910C (i.e., a lower chamber) and the second chamber 2910B is an upper chamber located above the fourth chamber 2910D (i.e., a lower chamber). In accordance with one embodiment, each of the upper chambers 2910A and 2910B are substantially aligned with and overlay the corresponding lower chambers 2910C and 2910D, respectively. The pressure controller 2906 can be located anywhere within the vicinity of the inflatable device 2902 provided that it is fluidly coupled to the inflatable device.

According to one embodiment, the pressure controller 2906 and inflatable device are configured to provide increased comfort-control to a user. In particular, Applicant finds that independent control of the pressure (i.e., firmness) within each of an upper chamber and an underlying lower chamber can provide a user with the ability to maintain a desired level of support (soft, semi-soft, firm, extra-firm) through a plurality of posture settings. In general, a posture setting allows a user to adjust an angle between one or more elements of the user's anatomy relative to another element of the user's anatomy. For example, assuming a fully reclined posture as a starting point, a first posture setting may place one or more of a users head, neck, back, legs, or some combination of the preceding at a different angle relative to the position of one or more of the others when the user is fully reclined. That is, a change in posture can be effected by moving the legs while the head and torso are substantially stationary. Alternatively, the legs may be moved while the torso and/or head remain stationary. Further, the relative movement of one element of the user's anatomy relative to another element of the user's anatomy may be varied in a range of different posture settings as the angle between the anatomical elements is incrementally adjusted.

In one embodiment, the torso and the legs of a user are in a first position relative to one another (for example, in the same plane) with the inflatable device in a first posture setting (e.g., horizontal). In a further embodiment, the torso and the legs are in a second position relative to one another (for example, at a first angle less than 180 degrees) with the inflatable device in a second posture setting. According to this embodiment, the torso and legs are in a third position relative to one another (for example, at a second angle less than 180 degrees) with the inflatable device in a third posture setting.

In accordance with one embodiment, the pressure controller 2906 includes a valve 2916A, 2916B, 2916C, and 2916D and associated conduit 2912A, 2912B, 2912C and 2912D that fluidly couple each of the chambers 2910A, 2910B, 2910C and 2910D, respectively, to the pressure controller 2910. Further, in various embodiments, the pressure controller 2906 includes a pump 2908, although in alternate embodiments, the pump 2908 may be fluidly coupled to but external to the pressure controller 2906.

In a further embodiment, a system including the pressure controller 2906 includes a control device 2904 to provide the user with a convenient means of adjusting the pressure in any of the chambers. Thus, a user of the inflatable device 2902 may adjust the pressure of any of the chambers alone or in combination with another chamber. According to one embodiment, in operation, the user may control the firmness of the first chamber 2910A while in a horizontal posture. The user may further adjust their posture by adjusting the pressure in the third chamber 2910C. In accordance with a further embodiment, the pressure controller is configured to rapidly move a relatively large amount of fluid either into or out of the third chamber 2910C to provide for posture control (e.g., to provide a plurality of posture settings).

As described herein, the control device 2904 is tethered to the inflatable device 2902 in accordance with one embodiment, while in another embodiment, the control device 2904 communicates wirelessly with the pressure controller 2906.

In various embodiments, the user need not know whether the pressure is being adjusted in the upper chamber, the lower chamber or both chambers to achieve a desired firmness and/or posture of the inflatable device. For example, the user may select a desired firmness and/or posture setting to which the pressure controller responds by making any required adjustments to the inflation level of the chambers in the inflatable device. The preceding approach allows a user to select a desired firmness and or posture without manually adjusting a firmness in one or more chambers.

In accordance with one embodiment, the pressure controller 2906 is configured to simultaneously adjust the pressure level in a plurality of chambers. As some examples, the pressure controller may simultaneously add fluid to each of the first chamber 2910A and the third chamber 2910C, simultaneously release fluid from each of the first chamber 2910A and the third chamber 2910C, simultaneously add fluid to three or more chambers or simultaneously release fluid from three or more chambers.

In various embodiments, a system can include, along with the pressure controller 2906, pressure and temperature sensors to sense temperature and pressure in one or more of the chambers 2910A, 2910B, 2910C and 2910D. According to one embodiment, the pressure sensors and the temperature sensors are included in the pressure controller, the sensors being in communication with the chambers, while in an alternate embodiment the sensors are not located in the pressure controller 2906. For example, in one embodiment, the pressure sensors may be located in a fluid conduit that fluidly couples the pressure controller and the chamber with which the pressure sensor and temperature sensor are associated, e.g., within the fluid conduits 2912A, 2912B, 2912C and 2912D.

Figure 30A:
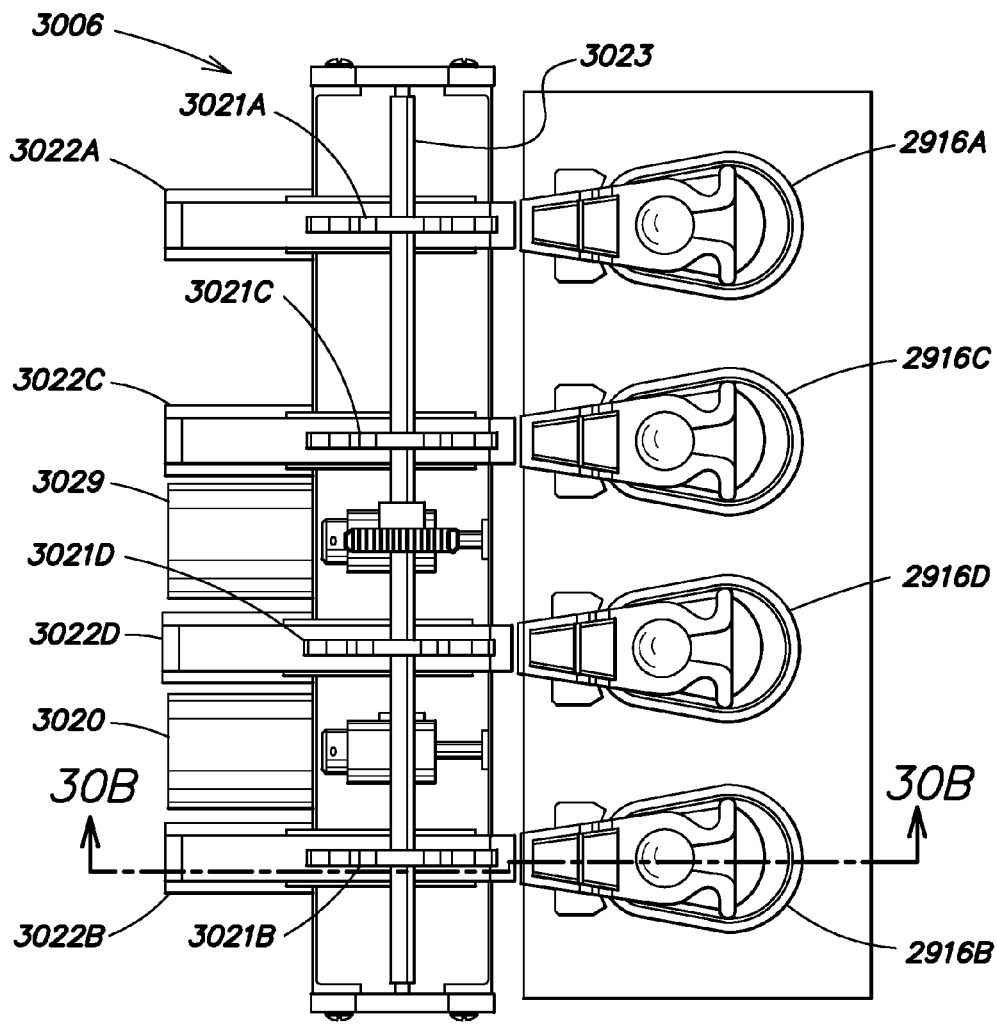
FIGS. 30A and 30B illustrate a pressure controller in accordance with another embodiment.
Figure 30B:
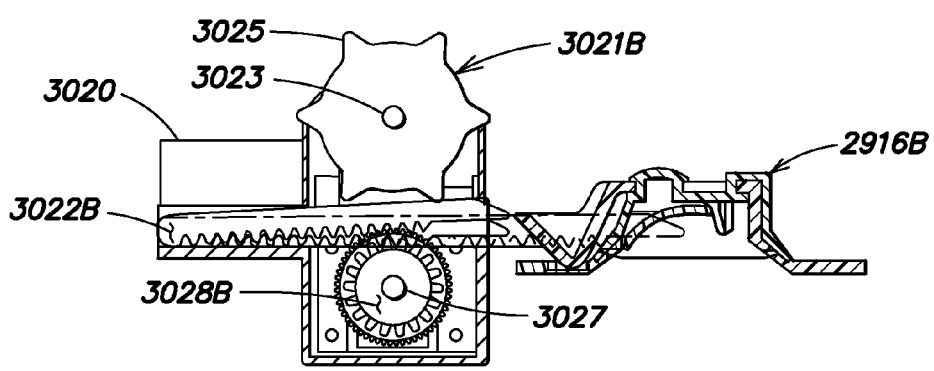

FIG. 30A illustrates an embodiment of a pressure controller 3006 in accordance with one embodiment while FIG. 30B illustrates a cross section 30B-30B. The pressure controller includes the first valve 2916A, the second valve 2916B, the third valve 2916C and the fourth valve 2916D. In addition, the pressure controller also includes a valve operator 3020 (e.g., a motor, a solenoid, etc.), a mechanical coupling 3022 (shown in a retracted position and in phantom in an extended position), a gear 3028 (e.g., a toothed gear) to connect the valve operator 3020 to the mechanical coupling 3022, a cam shaft 3023 and a cam 3021. In one embodiment, the preceding components are included in a housing. In a version of this embodiment, electronic circuitry adapted to process control signals for the pressure controller 3006 is also included in the housing.

In a further embodiment, the pressure controller 3006 includes a separate mechanical coupling for each valve, that is, the mechanical couplings 3022A, 3022B, 3022C and 3022D. In addition, the pressure controller 3006 may also include a separate cam 3021A, 3021B, 3021C and 3021D for each valve 2916A, 2916B, 2916C and 2916D, respectively, where each cam is operated by a common cam shaft 3023.

In a version of this embodiment, each cam includes a plurality of lobes 3025. In a further embodiment, an electronic sensor is employed to sense a position of the cam shaft. The pressure controller 3006 may also include a separate gear 3028A, 3028B, 3028C and 3028D associated with each of the mechanical couplings 3022A, 3022B, 3022C and 3022D, respectively where all of the gears are driven off of a single gear shaft 3027.

In accordance with one embodiment, a cam operator 3029 (e.g., a motor, a solenoid, etc.) is also included in the pressure controller 3006. In operation, a signal to change a pressure/inflation level in one or more chambers is received by the pressure controller 3006. The cam operator 3029 operates to rotate the cam shaft 3023 such that the cam associated with the selected chamber is rotated into a position whereby the corresponding mechanical operator is engaged with the corresponding gear. For example, if the pressure controller receives a signal to change the fluid pressure in the second chamber 2910B, the cam 3021B is rotated such that one or more of the lobes 3025 engage the mechanical coupling 3022B to force the mechanical coupling into engagement with the gear 3028B. The valve operator 3020 also operates to rotate the gear shaft 3027 to move the mechanical coupling (e.g., the mechanical coupling 3022B) into engagement with the valve (e.g., the valve 2916B) to open the valve. In one example, the pump (e.g., the pump 2908) operates to force fluid into the chamber. In other modes of operation, the pump may be off when the valve is opened such that air exhausts from the chamber through the valve. In another to mode of operation, the chamber may be more rapidly deflated with the valve open and the pump operated in a direction that forces fluid out of the chamber.

As mentioned above, a plurality of valves may be opened simultaneously to simultaneously adjust the pressure in a plurality of chambers. In accordance with one embodiment, the cams 3021 provide six lobes 3025 that are equally spaced around the outside diameter of the cam 3021 (e.g., they are 60 degrees apart) such that the pressure controller 3006 can operate any one of up to four separate valves independent of the operation of the other valves or can simultaneously operate two valves.

Figure 31:
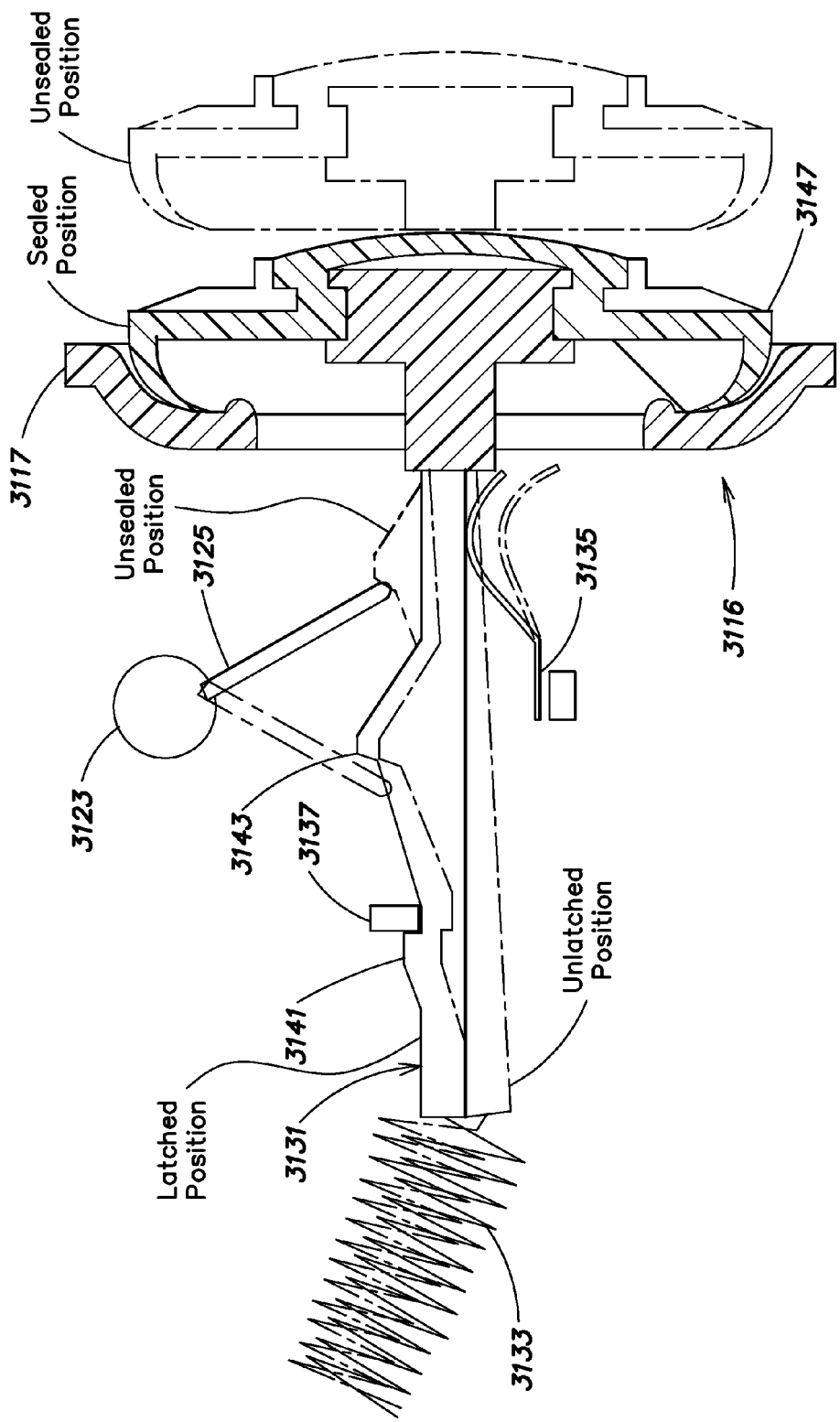
FIG. 31 illustrates a valve in accordance with a further embodiment.

Referring now to FIG. 31, a valve 3116 for use with an inflatable device is illustrated in accordance with one embodiment. The valve may include a shaft 3131 either integral to the valve 3116 or attached thereto. In further embodiments, the shaft may include a latch 3141 and an engagement tab 3143. The valve can also include a diaphragm 3147 and a valve housing 3117. In one embodiment, the diaphragm 3147 engages the valve housing 3117 when the valve 3116 is in the sealed position.

In accordance with one embodiment, the valve 3116 is mechanically biased closed and remains closed under a fluid bias. FIG. 31 illustrates elements of a mechanical system (e.g., an electromechanical system) to open and close the valve 3116. In accordance with the illustrated embodiment, the elements include a cam 3123, a lobe (e.g., a projection from the cam) 3125, a first spring 3133, a second spring 3135 and a stop 3137. In one embodiment, all of the illustrated components of valve and the mechanical system are include in a pressure controller.

In general, in operation, the first spring 3133 provides a bias that maintains the valve in a sealed position and the second spring 3135 provides a bias that positions the shaft in both latched and unlatched positions (as the shaft articulates to and from the sealed/unsealed positions). In a version of this embodiment, the first spring 3133 is attached to the shaft 3131. In accordance with one embodiment, a single spring may provide both a closing force and a latching force for the valve 3116. To better describe the valve operation the valve is illustrated in the sealed and the unsealed position with the unsealed position shown in phantom. Further, each of the first spring 3133 and the second spring 3135 is illustrated in phantom where the phantom-position represents the position of the spring with the shaft in an unlatched position.

In a latched condition, the mechanical system may act to maintain the valve in a sealed position in which it is prevented from moving to an unsealed position. The system may also place the valve in an unlatched position in which the valve is free to move from the closed position to the opened position. In the interest of clarity, the shaft 3131 is illustrated in both the latched position and in the unlatched position (in phantom). Further, the engagement tab 3143 is also illustrated in a plurality of positions; a first position with the shaft 3131 in the latched position and with the valve 3116 in the sealed position; a second position with the shaft 3131 in the unlatched position with the valve 3116 in the sealed position (both the shaft and the engagement tab are illustrated in phantom); and a third position with the shaft 3131 in the unlatched position and the valve 3116 in the unsealed position (the engagement tab is illustrated in phantom).

In operation, the valve is sealed when the lobe 3125 is moved in a direction opposite the valve housing 3117, for example, if it is moved via rotation of the cam 3123. In this position, the lobe does not provide a bias on the shaft 3131 and/or the engagement tab 3143. The lobe 3125 is illustrated in phantom with the valve in the sealed position. With the valve in the sealed position, the second spring 3135 provides a bias on the shaft 3131 while the first spring provides a bias that draws the latch 3141 into engagement with the block 3137 (e.g., on a surface of the block that is opposite the valve 3116). To open the valve, the cam rotates the lobe 3125 in a direction toward the valve 3116. As the lobe 3125 travels toward the valve, it engages the engagement tab 3143. The rotation of the cam 3125 moves the lobe in an arc-shaped path which initially disengages the shaft 3131 from the block. Once the shaft is unlatched, the continued rotation moves the shaft 3131 in the direction of the second spring 3135 while also moving the shaft toward the valve and valve housing to unseal the valve. That is, the travel of the shaft is not entirely linear.

In accordance with one embodiment, the approach illustrated in FIG. 31 allows a single electromechanical device to act as both the valve operator and cam operator, for example, to combine the functionality of both the valve operator 3020 and the cam operator 3029 of the system illustrated in FIGS. 30A and 30B thereby employing only a single electromechanical device.

In accordance with one embodiment, a reversible motor rotates the cam 3123 in both the clockwise and the counter-clockwise direction. That is, the lobe 3135 (e.g, an arm) rotates counterclockwise to open the valve and clockwise to allow the valve to reseal and position the cam for a subsequent valve operation. In accordance with one embodiment, the lobe 3125 is configured to be more rigid (e.g., stiffer) when rotating in the counterclockwise direction and less rigid when moving in the clockwise direction.

In various embodiments, the approach described with reference to FIG. 31 can be employed to operate a plurality of valves, for example, the valves 2916A, 2916B, 2916C and 2916D included in the pressure controller 3006 of FIG. 30A. Further, a cam shaft may operate a plurality of cams (e.g., a plurality of cams 3123) each associated with a different valve. In one embodiment, a system includes the valve 3116 and associated mechanical system and the plurality of cams are employed to independently open four valves in four different operating states (e.g., four different rotational positions of the cam shaft) and also to simultaneously open two of the valves.

Figure 32A:
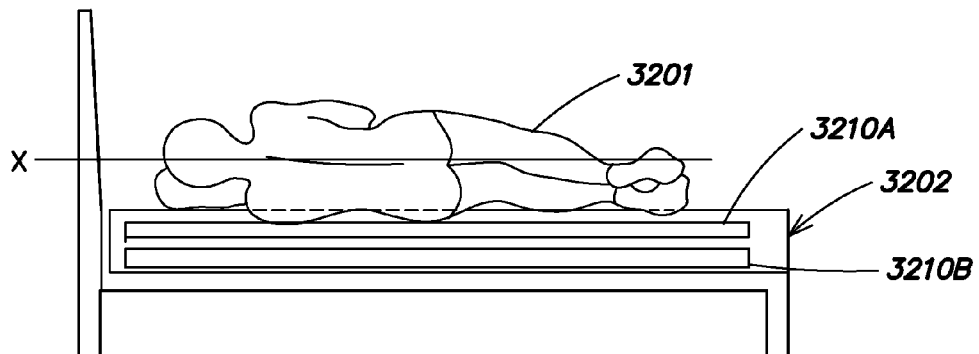
FIG. 32 illustrates an inflatable device in accordance with yet another embodiment.
Figure 32B:
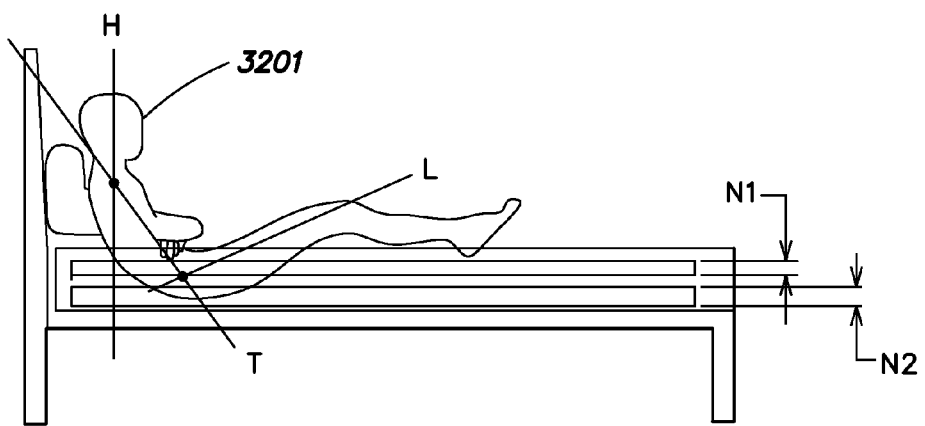
Figure 32C:
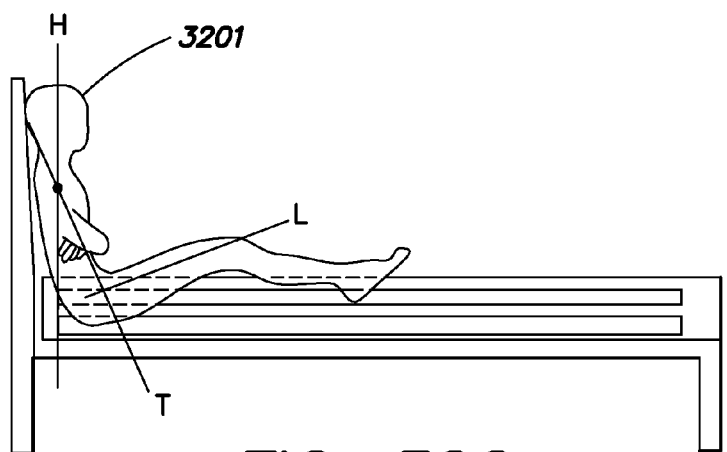

Referring now to FIGS. 32A-32C, an inflatable device 3202 including a plurality of inflatable chambers is illustrated. In accordance with one embodiment, an upper chamber 3210A is located at a first level and a lower chamber 3210B is located at a lower level where it supports the first chamber. Further, the inflatable device 3202 can be configured to provide posture control for a user 3201. That is, in accordance with one embodiment, the firmness of the inflatable device is primarily controlled by controlling the fluid pressure in the upper chamber while the pressure in the lower chamber is primarily controlled to adjust the posture of the user. Further, the controller may provide for simultaneous adjustment of both upper and lower chambers to achieve a range of comfort, posture and/or support settings. The inflatable device 3202 illustrated in FIGS. 32A-C may be employed with any of the pressure controllers described herein.

In accordance with one embodiment, the ability to control the firmness and posture as described here is, at least in part, the result of a difference in a fully inflated thickness (i.e., a dimension N1) of the upper chamber 3210A and a fully inflated thickness (i.e., a dimension N2) of the lower chamber 3210B. For example, in one embodiment, the upper chamber is thinner than the lower chamber. In a version of this embodiment, the dimension N1 is in a range of from 2-4 inches and the dimension N2 is in a range of from 3-5 inches. In a further embodiment, the lower chamber is twice as thick as the upper chamber, for example, the lower chamber may be 5 inches thick and the upper chamber may be 2.5 inches thick.

As illustrated in FIGS. 32A-32C, the posture control provides for various positions of elements of the user's anatomy relative to one another. For example, each of the user's torso, legs and head are substantially aligned along an axis X. However, following a posture adjustment provided by a change in pressure in either or both of the upper chamber and the lower chamber the positions of the torso, legs and head are changed. The axes H, L and T are employed here for reference. In FIG. 32B, an angle between the L axis and the T axis is greater than 90 degrees while in FIG. 32C the angle between the L axis and the T axis are approximately 90 degrees. Similarly, in FIG. 32B, an angle between the H axis and the T axis is less than an angle between the H axis and the T axis illustrated in FIG. 32C.

In accordance with one embodiment, changes in posture as illustrated in FIGS. 32A-32C can be accomplished by adjusting the pressure/inflation level in the lower chamber while maintaining the pressure/inflation level in the upper chamber. For example, the change in posture between the posture illustrated in FIG. 32A and the posture illustrated in FIG. 32B may be accomplished by reducing the pressure in the lower chamber. Similarly, the change in posture between the posture illustrated in FIG. 32B and the posture illustrated in FIG. 32C may be accomplished by increasing the pressure in the lower chamber to a pressure level greater than the pressure level provided by the lower chamber in FIG. 32B but less than the pressure level provided by the lower chamber in FIG. 32A. In another embodiment, a variety of comfort settings for both firmness and posture may also be accomplished by simultaneous pressure modification to both upper and lower chambers.

In accordance with one embodiment, the control device 2204 illustrated in FIG. 22 can be employed with a multi-layer inflatable device, e.g., an inflatable device that includes an upper inflatable fluid chamber and a lower inflatable fluid chamber. That is, the control device 2204 can be employed to control a pressure/inflation level/firmness in each of an upper chamber and a lower chamber and a plurality of upper and lower chambers (for example, as illustrated in FIG. 29). Accordingly, the control device 2204 can be employed to vary a posture setting of the inflatable device through a plurality of posture settings.

In one embodiment, the selection of control of the upper layer and the control of the lower layer is made by a particular sequence of operations of the control elements, e.g., a sequence or series of a tap, a plurality of taps, a press and hold operation, any one of the preceding or any combination of the preceding. In a version of this embodiment, the control element 2262C is triple tapped to toggle between pressure/firmness control of the upper layer and pressure/firmness control of the lower layer. Further, in various embodiments, a color of the light source (e.g., the light source 2252) is different when the control device is in a first mode in which adjustments may be made to the upper chamber (during which the light source appears as a first color) and the color of the light source when the control device is in a second mode in which adjustments may be made to the lower chamber (during which the light source appears as a second color).

In accordance with one embodiment, firmness control for a pair of upper and lower chambers may be accomplished using the control device 2204 as follows: 1) the control element 2262B is tapped once to increase the firmness in the lower chamber and is tapped again to stop the increase; 2) the control element 2262B is tapped twice to increase the firmness in both the lower chamber and the upper chamber; 3) the control element 2262D is tapped once to incrementally decrease the firmness of the lower chamber to a "semi-soft" level; 4) the control element 2262D is tapped twice to incrementally decrease the firmness in the lower chamber to a "soft" level; 4) the control element 2262E is tapped once to incrementally increase the firmness in the lower chamber to a "semi-firm" level; 5) the control element 2262E is tapped twice to incrementally increase firmness in the lower chamber to a "firm" level; 6) the control element 2262C is tapped once to decrease the firmness in the lower chamber and is tapped again to stop the decrease; and 7) the control element 2262C is tapped twice to decrease the firmness in both the lower chamber and the upper chamber.

The operations identified in the immediately preceding description are not required to be associated with the specific control elements described above. Instead, the operations may be associated with different ones of the control elements and any set of associations may be employed provided that the user is made aware of the associations.

Further, the control device may simply provide the user with a plurality of posture settings. The various posture settings may be identified by number, by descriptor or both. For example, the posture settings may include a "seated" posture setting, a "partially reclined" posture setting or a "fully reclined" setting. Accordingly, the control device may employ the preceding descriptor, the preceding descriptors adjacent a series of associated indicating lights or some other combination of indicia concerning the available posture settings and/or the current posture setting of the inflatable device. In an alternate embodiment, a user may select any of a plurality of posture settings with a control device that does not include any indicia.

Also, in various embodiments, a user need only select a particular posture setting using a control device. Once the selection is made, the pressure controller responds to the selection by making any necessary changes to the inflation levels in either or both of the upper chamber and the lower chamber to achieve the requested setting. That is, the user can reach the selected posture without knowing the changes that are being made in the inflation of the chambers.

Embodiments of the control devices and pressure controllers described herein to may be employed with temporary-bedding (i.e., occasional-bedding). That is, embodiments of the control devices and pressure controllers described herein may be employed with inflatable bedding that is stored in a deflated (e.g., collapsed) or partially deflated state when not in use.

The term fluid as used herein describes any material such as a gas (e.g., air), a liquid (e.g., water), or a gel that can be employed to inflate a fluid impermeable bladder.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system adapted to control a pressure in an inflatable device, the system comprising:
a pressure controller fluidly coupled to the inflatable device and configured to adjust the pressure in the inflatable device by adding and removing fluid from the inflatable device;
a control device including first, second, and third control elements, the control device being coupled to a microcontroller, which in combination are configured to allow a user to adjust the pressure in the inflatable device using the pressure controller; and
the microcontroller being configured to receive information from the control device concerning a first setting corresponding to a first pressure and automatically establish a second setting corresponding to a second pressure and a third setting corresponding to a third pressure based on the first setting;
wherein the first control element in combination with the microcontroller is configured to allow the user in a first operation to establish the first setting corresponding to the first pressure and in a second operation to adjust the pressure in the inflatable device to the first pressure from another pressure;
wherein the second control element in combination with the microcontroller is configured to allow the user to increase the pressure in the inflatable device from another pressure to the second pressure corresponding to the second setting; and
the third control element in combination with the microcontroller is adapted to allow the user to decrease the pressure in the inflatable device from another pressure to the third pressure corresponding to a third setting.

2. The system of claim 1, wherein the first pressure has a first value, wherein the second pressure has a second value, and wherein a difference between the first value and the second value is established with the microcontroller before the first setting is established.

3. The system of claim 1, further comprising a memory configured to store the first setting.

4. The system of claim 1, wherein the plurality of control elements are unmarked.

5. The system of claim 4, wherein the control device includes a user interface, wherein the plurality of control elements are located in the user interface, wherein a location of each of the plurality of control elements is identified in the user interface.

6. The system of claim 5, wherein the first control element is located substantially centrally in the user interface, and wherein others of the plurality of control elements are located radially outward of the first control element.

7. The system of claim 1, wherein the system is adapted to allow the user to return the pressure in the inflatable device to the first pressure from another pressure when the first control element is selected subsequent to the first setting being established.

8. The system of claim 1, wherein the control device is adapted to allow the user to establish the setting corresponding to the first pressure when the first control element is selected for at least a predetermined amount of time.

9. The system of claim 8, wherein the control device is adapted to allow the user to return the pressure in the inflatable device to the first pressure from another pressure when the control element is selected for an amount of time less than the predetermined amount of time.

10. The system of claim 1, wherein the control device is configured to wirelessly communicate the first setting from the control device to the pressure controller.

11. The system of claim 1, further comprising a pump adapted to add fluid to the inflatable device.

12. The system of claim 11, wherein the pump is fluidly coupled to the pressure controller.

13. The system of claim 1, further comprising an inflatable device that includes a plurality of chambers and that is coupled to the pressure controller, and wherein the control device includes a selector adapted to allow the user to select a chamber from among the plurality of chambers.

14. The system of claim 13, wherein the control device further includes a plurality of indicating lights associated with the plurality of chambers, wherein a first indicating light is illuminated when the first chamber is selected, and wherein a second indicating light is illuminated when the second chamber is selected.

15. The system of claim 1, wherein the pressure controller includes a pump, a valve and electronic circuitry.

16. The system of claim 1, further comprising an inflatable device and wherein the pressure controller is disposed within a profile of the inflatable device.

17. The system of claim 1, further comprising an inflatable device, including a lower chamber and an upper chamber located above and proximate to the lower chamber, wherein the pressure controller is fluidly coupled to the upper chamber and the upper chamber is fluidly coupled to the lower chamber.

18. The system of claim 1, wherein the pressure controller includes electronic circuitry including a memory, wherein the setting is communicated from the control device to the electronic circuitry, and wherein the first setting is stored in the memory.

19. The system of claim 1, wherein the control device includes a memory, and wherein the setting is stored in the memory.

20. The hand held control device of claim 1, further comprising a user interface wherein a location of the first control element, a location of the second control element, and a location of the third control element are identified, and wherein the first control element, the second control element and the third control element are otherwise unmarked.

21. The hand held control device of claim 20, wherein the user interface is adapted to allow the user to select one of the first control element, the second control element and the third control element by applying pressure to a location in the user interface corresponding to the selected control element.

22. The hand held control device of claim 21, wherein the hand held control device further comprises a transmitter, wherein the transmitter is adapted to communicate to the pressure controller information corresponding to a user-selected control element.

23. The hand held control device of claim 22, wherein the first control element is located substantially centrally in a user interface of the control device.

24. The hand held control device of claim 23, wherein the second and third control elements are located radially outward in the user interface relative to the first control element.

25. The hand held control device of claim 24, further comprising a light source that illuminates a region of the user interface.

26. The hand held control device of claim 25, wherein the light source is configured to periodically vary in intensity.

* * * * *

UNITED STATES PATENT AND TRADEMARK OFFICE
CERTIFICATE OF CORRECTION

Page 1 of 1

PATENT NO. : 8,839,474 B2
APPLICATION NO. : 13/452987
DATED : September 23, 2014
INVENTOR(S) : Robert B. Chaffee It is certified that error appears in the above-identified patent and that said Letters Patent is hereby corrected as shown below:

In the Specification:

At Column 41, line number 1, delete "to".

Signed and Sealed this
Sixteenth Day of December, 2014

Michelle K. Lee
*Deputy Director of the United States Patent and Trademark Office*